United States Patent [19]
Akada et al.

[11] Patent Number: 4,671,640
[45] Date of Patent: Jun. 9, 1987

[54] AUTOMATIC FOCUS CONTROL CAMERA

[75] Inventors: Yasuaki Akada, Sakai; Norio Ishikawa; Takeshi Egawa, both of Osaka; Nobuyuki Taniguchi, Tondabayashi, all of Japan

[73] Assignee: Minolta Camera Kabushiki Kaisha, Osaka, Japan

[21] Appl. No.: 764,742

[22] Filed: Aug. 9, 1985

[30] Foreign Application Priority Data

Aug. 9, 1984 [JP] Japan ................... 59-167105
Sep. 6, 1984 [JP] Japan ................... 59-187109
Nov. 19, 1984 [JP] Japan ................... 59-243994

[51] Int. Cl.⁴ .................... G03B 3/10; G03B 7/00; G03B 17/38
[52] U.S. Cl. .................... 354/402; 354/412; 354/266
[58] Field of Search .................... 354/400–409, 354/412, 195.1, 430, 266; 352/140

[56] References Cited

U.S. PATENT DOCUMENTS

| 4,209,241 | 6/1980 | Nanba et al. | 354/25 |
| 4,284,336 | 8/1981 | Iwata et al. | 354/401 |
| 4,303,321 | 12/1981 | Enomoto et al. | 354/406 |
| 4,336,987 | 6/1982 | Shenk | 354/401 |
| 4,344,679 | 8/1982 | Yagi et al. | 354/409 |
| 4,387,975 | 6/1983 | Araki | 354/25 |
| 4,435,058 | 3/1984 | Yoshida et al. | 354/403 |
| 4,459,006 | 7/1984 | Sakai et al. | 354/406 |
| 4,464,037 | 8/1984 | Terui et al. | 354/400 |
| 4,470,683 | 9/1984 | Nakajima | 354/406 |
| 4,473,286 | 9/1984 | Watanabe et al. | 354/406 |
| 4,477,164 | 10/1984 | Nakai et al. | 354/412 |
| 4,492,448 | 1/1985 | Ishikawa et al. | 354/406 |
| 4,508,443 | 4/1985 | Matsuzaki et al. | 354/402 |
| 4,509,842 | 4/1985 | Taniguchi et al. | 354/402 |
| 4,527,053 | 7/1985 | Kinoshita et al. | 354/406 X |
| 4,548,488 | 10/1985 | Honda et al. | 354/402 |
| 4,560,267 | 12/1985 | Nakai et al. | 354/412 |
| 4,572,638 | 2/1986 | Nakai et al. | 354/286 |
| 4,575,212 | 3/1986 | Kitaura et al. | 354/286 |
| 4,602,861 | 7/1986 | Taniguchi et al. | 354/403 |
| 4,621,914 | 11/1986 | Taniguchi et al. | 354/21 |

FOREIGN PATENT DOCUMENTS

| 50-69983 | 6/1975 | Japan . |
| 55-11300 | 1/1980 | Japan . |
| 57-46216 | 3/1982 | Japan . |
| 57-72115 | 5/1982 | Japan . |
| 57-212407 | 12/1982 | Japan . |
| 58-18611 | 2/1983 | Japan . |
| 58-63903 | 4/1983 | Japan . |
| 58-93924 | 6/1983 | Japan . |
| 58-144805 | 8/1983 | Japan . |
| 58-150917 | 9/1983 | Japan . |
| 58-168023 | 10/1983 | Japan . |

Primary Examiner—W. B. Perkey
Attorney, Agent, or Firm—Price, Gess & Ubell

[57] ABSTRACT

In an automatic focus control camera capable of obtaining a focus control information during focus adjustment comprising focus control information obtaining means requiring a time between the sensing of the focus condition and the generation of data indicative of the necessary degree of focus adjustment, and modifying means for modifying the data with a degree of focus adjustment expected to occur with a predetermined speed during the time, there is provided means for interrupting the operation of the obtaining means and the modifying means for a period beginning from the initiation of focus adjustment.

26 Claims, 50 Drawing Figures

LEC

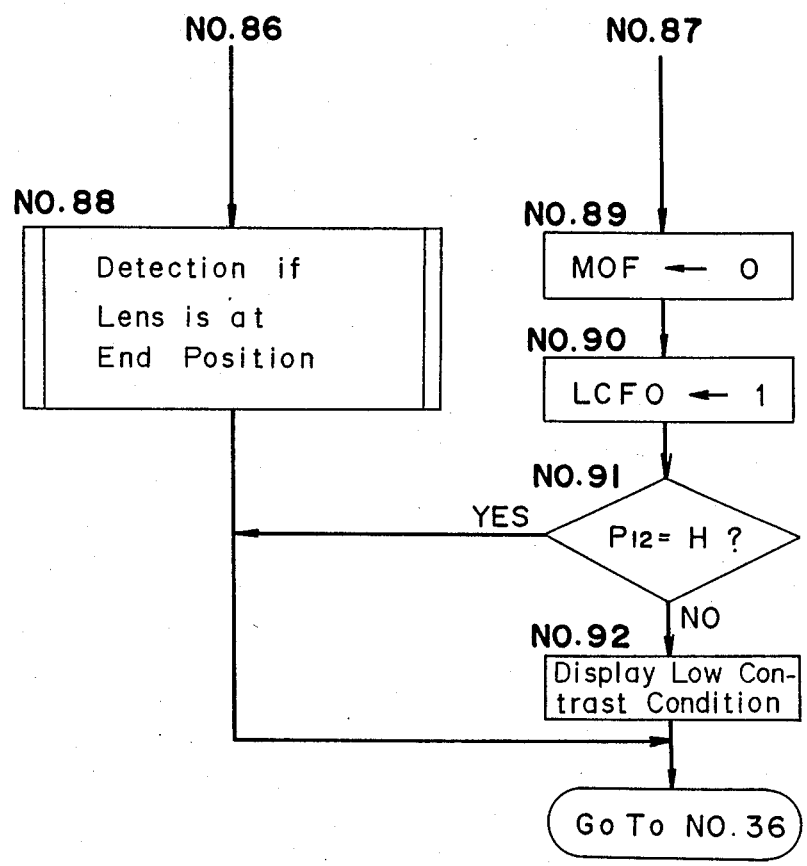

AUTOMATIC FOCUS CONTROL CAMERA

FIELD OF THE INVENTION

The present invention relates to an automatic focus control having an arrangement for obtaining various information to provide an automatic focus control and adjust a lens of the camera to an in focus position automatically based on the obtained information.

DESCRIPTION OF THE PRIOR ART

There have been proposed many kinds of automatic focus control cameras of the above type. However, in the conventional autofocus cameras there are still many problems to be solved. First, it is necessary to obtain reliable information for performing the automatic focus control. Second, it is necessary to provide a practical driving of a motor for positioning the lens in the in focus position in response to the information. With respect to the second issue, it is necessary to move the lens to the in focus position with a minimum loss based on the obtained data, to decrease the time for positioning the lens at in focus position, to determine whether the lens is at the in focus position and to process the obtained information in case the obtained information is not suitable for the lens attached to the camera. Third, it is required from the point of view of manufacturing the cameras how to perform the various adjustments of the camera during the manufacturing process to assure an accurate performance of the camera.

In studying the first problem, conventionally, there have been known focus adjusting devices in which the various informations are obtained for the automatic focus control by receiving light which has passed through an interchangeable lens and a diaphragm aperture opening. In the focus control device of the above type, the necessary information can not be obtained in case the minimum F Number of the interchangeable lens is not smaller than a limit minimum F Number required in the automatic focus control device. Against this drawback, there has been proposed such an arrangement that the minimum F number of the used interchangeable lens is sent to the camera body then the focus detection is inhibited if the sent minimum F number is greater than the limit minimum F number required in the device. However, there are interchangeable lenses that has a minimum F number which is varied corresponding to zooming and/or focusing. In case an interchangeable lens of the above type is used, the automatic focus control will be enabled or disabled depending on the change of the minimum F number of the lens corresponding to the state of the focusing or zooming, whereby the user may be perplexed.

In studying the second problem, the conventional automatic focus detection device has such problems as follows;

(1) The focus detection device can not obtain the necessary information for the automatic focus control from an inadequate condition of a photographic object, such as a low contrast. As the countermeasure against this problem, one proposed device is so arranged that when the focus detection is disabled for a lens position, the lens is forcibly moved by a predetermined length so as to seek whether or not there is another lens position where the focus detection is made possible. However, in this arrangement, if there happen to occur a condition that the focus detection is disabled during the progress of the normal automatic focus control, toward a just focus position the operation of the lens movement is inadvertently changed to the seeking operation from the normal focusing, whereby an unnecessary lens movement is interposed in the desired focus control.

(2) Another arrangement is to obtain the necessary information repeatedly. In this arrangement, if the information sequentially taken in the camera is erroneous due to movement of the camera, and the automatic focus adjustment is performed in response to the erroneous information, the lens is unnecessarily moved to and fro.

(3) Generally it takes time before the necessary information becomes available in the lens control circuit after the light measurement of the photographic object is made. Thus, in a system in which the focus detection is made during the lens movement, an error occurs between the lens position at which the light measurement is made and the lens position at which the information used in the lens control circuit becomes available, due to the lens movement during the internal time. In order to compensate for this error, conventionally a correction of the information taken is made by means of amending the information with a constant value corresponding to the lens movement during the internal time. However, it takes a certain amount of time before the lens movement reaches a stable speed in the beginning of the lens movement. Accordingly the amount of the lens movement during the time with the stable speed and the amount thereof under the unstable speed are different, whereby an accurate focus control can not be expected if the information for the focus control is amended by the constant value as employed in the prior art.

(4) In the process of the focus control, conventionally, the motor is decelerated when the lens reaches a predetermined position near the in focus position to achieve a smooth stop of the lens movement. However, if the motor speed is different at the position at which the deceleration begins, the length of lens movement from the beginning of the deceleration till the deceleration to a desired low speed of lens differs. In fact the lens may reach the near focus position with a stable high speed or may reach the near focus position directly after the lens begins to move with a relatively low speed. Therefore, if the deceleration of the motor is inadequately made to increase the time for low speed lens movement, the rapid focus control can not be expected.

(5) As has been stated above, it is essential to decelerate the lens in the near focus condition to prepare the smooth stop of the lens movement. In case the focus control is performed when the object itself is moving to and fro, however, there may occur the near focus condition and the far focus condition alternatingly due to the movement of the object to correspondingly change the speed of lens movement. If the lens is moved with a high speed or low speed alternatingly corresponding to the near focus and far focus conditions, the smooth movement of the lens may be deteriorated.

(6) Conventionally, it is employed to determine whether or not the lens is positioned in the in focus position by detecting that the lens is situated in a predetermined allowable range which is regarded as the in focus position. However, still a problem exists in determining how to decide the allowable range.

(7) It is strongly desired to position the lens in the in focus position rapidly. However, the conventional automatic focus control is still not enough in complying with the above requirement.

SUMMARY OF THE INVENTION

An object of the present invention is to provide an automatic focus control camera which is able to complete the focus control rapidly with a smooth movement of the lens.

Another object of the present invention is to provide an automatic focus control camera which is able to perform an accurate focus control.

A further object of the present invention is to provide an automatic focus control camera which is enabled to move the lens based on the best possible information without any undesired movement.

A still further object of the present invention is to provide an automatic focus control camera which is able to effect a smooth lens control even if a photographic object is moving.

A still further object of the present invention is to provide an automatic focus control camera with an improved operativity in the actual use.

According to a feature aspect of the present invention, in an automatic focus control camera capable of obtaining a focus control information during focus adjustment comprising focus control information obtaining means requiring a time between the sensing of the focus condition and the generation of data indicative of the necessary degree of focus adjustment, and modifying means for modifying the data with a degree of focus adjustment expected to occur with a predetermined speed during the time, there is provided means for interrupting the operation of the obtaining means and the modifying means for a period beginning from the initiation of focus adjustment. By this arrangement, at the initial state of the focus adjustment, an erroneous focus adjustment due to wrong modification of the data can be prevented and the modification means can be effectively used.

According to another feature of the present invention, in an automatic focus control camera in which when the remainder obtainable by subtracting actual degree of focus adjustment from the necessary degree of focus adjustment is less than a reference data, the driving power is reduced, the reference data can be changed corresponding to the necessary degree of focus adjustment. Accordingly, in case the remainder is made small before the speed of the focus adjustment becomes high since the necessary degree of focus adjustment is small, the reference data is made small so that the power reduction may be made at a position nearer the in focus position. By this arrangement, it can be avoided the problem that it would take a long time for the focus adjustment due to any unnecessary early reduction of the power to the motor.

According to a further feature of the present invention, in an automatic focus camera in which the driving power for moving the lens is reduced when the degree of the defocus becomes less than a reference level, the reference level is changed from a first reference level to a second reference level which is greater than the first reference level when the driving power is once reduced, whereby once the driving power is reduced, even if the degree of the defocus becomes large again due to the movement of the photographic object, the reduction of the driving power is continued so that a smooth focus adjustment can be assured.

According to a further feature of the present invention, in an automatic focus control camera in which the information for the focus control is not reliable, a search for another focusing position at which a reliable focus information is obtainable, there is further provided a disabling means for disabling the search operation even if it is suddenly decided that the information is unreliable when the focus adjustment is being practiced toward the in focus position. By this arrangement, undue focus adjustment can be prevented during the process of the focus adjustment to the in focus position.

According to a further feature of the present invention, there is provided a causing means for effecting the focus adjustment based on new information when an abrupt change between the successively obtained information occurs due to such as a camera shake without responding to the abruptly changing information. By this arrangement, an unnecessary focus adjustment due to the abrupt change of the information can be prevented.

According to a further feature of the present invention, when a teleconverter is used, a range of permissible defocusing which can be dealt with as in focus conditions may be expanded compared to the case when the teleconverter is not used. In general, when the teleconverter is used, even if an object situated at the same distance moves the same distance in the direction of the optical axis, the amount of change of the defocusing degree may be large compared to the case when the teleconverter is not used. Also, when the teleconverter is used, the effective F number changes to increase the depth of focus compared to the case when the teleconverter is not used. Considering the above matters, by expanding the range of permissible defocusing degree with the presence of the teleconverter a reasonable decision on the focus can be made.

According to a further feature of the present invention, focus adjustment is continued until the actual exposure to the film is initiated even after the operation of the exposure is set. By this arrangement, the time available for the focus control can be extended compared to the conventional arrangement in which the focus adjustment is stopped when the operation of the exposure is set about even if the time length between the initiation of the focus adjustment and actual exposure to the film is the same, thereby enabling a more suitable focus adjustment. In other words, the time from the completion of a suitable focus adjustment till the actual exposure to the film can be shortened.

According to a further feature of the present invention, in a camera in which, the information obtaining function is prohibited, when the minimum aperture value of the interchangeable objective lens is greater than a limit, in case the effective aperture value of the interchangeable lens with the diaphragm aperture fully open changes due to zooming or focusing, said interchangeable lens is provided with means for outputting, independently from the actual variation of the effective fully open aperture value, a signal indicative of the minimum of the variable effective aperture value with the the diaphragm aperture fully open. In case such interchangeable lens is used, since it is completely prohibited to obtain the information for focus control when the signal is greater then the limit, it can be prevented to confuse the user with a change between the enabled and disabled conditions of the automatic focus control in the process of using the camera.

According to a further feature of the present invention, in a camera in which means for obtaining an information of focus condition is controlled by sequence control means for controlling the total camera operation sequence, said obtaining means can be controlled without said sequence control means by selecting a possible operation mode. By this arrangement, the obtaining means can be enabled in the manufacturing process for its adjustment, so that a disadvantage that the obtaining means of the camera can not be adjusted until the sequence control means is mounted in the camera is eliminated. In addition after the camera is entered in the market, the operation of the obtaining means can be adjusted or inspected independent of the total camera operation sequence.

According to a further feature of the present invention, in a camera comprising means for providing driving power corresponding to the information for focus control and means for informing said information sensibly, whereby the automatic focus control mode in which the providing means is operative and the manual focus control mode in which the providing means is inoperative can be selected as desired, under the manual focus control mode, the sensibly information means is enabled by manipulating either a manually operable member for a shutter release operation or another manually operable member for the exposure information setting, and under the automatic focus control mode, said providing means can be enabled only when the manually operable member for the shutter release operation is manipulated. The manual focus control can be performed by a manual focus adjustment in association with information obtained by the sensibly informing means. Therefore, it is desired that the sensibly informing means is already enabled when the user of the camera wishes to perform the manual focus control. By the arrangement as described above, since the sensibly informing means is already enabled by the manipulation of the manually operable member for the exposure information setting which is expected to be practiced prior to the focus adjustment, the user of the camera directly can perform the focus adjustment without a further operation for enabling the sensibly informing means by means of the manipulation of the manually operable member for the shutter release operation. On the other hand, under the automatic focus control mode, it is desired to begin the automatic focus adjustment when the user of the camera sets the shutter release operation. On the contrary, if the automatic focus adjustment begins upon the exposure information setting, the user of the camera may be confused. According to the feature of the invention said providing means can not be enabled by the manipulation of the manually operable member for the exposure information setting so that the confusion described above can be effectively prevented.

BRIEF EXPLANATION OF THE DRAWINGS

FIG. 5 is a schematic diagram showing the circuit relating to microcomputer $MC_2$ of FIG. 1 when it is operated independently from microcomputer $MC_1$ and FIGS. 6(A)-6(E), 7(A)-7(F), 8(A)-8(G), 9(A)-9(F), 10(A)-10(D), and 11(A)-11(D) are flow charts showing the operation of microcomputer $MC_2$ in association with FIGS. 1 and 5.

DESCRIPTION OF THE PREFERRED EMBODIMENT

Figure 1A:
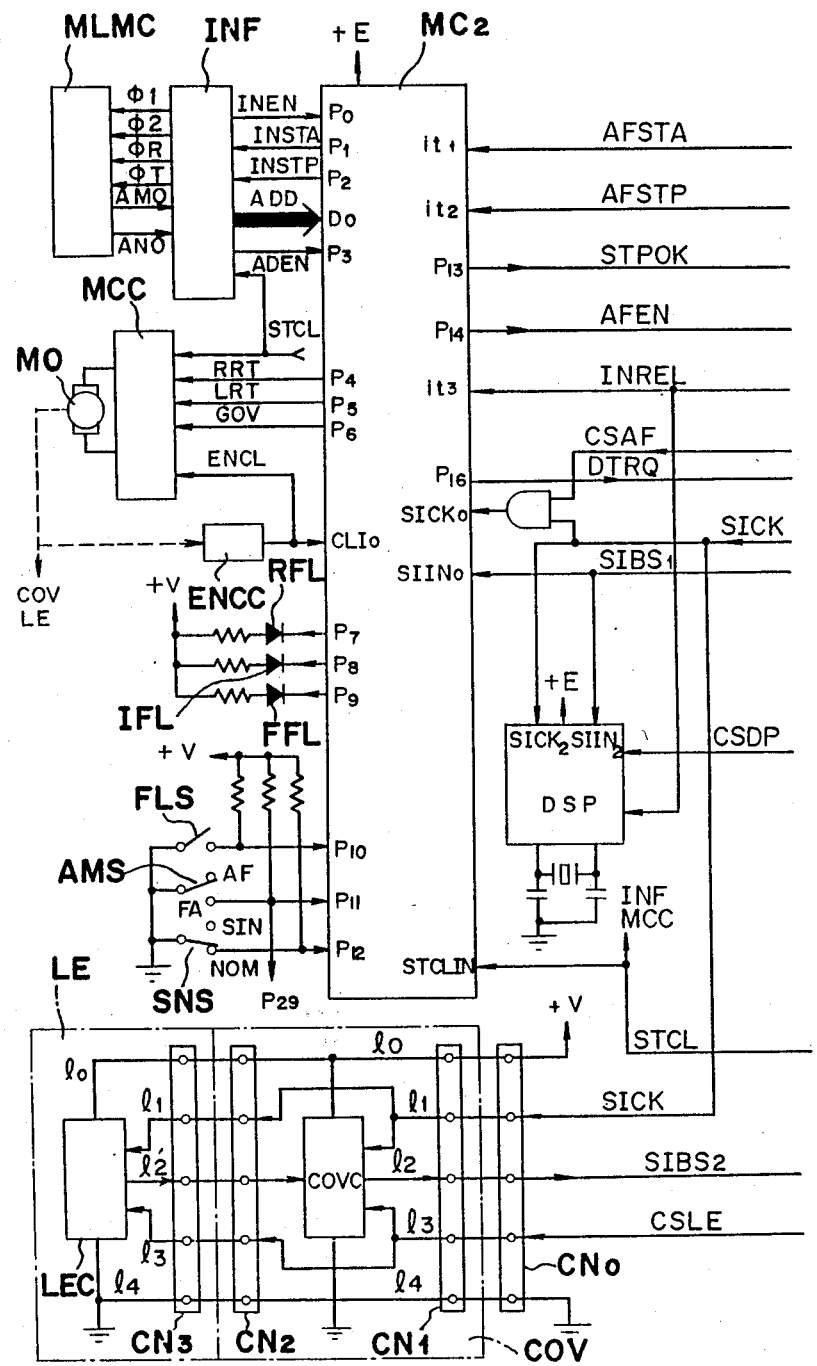
FIG. 1 comprised of FIGS. 1(A) and 1(B) is a schematic diagram showing a circuit arrangement of an automatic focus control camera according to the present invention.
Figure 1B:
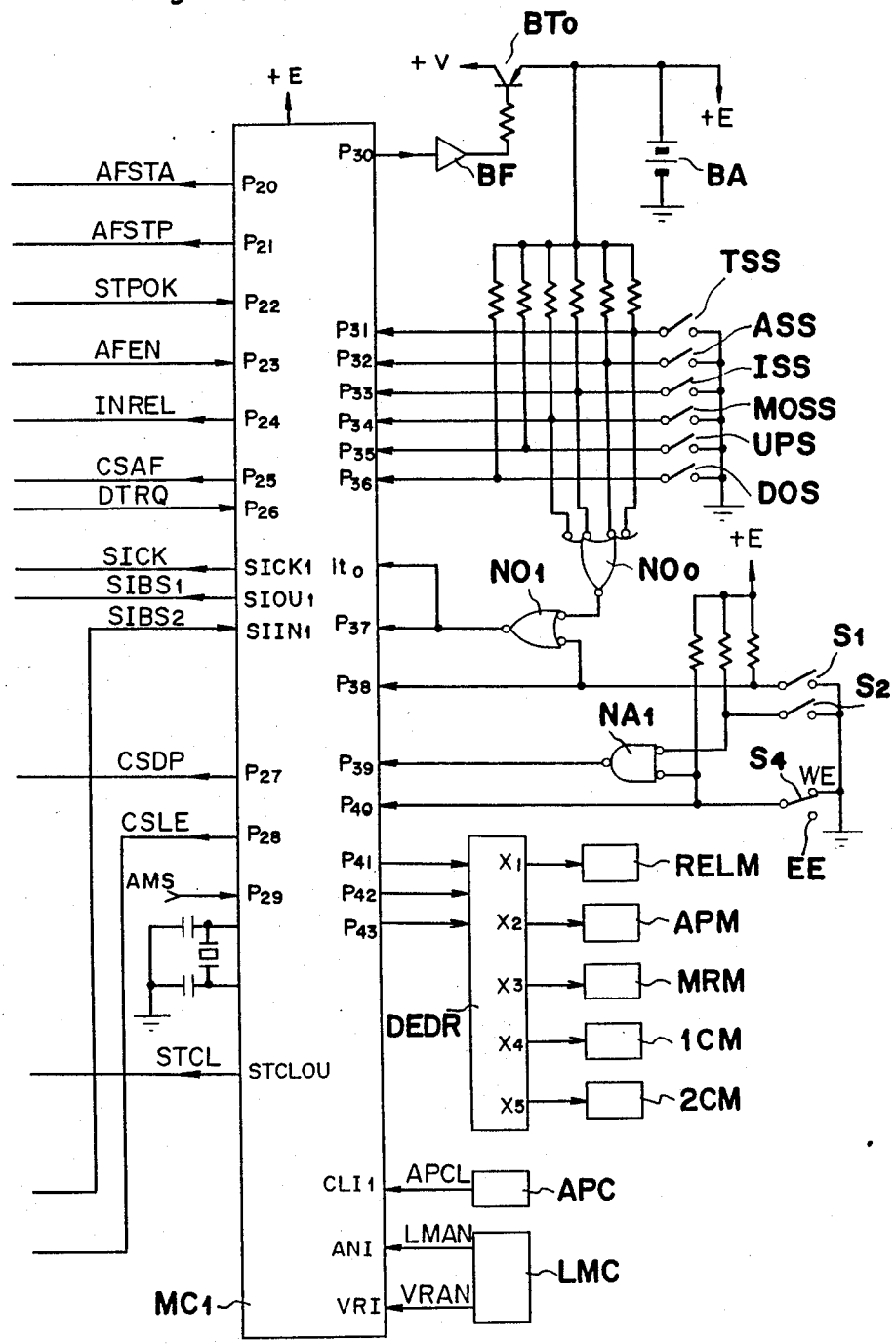
Figure 2A:
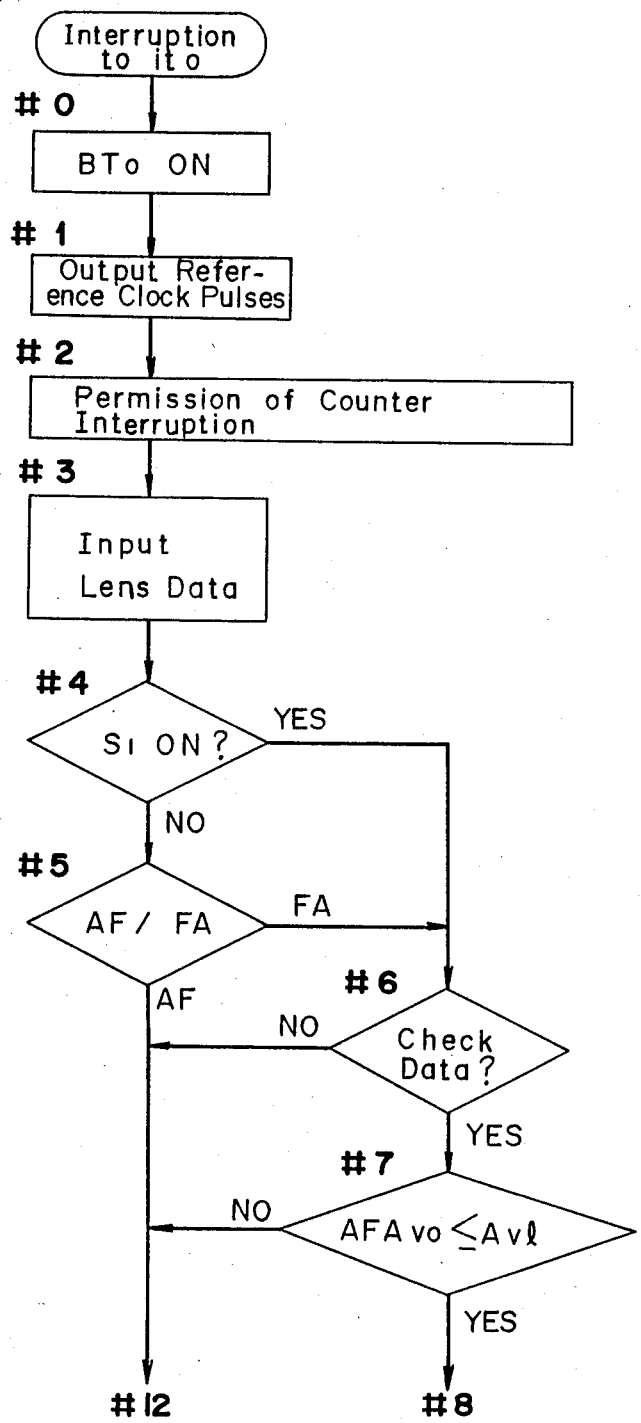
FIGS. 2(A)-2(H) and 3(A)-3(E) are flow charts showing the operation of the circuit arrangement shown in FIG. 1, FIG. 4(A) and 4(B) are a schematic diagram showing the details of blocks LEC and COV of the automatic focus control circuit shown in FIG. 1.
Figure 2B:
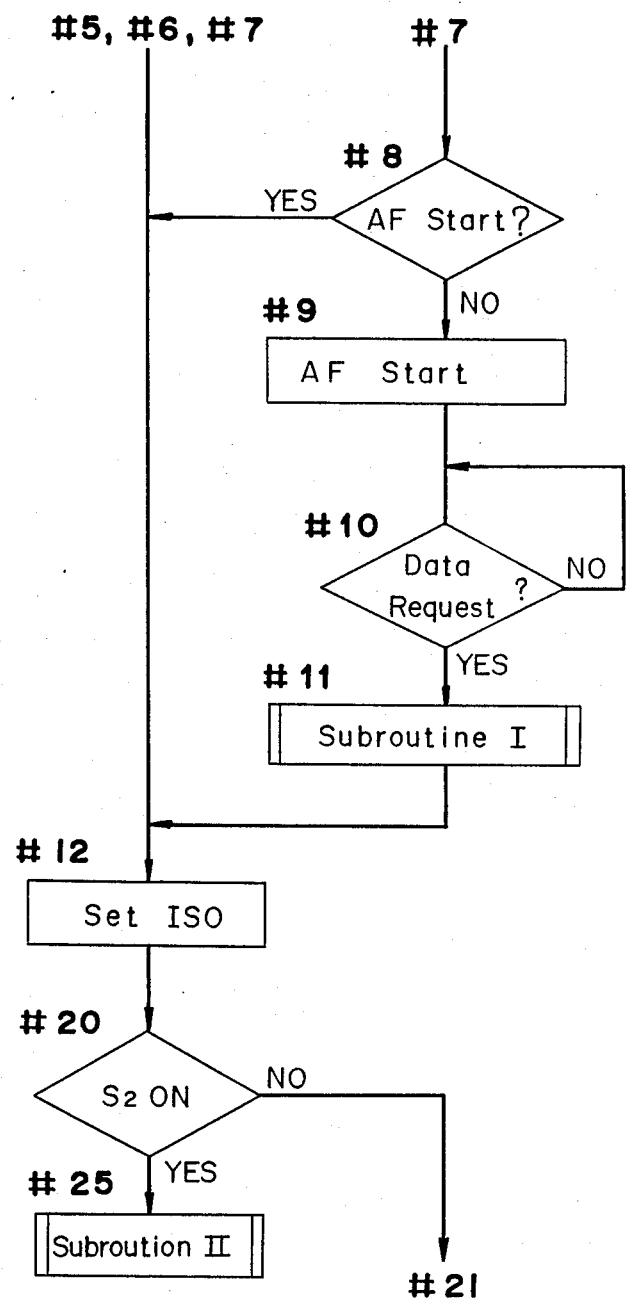
Figure 2C:
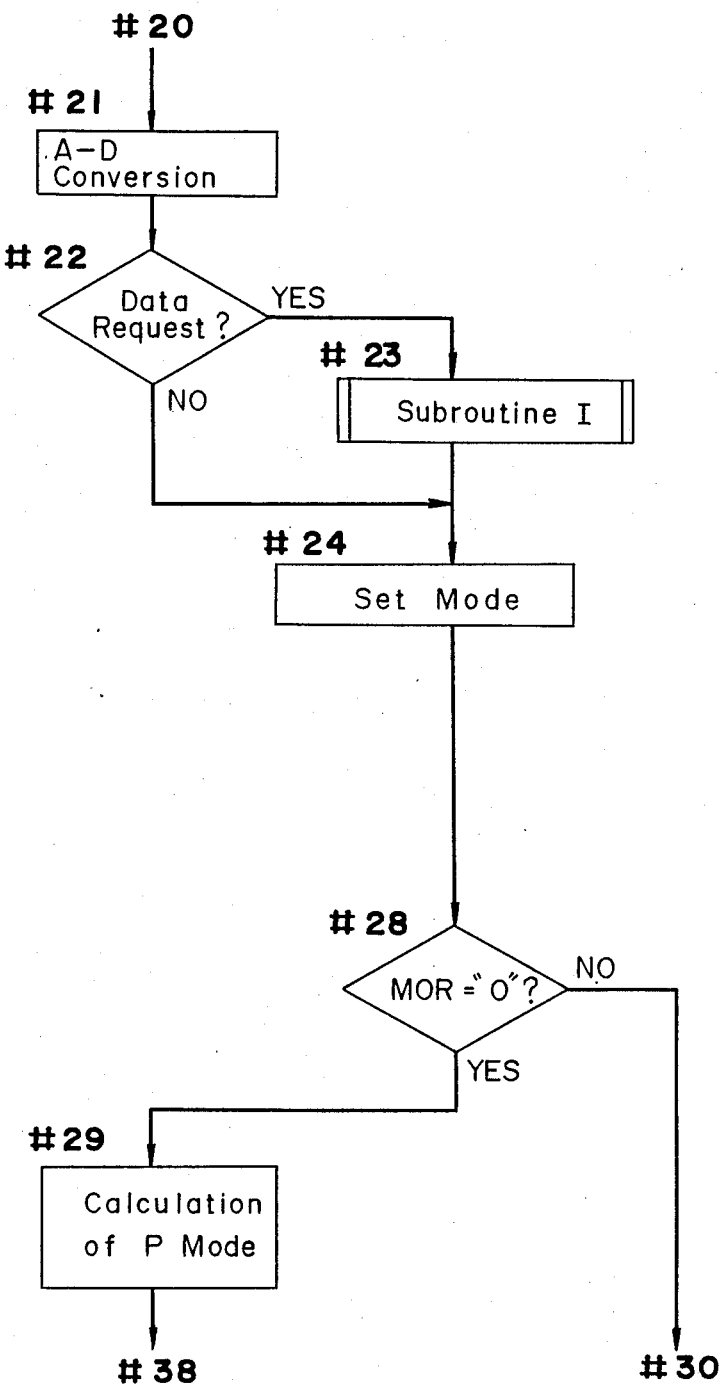
Figure 2D:
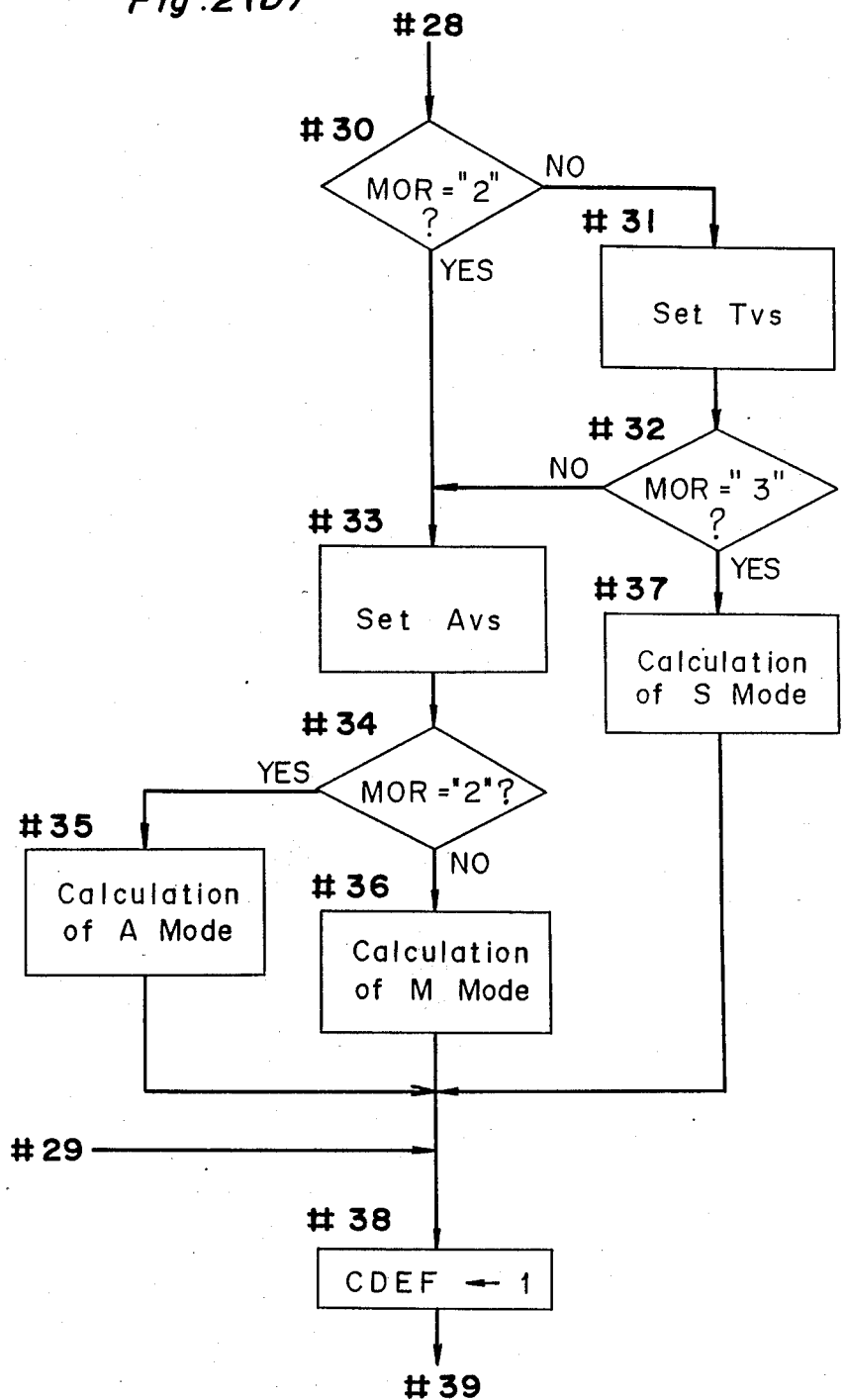
Figure 2E:
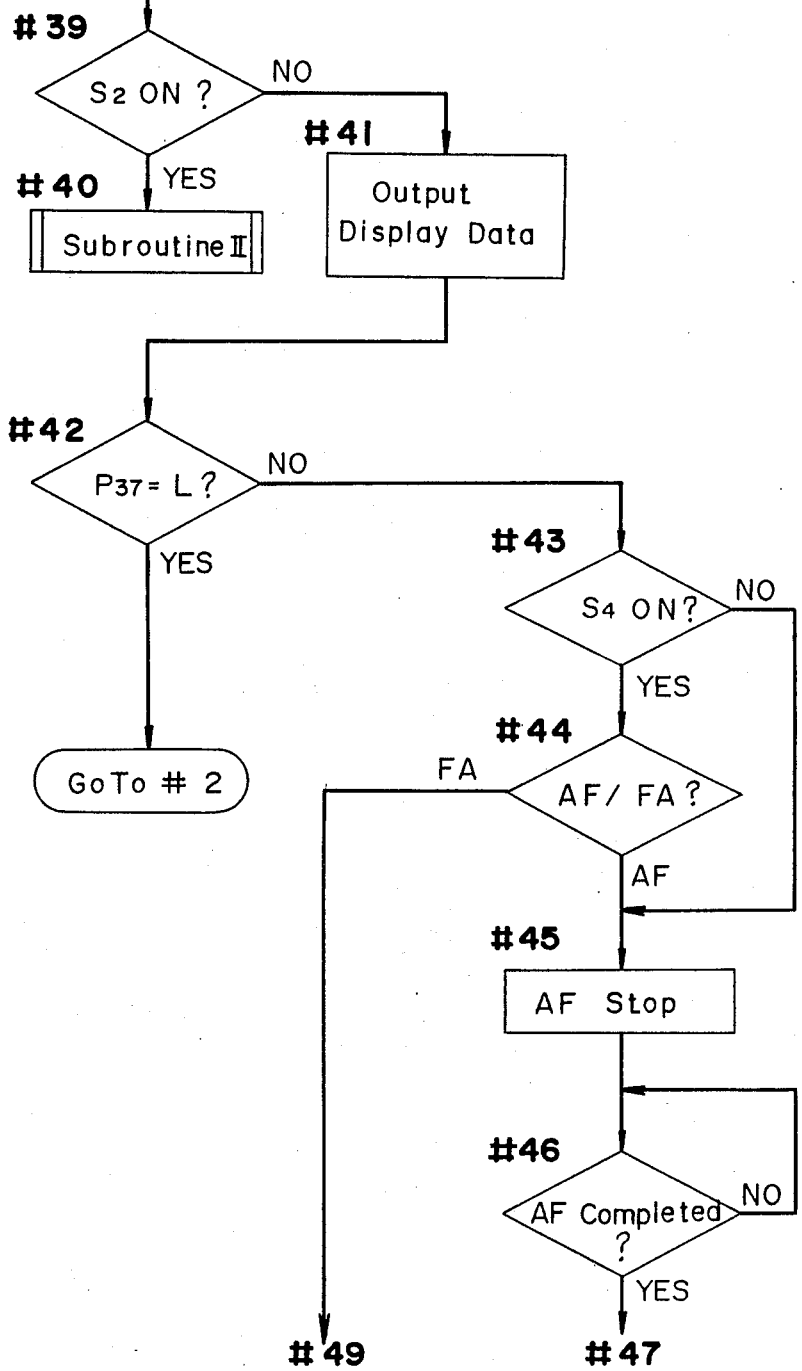
Figure 2F:
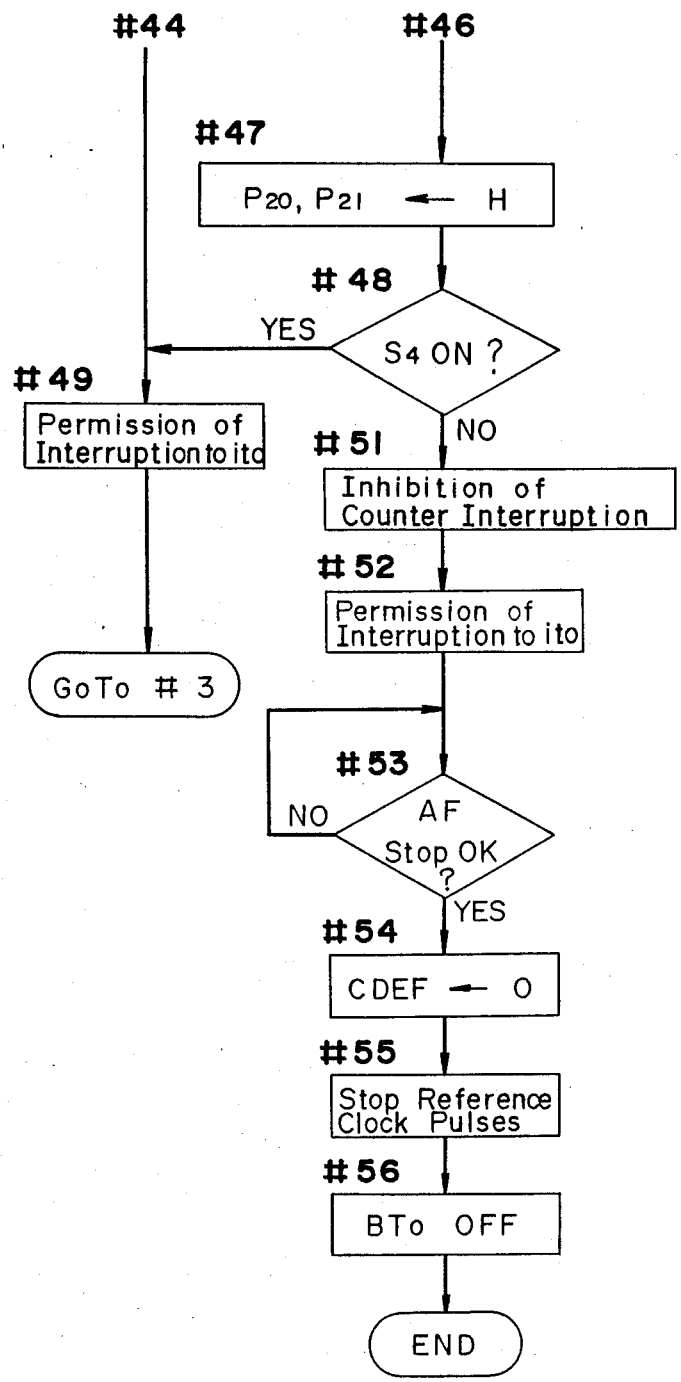
Figure 2G:
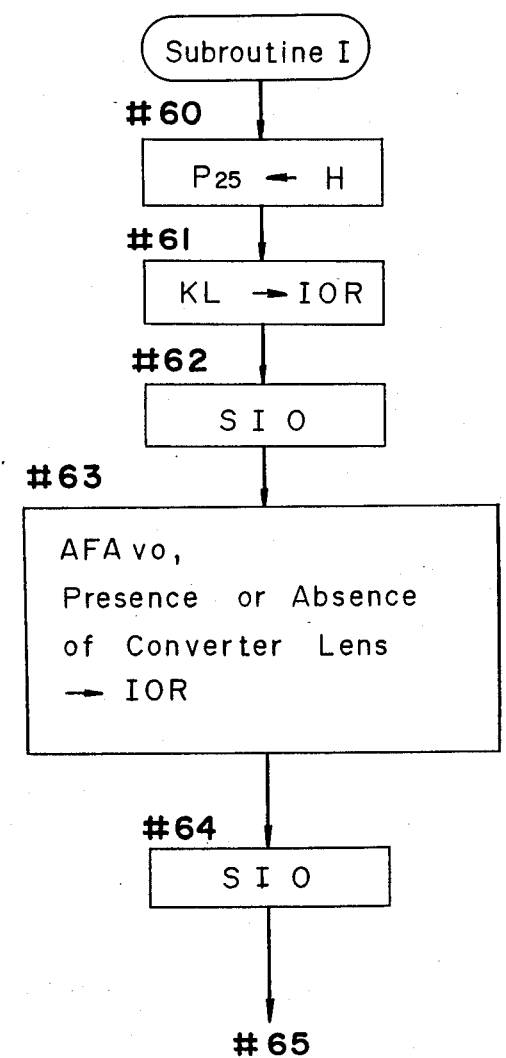
Figure 2H:
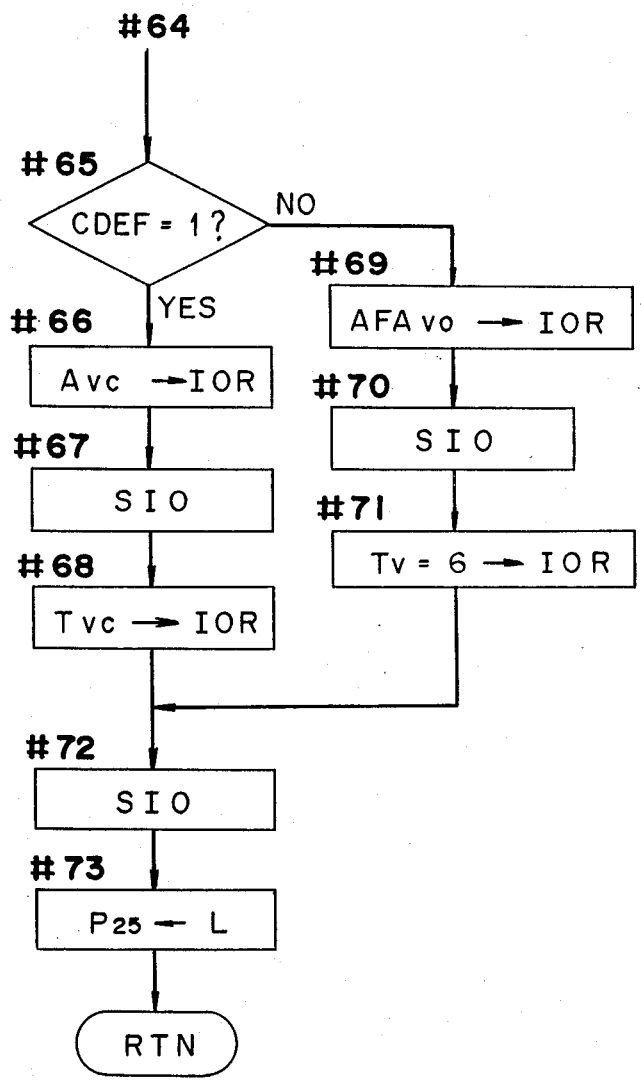

FIG. 1 is a circuit diagram showing a whole camera system according to the present invention. In the FIG. 1, BA denotes a D.C. power battery, the driving power is supplied through a driving power line $+E$ to a microcomputer $MC_1$ for controlling, a microcomputer $MC_2$ for detecting and adjusting a focal distance (the microcomputer $MC_2$ is called the AF microcomputer in the following), a display unit DSP, a buffer circuit BF, NOR gates $NO_0$, $NO_1$, a NAND gate $NA_1$, respective pull up resisters for pulling up for switches $S_1$, $S_2$, $S_3$, TSS, ASS, ISS, MOSS, UPS, POS.

$S_1$ denotes a switch for measuring a brightness of an object, which is closed when a shutter release button (not shown) of the camera is pushed down to a first depth. When the switch $S_1$ is closed, the output of the NOR gate $NO_1$ goes down to "Low" and the operation of the microcomputer $MC_1$ for controlling is set about after an interrupt signal is inputted to an interrupt terminal $it_0$ in the microcomputer $MC_1$. The switch TSS is closed when an exposure time is changed. (The switch TSS is called the Tv switch in the following.) The switch ASS is closed when an effective aperture value is changed. (The switch ASS is called the Av switch in the following.) The switch ISS is closed when a sensitivity ISO of a used film is changed. (The switch ISS is called the Sv switch in the following.) The switch MOSS is closed when an exposure control mode is changed. (The switch MOSS is called the mode switch in the following.) When these switches TSS, ASS, ISS and MOSS are closed, an output of a NOR gate $NO_1$ goes down to "Low", whereby an output of the NOR gate $NO_1$ down to "Low", and the interrupt signal is also inputted to the interrupt terminal $it_0$ of the microcomputer $MC_1$ and the operation of the microcomputer $MC_1$ is set about. UPS is a switch for increasing data. (The switch UPS is called the UP switch in the following.) DOS is a switch for decreasing data. (The switch DOS is called the DOWN switch in the following.) $S_2$ is a release switch which is closed when the shutter button is pushed down to a second depth which is deeper than the first depth. $S_4$ is a reset switch, which is changed over to a terminal EE after the exposure controlling operation is completed. Said switch $S_4$ is changed over to a terminal WE after charging in an exposure control mode is completed.

Figure 3:
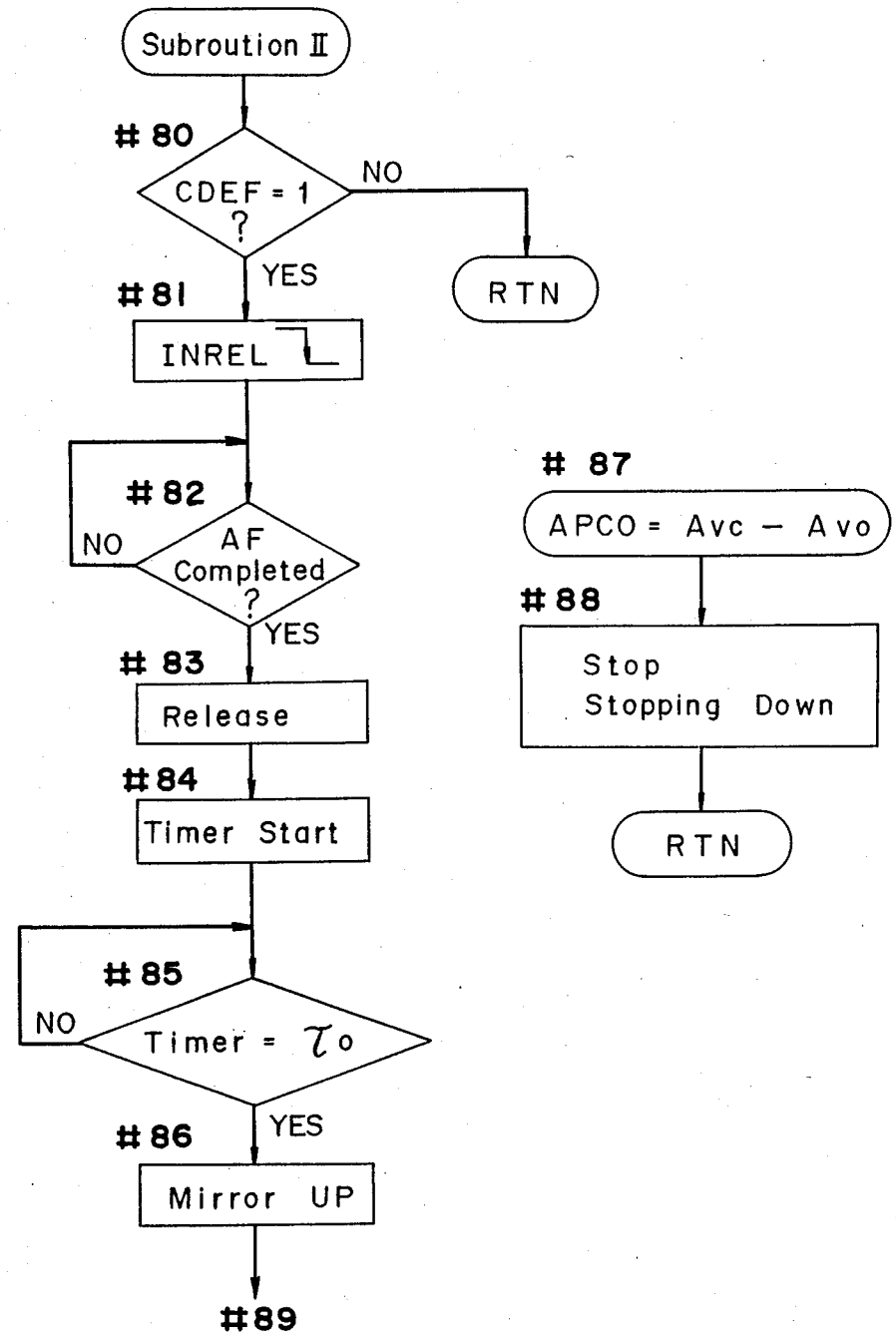
Figure 3B:
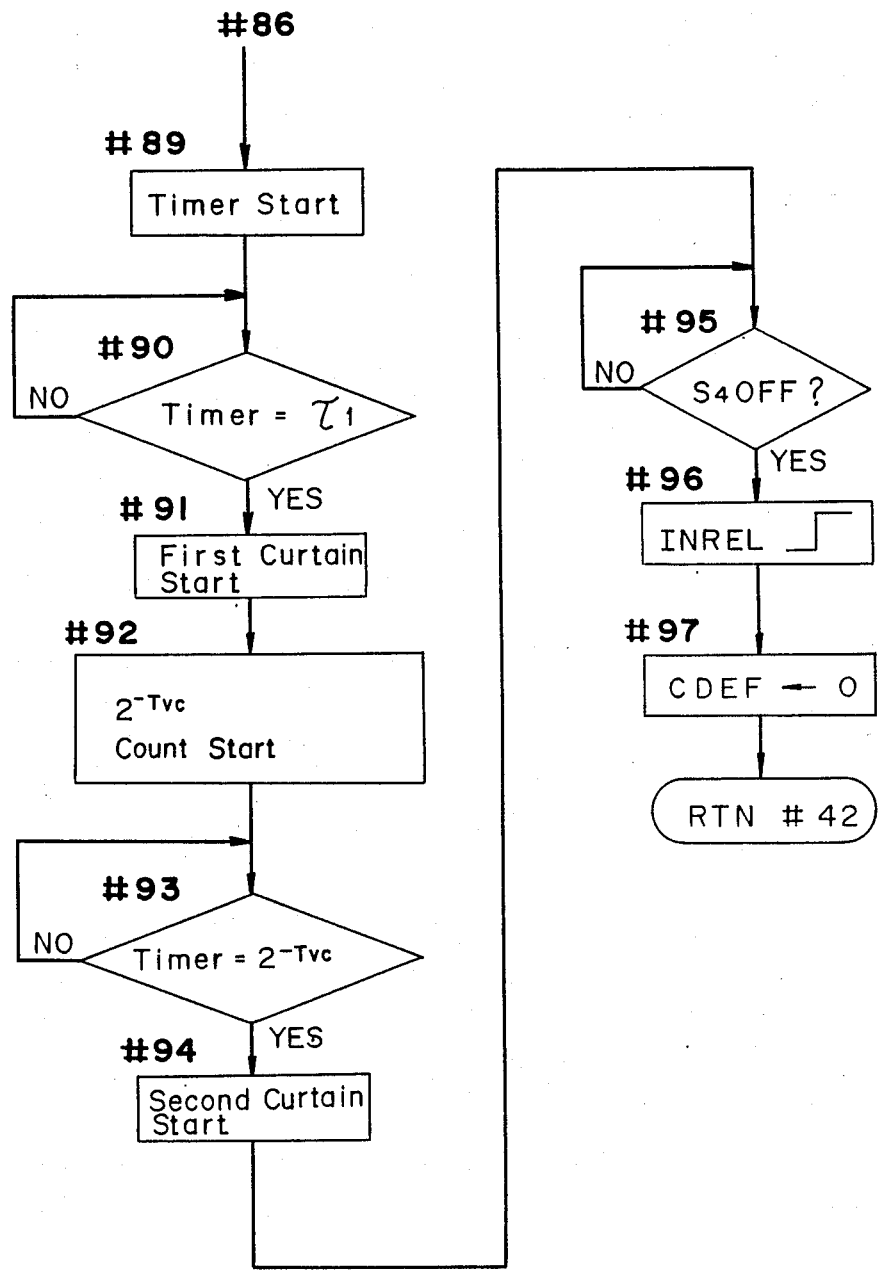
Figure 3C:
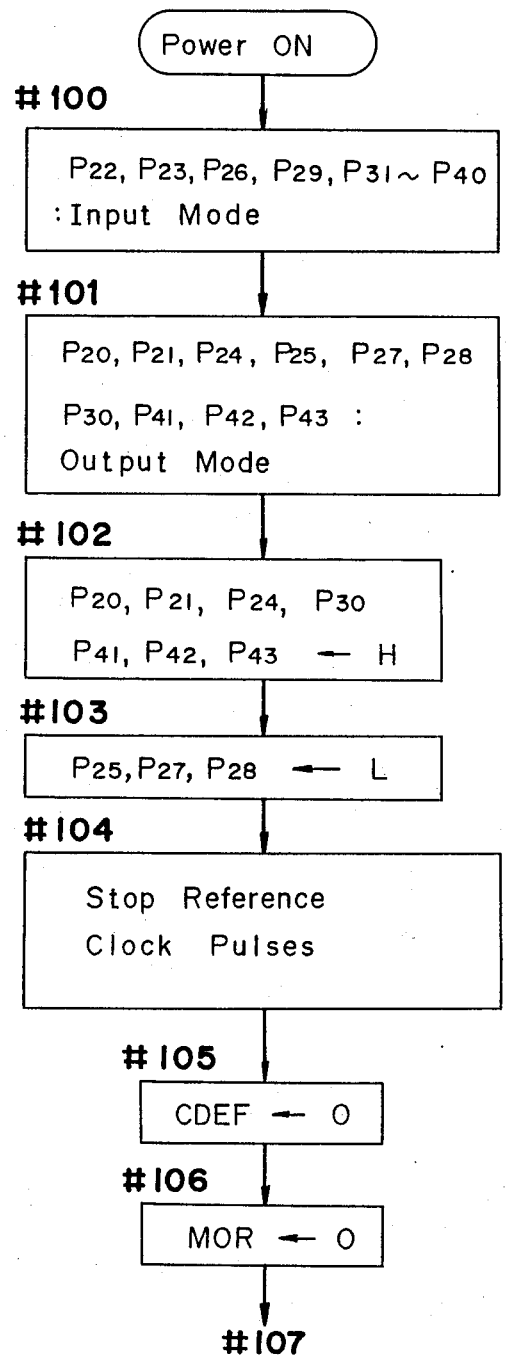
Figure 3D:
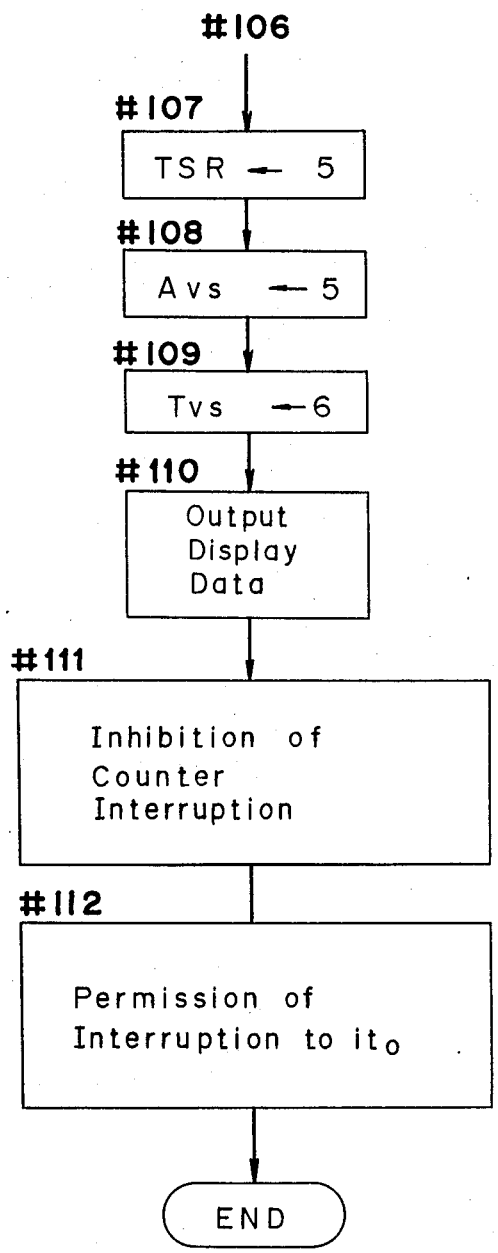
Figure 3E:
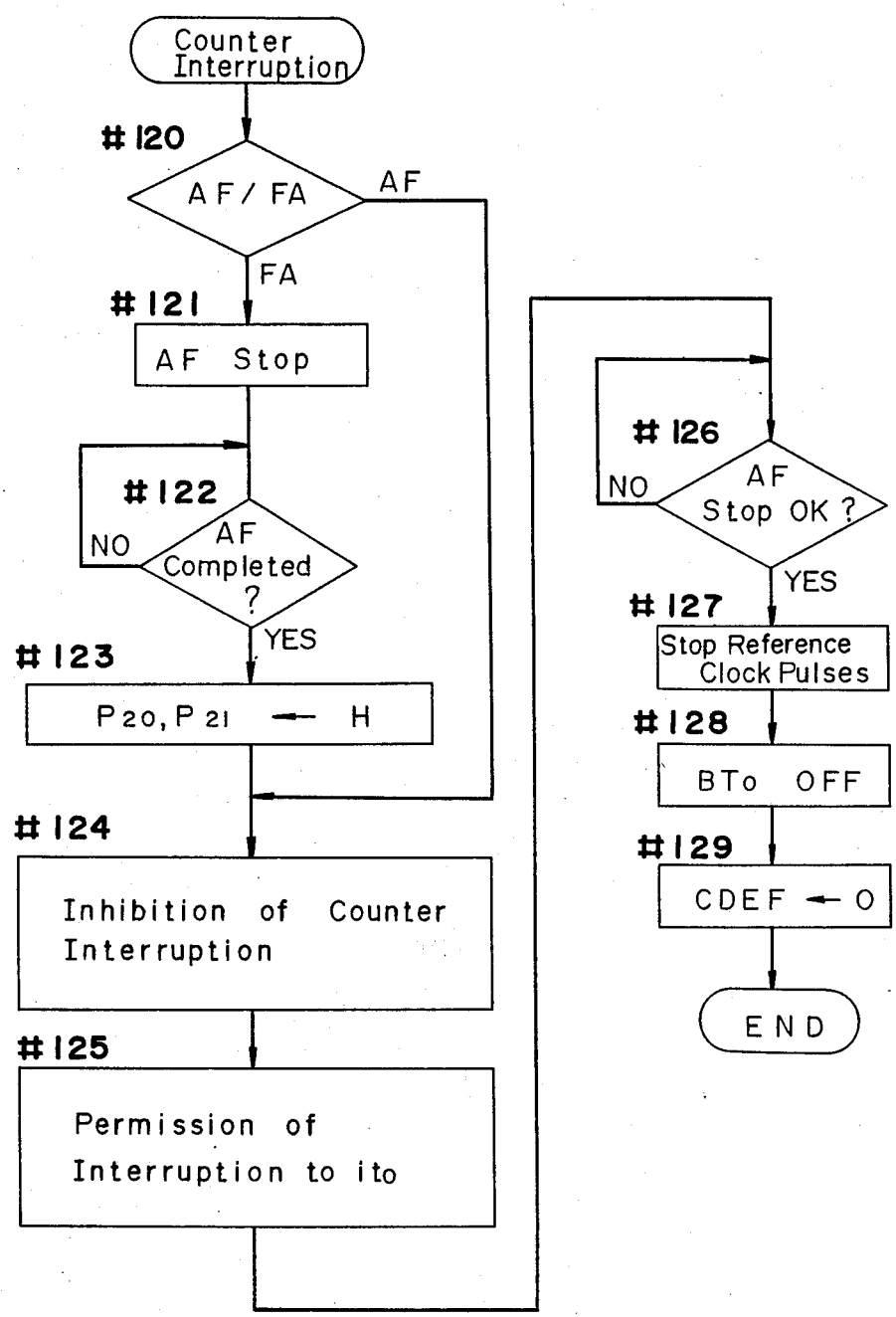

FIGS. 2 and 3 are flow charts showing the operation of the microcomputer $MC_1$. In the following, referring to FIGS. 2 and 3, the operation of the camera system in FIG. 1 will be described. When the driving power is supplied through the driving power line $+E$ after the battery BA is mounted in the camera, the microcomputer $MC_1$ is set about from the step #100 in FIG. 3. First of all, at the step #100 ports $P_{22}$, $P_{23}$, $P_{26}$, $P_{29}$ and $P_{31} \sim P_{40}$ of the microcomputer $MC_1$ are designated as an input mode, and at the step #101 ports $P_{20}$, $P_{21}$, $P_{24}$, $P_{25}$, $P_{27}$, $P_{28}$, $P_{30}$, $P_{41}$, $P_{42}$ and $P_{43}$ designated as an output mode. The ports $P_{20}$, $P_{21}$, $P_{24}$, $P_{30}$, $P_{41}$, $P_{42}$ and $P_{43}$ designated as the output mode are initialized "High". On the other hand, the ports $P_{25}$, $P_{27}$ and $P_{28}$ designated as the output mode are initialized "Low". The microcomputer $MC_1$ acts to stop the generation of reference clock pulses STCL from a terminal STCLOU. Then a flag CDFF is reset and a mode register MOR is set by "0". The flag CDFF is set to "1" when a computation of the exposure control value is completed. Under this state, the content of the register MOR is set by the data designating the exposure control mode, wherein "0" designates a program exposure control mode (referred to as a P mode in the following), "3" designates an automatic control mode of adjusting the effective aperture value with an exposure time priority (referred to as a S mode in the following), "2" designates an automatic control mode of the exposure time with adjusting the effective aperture value priority (referred to as a A mode in the following), "1" designates a manual setting mode of adjusting the effective aperture value and the exposure time (referred to as a M mode in the following). Next, at the step #107, the data of the film sensitivity ISO 100 (Sv=5) is set in a register for film sensitivity data TSR, then the data of F5.6 (Av=5) is set as a setting effective exposure value Avs at the step #108 and the data of 1/60 sec (Tv=6) is set as a setting exposure time Tvs at the step #109. At the step #110, it is displayed in the display unit DSP that the exposure mode is the P mode and the film sensitivity is ISO 100, the display of the effective aperture value and the exposure time are blanked, and the operation of the microcomputer $MC_1$ is stopped after it is inhibited for counters in the microcomputers to interrupt an interruption permission signal is inputted to the interrupt terminal $it_0$.

When one of the switch $S_1$ for measuring the brightness of the object, the Tv switch TSS, the Av switch ASS, the Sv switch ISS and the mode switch MOSS is closed, the microcomputer $MC_1$ is set about from the step #0 in FIG. 2 after the interrupt signal is inputted to the terminal $it_0$ in the microcomputer $MC_1$. At the step #0, the driving power is supplied from the driving power line +V after making the terminal $P_{30}$ "Low" a transistor $BT_0$ is turned on through the output of the buffer circuit BF. Next, the reference clock pulses are outputted from the terminal STCLOU to the AF computer $MC_2$, an interface circuit INF and a motor control circuit MCC. At the step #2, the content of a counter for the counter interruption in the microcomputer $MC_1$ is reset and the counter interruption is permitted, then at the step #3 the data of the exchangeable lens mounted in the camera is taken in.

Figure 4A:
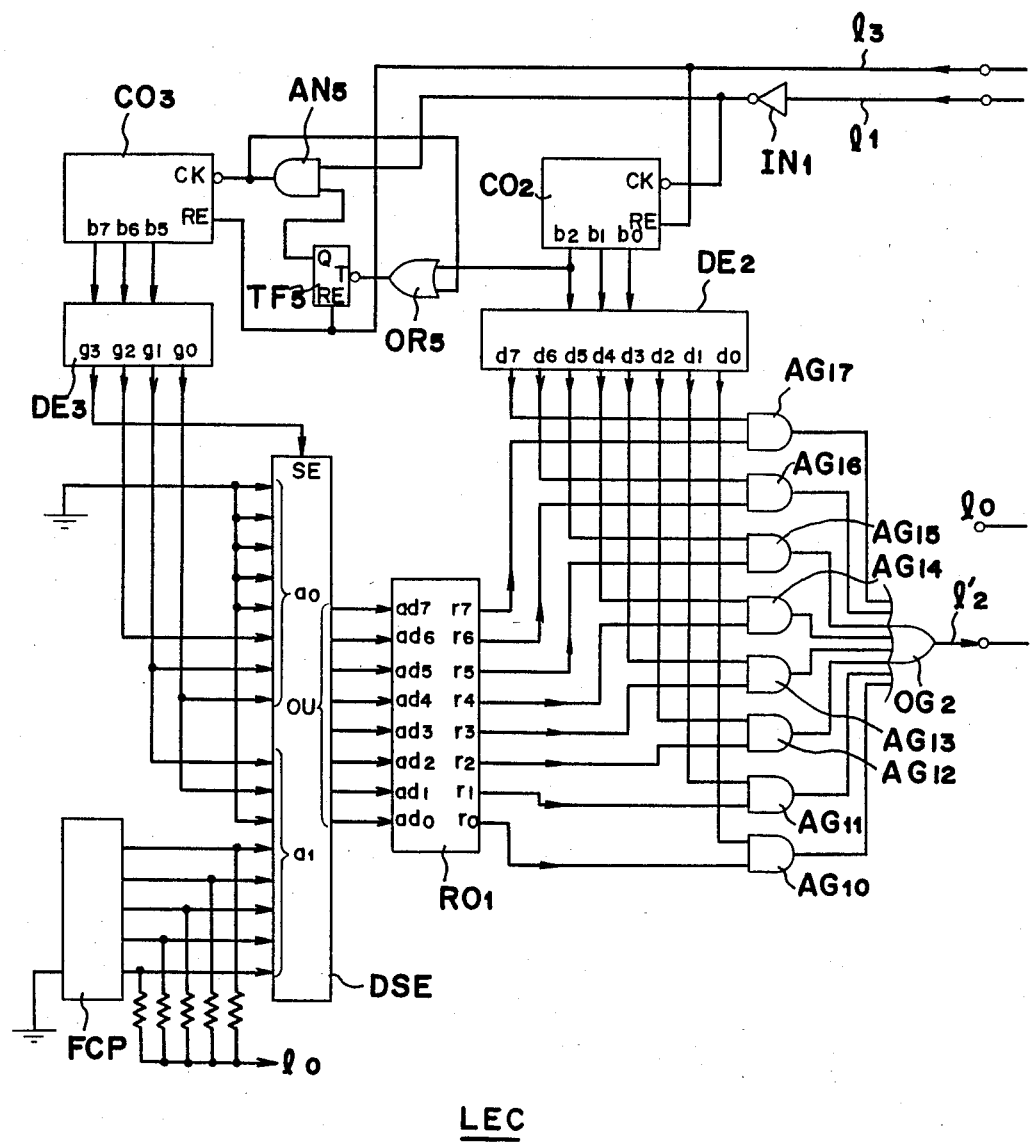
Figure 4B:
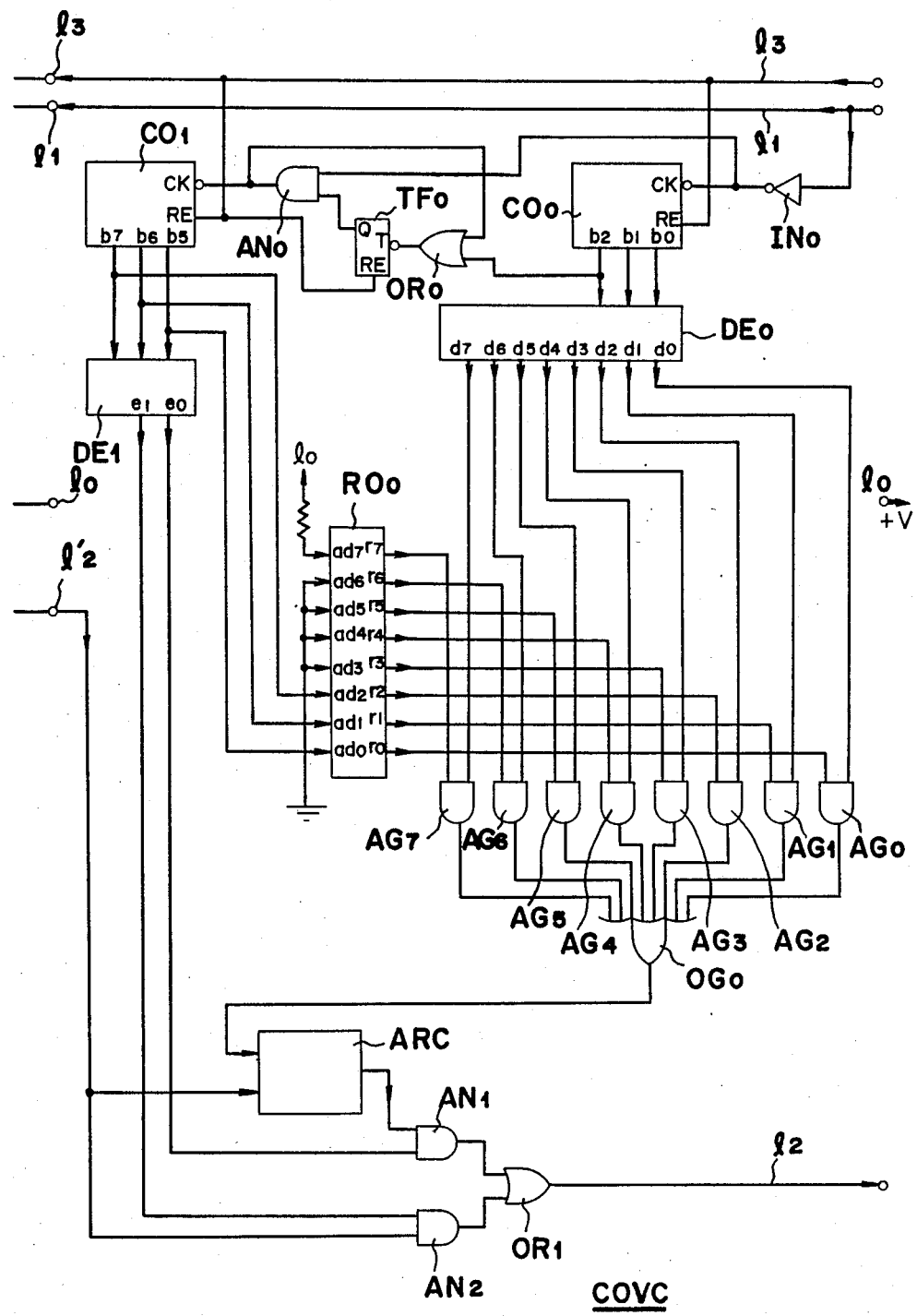

Referring to FIG. 4, a way of reading data of the mounted lens will be explained. In the lower part of the left hand side of FIG. 1, a block surrounded by one dashed chain line is the circuit diagram provided in the exchangeable lens, wherein COV is a converter circuit for use in such as a teleconverter lens arranged between the body of the camera and the exchangeable lens. One example of these circuits are shown in FIG. 4. When the microcomputer MC1 reads the data of the lens, the terminal $P_{28}$ is made "Low" and the microcomputer $MC_1$ cancels the reset condition of counters $CO_0$, $CO_1$, $CO_2$, $CO_3$ and T type flip flop $TF_0$, $TF_5$. Next, the computer $MC_1$ performs the input and output operation in series, that is, the eight pulses of the serial clock SICK are outputted from the terminal $SICK_1$, the counters $CO_0$ and $CO_2$ count the said clock pulses through the inverter $IN_0$ and $IN_1$. Decoders $DE_0$, $DE_2$ make "High" terminals $d_0 \sim d_7$ in turn and make respective AND gates $AG_0 \sim AG_7$ and $AG_{10} \sim AG_{17}$ enable state, then the decoders $DE_0$, $DE_2$ output the data outputted from ROMs $RO_0$ and $RO_1$ in series in turn from the lowest bit through OR gates $OG_0$, $OG_2$. The Q outputs of the respective T type flip flops $TF_0$ and $TF_5$ become "High" at the positive edge of the eighth clock pulse (at the negative edge in the output of the inverter) after terminals $b_2$ of the counters $CO_0$ and $CO_2$ goes down to "Low". After that, the Q outputs of the T type flip flops $TF_0$ and $TF_5$ become "Low" at the positive edge of the next clock pulse. Then the counter $CO_1$ counts the said negative edge of the Q output of the flip flop $TF_0$.

TABLE 1

| $b_7$ | $b_6$ | $b_5$ | $g_3$ | $g_2$ | $g_1$ | $g_0$ | Address | Data |
|---|---|---|---|---|---|---|---|---|
| 0 | 0 | 0 | 0 | 0 | 0 | 0 | 00H | Check data |
| 0 | 0 | 1 | 0 | 0 | 0 | 1 | 01H | Minimum F number Avo |
| 0 | 1 | 0 | 0 | 0 | 1 | 0 | 02H | Maximum effective aperture value Avmax |
| 0 | 1 | 1 | 0 | 0 | 1 | 1 | 03H | Minimum F number AFAvo for the AF operation |
| 1 | 0 | 0 | 0 | 1 | 0 | 0 | 04H | Eclipse data 00H |
| 1 | 0 | 1 | 1 | 0 | 0 | 0 | 000***** | Conversion factor kL |
| 1 | 1 | 0 | 1 | 0 | 0 | 1 | 001***** | Focal length fv |
| 1 | 1 | 1 | 1 | 0 | 1 | 0 | 010***** | Changed in aperture value according to zooming dAv |

*****Output of zoom code plate

TABLE 2

| $b_7$ | $b_6$ | $b_5$ | $e_1$ | $e_0$ | Address | Data | Output data |
|---|---|---|---|---|---|---|---|
| 0 | 0 | 0 | 0 | 1 | 80H | * | Check data |
| 0 | 0 | 1 | 0 | 1 | 81H | * | Avo |
| 0 | 1 | 0 | 0 | 1 | 82H | * | Avmax |
| 0 | 1 | 1 | 1 | 0 | 83H | 80H+dAvc | AFAvo+80H+dAvc |
| 1 | 0 | 0 | 1 | 0 | 84H | Avoc | Avoc |
| 1 | 0 | 1 | 1 | 0 | 85H | kC | kL+kC → kL |
| 1 | 1 | 0 | 1 | 0 | 86H | fvc | fv+fvc → fv |
| 1 | 1 | 1 | 1 | 0 | 87H | dAvc | dAv+dAvc → dAv |

*The data are transferred from the lens to the body of the camera.

TABLE 3

| $b_7$ | $b_6$ | $b_5$ | Address | Data |
|---|---|---|---|---|
| 0 | 0 | 0 | 00H | Check data |
| 0 | 0 | 1 | 01H | Avo |
| 0 | 1 | 0 | 02H | Avmax |
| 0 | 1 | 1 | 03H | AFAvo |
| 1 | 0 | 0 | 04H | 00H |
| 1 | 0 | 1 | 05H | kL |
| 1 | 1 | 0 | 06H | fv |
| 1 | 1 | 1 | 07H | 00H |

Table 1 shows the correlation between the outputs of the counter $CO_3$ and the decoder $DE_3$ and the address and data of ROM $RO_1$ in a lens circuit LE in case the interchangeable objective lens is a zoom lens. Table 2 shows the correlation between the outputs of the counter $CO_1$ and the decoder $DE_1$ and the address and data of ROM $RO_0$ in the converter lens COV.

Table 3 shows the relation between the address and the data in case the interchangeable objective lens is a lens with a fixed focal length in comparison with Table 1.

In Tables 1, 2 and 3, the check data is the common data in all kinds of the lens to be mounted to the camera, which is used for checking whether or not the interchangeable objective lens suitable for the system of the present embodiment is mounted properly to the body of the camera. Avo is a fully open aperture value at the shortest focal length (which is the smallest fully open aperture value) in case the used interchangeable objective lens is a zoom lens which changes the effective aperture value corresponding to the change in focal length, and Avo is also a fixed fully open aperture value in case the interchangeable objective lens is a lens such as a lens with a fixed focal length or a zoom lens, which does not change the effective aperture value according to the change in focal length. Avmax is the maximum effective aperture value, which is the fixed maximum effective aperture value or the maximum effective aperture value at the shortest focal length, similarly in the case of the fully open aperture value. When the lens is mounted on the camera through the converter lens COV, the three data are directly transferred to the camera because the data are outputted through the AND gate $AN_2$ and the OR gate $OR_1$. In Table 2, "address" and "data" represent the address and the data in the ROM of the converter lens COV, and "output data" represents the data transmitted to the camera body from the converter lens COV.

AFAvo is the minimum F number relating to the detection of an information for automatic focal control through the lens and its diaphragm. AFAvo is identical with Avo when the interchangeable objective lens is a lens with a fixed focal length or a zoom lens with its effective aperture value unchangeable in response to the zooming. And AFAvo corresponds to a fully open aperture value at the longest focal distance (which is the greatest fully open aperture value) in case the interchangeable objective lens is a zoom lens which changes the effective aperture value in accordance with the zooming. Moreover, AFAvo corresponds to the greatest fully open aperture value in case the interchangeable objective lens is a lens which changes the effective aperture value in accordance with the focusing. The data of AFAvo is outputted after it is added to the data 80H+dAvc from the ROM $RO_0$ in the converter lens COV in the serial addition circuit ARC if the converter lens COV is used. dAvc means the change in the effective aperture value caused by using the converter lens COV, 80H represents that the converter lens COV is mounted by the data "1" in the most significant bit of the one byte data.

Next, OOH is outputted from the ROM $RO_1$ in the lens LE and Avoc is outputted from the ROM $RO_1$ in the converter lens COV, both as an eclipse data. The eclipse data means a threshold value of the effective aperture value that the incident light to the body of the camera through the lens is eclipsed by the converter lens COV when the converter lens COV is arranged between the interchangeable objective lens and the body of the camera. Therefore, when the converter lens COV is mounted, the both eclipse data are added and the eclipse data Avoc, which is the sum of the addition, is inputted to a circuit arranged in the body of the camera. In case the converter lens COV is not mounted, the data OOH outputted from the lens circuit LE is inputted to the circuit in the body of the camera. A conversion factor kL predetermined in the used lens is outputted from the ROM $RO_1$ in the used lens, which means the conversion factor to convert from a defocused quantity of the lens calculated by the AF microcomputer $MC_2$ to the the number of the rotation of the AF motor for controlling a position of the optical system for the automatic focus adjustment. The defocused quantity is representative of the difference between the position of the image of an object to be focused and a surface to which the image should be in focus. The defocused quantity is measured by a focus detecting device provided in the body of the camera. The degree of the rotation of the AF motor (the motor for automatic focus control) necessary to reduce the defocusing quantity to zero by means of the focus adjustment caused by the AF motor is different in each interchangeable objective lens. The factor used in conversion of the defocusing quantity into the degree of the rotation of the AF motor is referred to as the conversion factor. As the data of the conversion factor kL changes in accordance with the focal length in a zoom lens, the data representing the conversion factor kL is obtained at an address of $RO_1$ designated by a zoom code plate FCP. The data of the conversion factor kL is added to a conversion factor kC for the converter lens COV outputted from the ROM $RO_0$, then the added data is sent to the circuit in the body of the camera. Each of the data for kL and kC consists of a significant figure and an exponent part, the data in said each part are added respectively in the above addition in the converter lens COV. Then the data are converted to the value kL in decimal system, and the calculation of $kL \times kB$ (wherein kB represents the conversion factor relating to the body of the camera) is performed to obtain the conversion factor k relating to the whole camera system in the AF microcomputer $MC_2$.

The data fv of the focal length (which is manually set when the interchangeable objective lens is a zoom lens, or fixed when the interchangeable objective lens is a lens with a fixed focal length) is outputted from the $RO_1$ which is transmitted to the converter lens COV, then the data fv is added to data fvc which is a change in the focal length fv caused by the mounting of the converter lens COV, and the added data is outputted to the circuit in the body of the camera. The data dAv which is the difference between the effective aperture value at the shortest focal length and the effective aperture value at the set focal length (in case of a zoom lens) is outputted from the $RO_1$, which is transmitted to the circuit in the converter lens COV, then the data dAv is added to the data dAvc which is the change in aperture value of the interchangeable objective lens caused by the use of the converter lens COV, and the added data is inputted to the circuit in the body of the camera. In the body of the camera, the value of Avo+dAv+dAvc is set as the effective fully open aperture value in the whole optical system, and the value of Avmax+dAv is set as the maximum effective aperture value. In case the converter lens COV is not arranged, dAvc=0. In case a zoom lens which does not change the effective aperture value in zooming, dAv=0.

In the flow chart shown in FIG. 2, after the input operation of the lens data is completed, at the step #4, it is determined whether the switch $S_1$ for measuring the brightness is closed or not. In case the switch $S_1$ is closed, the program flow goes to step #6, on the other hand, in case the switch $S_1$ is open, the program flow goes to step #5. At the step #5, it is determined whether the performing mode is an AF mode (automatic focus control mode) or a FA mode (focus aid mode in which the focus adjustment is manually made with the aid of the focus detection signal) by detecting the input level to the terminal $P_{29}$. In case the performing mode is the FA mode, the program flow goes to the step #6, on the other hand, in case it is the AF mode, the program flow goes to the step #12. The determination of the AF mode or the FA mode is performed by way of the following operation, that is, the FA mode is performed and AF mode is not performed when the switches TSS, ASS, ISS, MOSS, UPS and DOS except the switch $S_1$ for measuring the brightness of the object are closed and the microcomputer for controlling $MC_1$ begins to be operated.

At the step #6, it is determined whether the check data is inputted from the circuit in the lens LE, in case the check data is not inputted, the operation of the AF mode or the FA mode is not performed because the lens is not mounted, then the program flow goes to the step #12. In case the check data is inputted, the program flow goes to the step #7, then AFAvo or AFAvo+ dAvc is compared with the effective aperture threshold value for calculating the defocusing quantity for the AF mode or the FA mode, that is, it is determined whether the value of AFAvo or AFAvo+dAvc is more than the effective aperture threshold value such as Av=5 (in case of F5.6) or not. In case the value of AFAvo or AFAvo+dAvc is less than the effective aperture threshold value, the AF mode and the FA mode is not performed because it is impossible to measure the defocusing quantity, then the program flow goes to the step #12. The reason why the data of the maximum F number (the effective aperture value at the longest focal distance) is set as the value of AFAvo is as follows. That is, it is impossible to adjust and detect the focal distance because the effective aperture value is more than the effective aperture threshold value on the way that the focal distance is changed from the shortest focal distance to the longest focal distance. Therefore, it is inhibited to perform the AF mode and FA mode in order to prevent the operation of the camera from being stopping suddenly during the operation of the AF mode and the FA mode.

At the step #8, it is determined whether the level at the terminal $P_{20}$ is "High" or "Low", that is, whether the operation of the AF microcomputer $MC_2$ is set about or not. In case the operation of the AF microcomputer $MC_2$ is set about, the program flow goes to the step #12. On the other hand, in case the operation has not been set about. The terminal $P_{20}$ is made "Low" and the interrupt signal is inputted to the interrupt terminal $it_1$ in the AF microcomputer $MC_2$, then the operation of the AF microcomputer $MC_2$ is set about. The operation of the subroutine I is set about after a data request signal DTRQ is inputted to the terminal $P_{26}$ from the AF microcomputer $MC_2$.

In the subroutine I, the required data is transferred to the AF microcomputer $MC_2$ in series in accordance with the said data request signal. First of all, the terminal $P_{25}$ is made "High" at the step #60, and the conversion factor kL is set in a resistor IOR used for the SIO operation at the step #61, then the operation of the SIO is performed. Next, AFAvo and the data (80H) which means the presence of the converter lens COV is set in the resistor IOR, and the SIO operation is performed. Then it is determined whether or not a flag CDEF which designates whether the calculation of the exposure control value has been completed has been set, in case the flag CDEF is set, then the exposure control value has been already calculated, a desired effective aperture value Avc and a desired exposure time Tvc are set in the register IOR and the SIO operation is performed. On the other hand, in case the flag CDEF is reset, then the calculation of the exposure control time has not completed yet, AFAvo and Tv=6 (1/60 sec) is set in the register IOR, and the SIO operation is performed. After the SIO operation is completed, the terminal $P_{25}$ is made "Low" and the program flow is returned.

At the step #12, the ISO data is set in accordance with the condition of the Sv switch ISS, the UP switch UPS and the DOWN switch DOS. Next, at the step #20 it is determined whether the release switch $S_2$ is closed or not. In case the release switch $S_2$ is closed, the operation of the subroutine II as shown in FIG. 3 is performed, on the other hand, in case the release switch $S_2$ is open, at the step #21 the analog output of the measured brightness LMAN inputted from a light measuring circuit LMC shown in FIG. 1 is converted into a digital form in reference to a reference voltage VRAN inputted from the reference voltage power source arranged in the light measuring circuit LMC to a reference voltage input terminal VRI. At the step #22, it is determined whether the data request signal is inputted from the AF microcomputer $MC_2$ or not. In case the data request signal is inputted, the operation of the subroutine I is performed and the program flow goes to the step #24. On the other hand, the data request signal is not inputted, the program flow goes to step #24 directly.

At the step #24, each mode is set in accordance with the condition of the mode switch MOSS, the UP switch UPS and the DOWN switch DOS, the program flow goes forward in accordance with the content of the mode register MOR. At the step #28 in case the content of the mode register MOR is "0" which corresponds to the P mode, the calculation of the P mode is performed at the step #29 and the program flow goes to the step #38. Next, the step #28, the content of the mode register MOR is "2" which corresponds to the A mode, at the step #33 the effective aperture value is set in accordance with the condition of the Av switch ASS, the UP switch UPS and the DOWN switch DOS, the program flow goes to the step #35 through the step #34, then the calculation of the exposure time is performed, and the program flow goes to the step #38. Moreover, in case the content of the mode register MOR is "3 which corresponds to the S mode, at the step #31 the exposure time is set in accordance with the condition the Tv switch TSS, the UP switch UPS and the DOWN switch DOS, the program flow goes to the step #37 through the step #32, then the calculation of the S mode is performed and the program flow goes to the step #38. Finally, the content of the mode register MOR is "1" which corresponds to the M mode, the exposure time is set at the step #31 and the effective aperture value is set at the step #33, then the calculation of the M mode is performed at the step #36 and the program flow goes to the step #38.

At the steps #12, #31 and #33, the setting of the data Sv, Tvs and Avs are performed as follows. First of all, it is determined whether the Sv switch ISS, the Tv switch TSS, the Av switch ASS and the UP switch UPS or the DOWN switch DOS are closed or not. In case the UP switch UPS is closed, $\frac{1}{3}$ is added to the data Sv at the step #12, $\frac{1}{2}$ is added to the data Av at the step #31, 1 is added to the data Tv at the step #33. In case the DOWN switch DOS is closed, $\frac{1}{3}$ is subtracted from the data Sv at the step #12, $\frac{1}{2}$ is subtracted from the data Av at the step #31, 1 is subtracted from the data Tv at the step #33. After that, it is determined whether each data is more than each predetermined threshold value or not, only in case each data is more than the threshold value, the threshold value is set in each data. Moreover, the updating of each data is not performed after the setting of each data has been set once when the UP switch UPS or the DOWN switch DOS has been closed. In case the UP switch UPS or the DOWN switch DOS is closed again after the switch is opened, the subsequent updating of the data is performed. At the step #24 when the mode is set, 1 is added to the content of the register MOR after the mode switch MOSS and the UP switch UPS are closed, then "0" is set in the content of the register MOR when the carry is occurred, that is, the P mode→the M mode→the A mode→the S mode are set in turn. When the mode switch MOSS and the DOWN switch are closed, 1 is subtracted from the content of the register MOR, "3 is set in the content of the register MOR when the borrow is occurred, that is, the P mode→the M mode→the A mode→the S mode are set in turn. Moreover, in case of changing the mode, changing the mode can be performed only after the UP switch or the DOWN switch is opened once.

At the step #38, the flag CDEF is set since the calculation of the exposure control value is completed at the above steps, then it is determined whether the release switch is turned on or not. In case the release switch is turned on, the program flow goes to the subroutine II shown in FIG. 3, on the other hand, in case the release switch is turned off, the display data is outputted to the display unit DSP and the program flow goes to the step #42. In case of outputting the display data, the terminal $P_{27}$ is made "Low", the display data is set in the register IOR, then the SIO operation is performed. At the step #42, it is determined whether the terminal $P_{37}$ is "Low" or not, in case the terminal $P_{37}$ is "Low", the program flow goes back to the step #2. On the other hand, in case the terminal $P_{37}$ is "High", when the UP switch UPS or the DOWN switch DOS is opened, therefore, the program flow goes to the step #43. Then it is determined whether the reset switch $S_4$ is turned on or not, in case the reset switch $S_4$ is turned on, (when the switch $S_4$ is changed over to the terminal WE) it is determined whether the AF mode or FA mode is selected. Then in case the FA mode is selected, it become possible to the interrupt terminal $it_0$, the program flow goes back to the step #3. On the other hand, in case the AF mode is selected, the terminal $P_{21}$ is made "Low", an operation stop signal AFSTP of the AF microcomputer $MC_2$ is outputted to the AF microcomputer $MC_2$ at the step #45, then the AF microcomputer $MC_2$ outputs an AF stop signal AFEN in accordance with the operation stop signal AFSTP. Upon inputting the signal AFEN, the terminals $P_{20}$ and $P_{21}$ are made "High", then it is determined whether the reset switch $S_4$ is turned on or not at the step #48. In case the reset switch $S_4$ is turned on, the program flow goes back to the step #3 through the step #49. That is, the above operation of reading, measuring the brightness of the object and calculation of the light measurement are performed in turn until the counter interruption is enabled ever if the reset switch $S_4$ is turned on with all the switches TSS, ASS, ISS, MOSS, UPS, DOS and $S_1$ turned off and the terminal $P_{37}$ is "High". Then in case the FA mode is selected, the operation of the AF microcomputer $MC_2$ can be performed continuously. On the other hand, in case the AF mode is selected, the operation of the AF microcomputer $MC_2$ stops when the terminal $P_{37}$ becomes "High".

When it is determined that the terminal $P_{37}$ is "High", in case the reset switch $S_4$ is turned off, the operation of the AF microcomputer $MC_2$ stops even though the AF mode or the FA mode is selected. Then the counter interruption is inhibited at the step #51, it is permitted to interrupt to the terminal $it_0$ at the step #52. Next, a permission signal STPOK of stopping the operation of the AF microcomputer $MC_2$ is inputted at the step #53, the flag CDEF is reset at the step #54, it is inhibited to output the reference clock pulses STCL at the step #55, the transistor $BT_0$ is turned off at the step #56, then the microcomputer $MC_1$ stops.

In the following, the counter interruption will described. As soon as a predetermined time (for example, five seconds) has passed after it is determined that the terminal $P_{37}$ is "High" and the reset switch $S_4$ is turned on, the counter interruption is performed from the step #120. First of all, it is determined whether the FA mode or the AF mode has been selected. In case the FA mode is selected, when the operation of the AF microcomputer $MC_2$ has been performed continuously, the AF microcomputer $MC_2$ is stopped, and the program flow goes to the step #124. On the other hand, in case the AF mode is selected, when the operation of the AF microcomputer $MC_2$ has been already stopped, the program flow goes to the step #124. Moreover, the counter interruption is inhibited and it is permitted to interrupt to the interrupt terminal $it_0$. After the permission signal STPOK of stopping the operation of the AF microcomputer $MC_2$ is inputted at the step #126, the reference clock pulses STCL are stopped at the step #127 and the transistor $BT_0$ is turned off. Then the flag CDEF is reset at the step #129 and the operation is made to stop.

In the following, the operation of the subroutine II will be described. At the step #80, it is determined whether the flag CDEF has been set or not, in case the flag CDEF has been reset, when the calculation of the exposure control value has not been completed, the program flow goes back to the main routine. In case the flag CDEF has been set and the calculation of the exposure control value has been completed, the program flow goes to the step #81. Then a signal INREL which designates that the operation of controlling the exposure has been performed is outputted. After the signal AFEN is inputted at the step #82, the program flow goes to the operation of the exposure control. Table 4 shows the correlation between the outputs of the terminals $P_{41}$, $P_{42}$ and $P_{43}$, the output of a driver DEDR, the magnet in operation and the operation of the camera.

TABLE 4

| $P_{41}$ | $P_{42}$ | $P_{43}$ | $X_1$ | $X_2$ | $X_3$ | $X_4$ | $X_5$ | Magnet | Operation |
|---|---|---|---|---|---|---|---|---|---|
| L | H | H | H | L | L | L | L | RELC | release |
| H | L | H | L | H | L | L | L | APSC | interrupt stopping down operation |
| L | L | H | L | L | H | L | L | MRC | mirror up |
| H | H | L | L | L | L | H | L | 1CC | first curtain start |
| L | H | L | L | L | L | L | H | 2CC | second curtain start |
| H | H | H | L | L | L | L | L | * | operation disable |

In the operation of controlling the exposure, first of all, the operation of the stopping down of the aperture is set about after the operation of releasing, the time $T_0$ is counted. The pulses of a pulse generating device APC are inputted to an event counter APCO through a terminal $CLI_1$, the step data $AV_c-AV_o$ for stopping down of the aperture, which are preset in the counter, are subtracted by one each time said pulse from the pulse generating device APC is inputted. When the content of the counter APCO become "0", the interruption is enable to stop the stopping down of the aperture at the step #88, then the program flow goes back to the subroutine II. On the other hand, in the subroutine II, the mirror is raised after the operation of counting the time $T_0$ is completed, then the time $T_1$ is counted. The operation of stopping down of the aperture is stopped during the time period $T_0+T_1$. After the time $T_1$ has passed, the mirror is completely raised, the first curtain begins to run at the step #91. After the time $2^{-T_{vc}}$ has passed, the second curtain begins to run at the step #94. When the reset switch $S_4$ is turned off, the signal INREL representing the period of controlling the exposure is eliminated with the flag CDEF reset and the program flow goes back to the step #42 in the main routine.

In FIG. 1, MLMC denotes a CCD comprising at least two pairs of the light receiving unit which receive the light passed through the photographic lens and distributed by a known optical distribution system. The interface circuit INF outputs "High" pulse to the terminal $\phi R$ for making the charge storing unit in the CCD at a predetermined voltage. When the said pulse becomes "Low", storing the charge in accordance with the received light quantity in the light receiving component of the charge storing unit is set about. In the interface circuit INF, a monitor output AMO outputted from the light receiving quantity monitor unit of the CCD is compared with the reference level, the transfer pulse is outputted to the terminal $\phi T$ as soon as the monitor level reaches the reference level. In the CCD, the charge stored in the charge storing unit is transferred to the transfer gate (an analog shift register), a signal ANO of the stored charge which corresponds to the received light quantity in each light receiving unit is outputted in turn in accordance with the pulse used for transferring from the terminals $\phi_1$, $\phi_2$ in the interface circuit INF. When storing the charge is completed and the interface circuit INF outputs the transfer pulse to the terminal $\phi T$, the interface circuit INF outputs a signal INEN which designates that the operation of storing the charge is completed to the AF microcomputer $MC_2$.

The interface circuit INF converts an analog signal ANO inputted to a digital signal, and outputs a "Low" pulse signal ADEN, which designates a timing used for inputting the converted data to the AF microcomputer $MC_2$, whenever the said A-D conversion is completed. Then the interface circuit INF outputs the A-D converted data to the input port $D_0$ in the AF microcomputer $MC_2$ through a bus ADD. When the storing time has passed beyond a predetermined time and the monitor output AMO is less than the reference level, the AF microcomputer $MC_2$ outputs a "Low" pulse INSTP for stopping the operation of storing the charge in the CCD compulsorily and make the operation of storing the charge compulsorily. After that, in accordance with the above stop of the operation of storing the charge, the interface circuit INF amplifies the input signal ANO in accordance with the monitor level AMO at that time when the operation of storing the charge is made to stop, and A-D convert the said amplified signal to a digital signal. Then the interface circuit INF transfers the A-D converted signal to the AF microcomputer $MC_2$.

MCC denotes a control circuit for the motor MO. First of all, the rotation of the motor MO is transferred to a driving member in the converter lens COV through a transferring member not shown.

Said rotation of the motor MO is transferred to a driven member in the interchangeable objective lens LE through a transferring member in the converter lens COV and focusing is performed in the optical system of the interchangeable objective lens LE. Moreover, the rotation of the motor is transferred to an encoder ENCC, which produces pulses representing the rotation of the motor MO (referred to as rotation pulse) in accordance with the rotation of the motor. The rotation pulses are inputted to an event counter in the AF microcomputer $MC_2$ through the terminal $CLI_0$. Said event counter is set by the data of a predetermined and required rotation number of the motor MO. The data in the event counter is subtracted in accordance with the pulse. When the optical system for focusing in the interchangeable objective lens is moved by said predetermined length, the content of the event counter becomes "0", the interruption from the event counter is performed and the rotation of the motor MO is made to stop or to be changed from high speed to the low speed. The motor control circuit MCC makes the motor MO rotate in a clockwise direction when the terminal $P_4$ in the AF microcomputer $MC_2$ is "Low" and makes the motor MO rotate in a counterclockwise direction when the terminal $P_5$ in the AF microcomputer $MC_2$ is "Low". On the other hand, the motor control circuit MCC stops the motor MO when the both terminals $P_4$ and $P_5$ is "High". Moreover, the motor MO is controlled to rotate at the high speed when the terminal $P_6$ in the AF microcomputer $MC_2$ is "High", on the other hand, the motor MO is controlled to rotate at the low speed when the terminal $P_6$ is "Low".

A light emitting diode RFL is used for displaying the condition that the image of the object is out of focus backward, a light emitting diode IFL is used for displaying the condition that the image of the object is in focus, and a light emitting diode FFL is used for displaying the condition that the image of the object is out of focus forward. The above three light emitting diodes are selectively turned on by the "Low" state of the terminals $P_7$, $P_8$ and $P_9$.

FLS denotes a switch used for locking the lens in the focused condition, when the switch FLS is closed, the motor MO is made to stop and the optical system for photographing is fixed at the position that the image of the object is in focus. When a switch AMS is changed over to the terminal AF, the AF mode is selected. On the other hand, when the switch AMS is changed over to the terminal FA, the FA mode for only displaying the in focus condition is selected. A switch SNS is switched to the terminal SIN during the single mode in which the AF microcomputer $MC_2$ is operated by itself such as the following mode. That is, for example, the single mode is the operation mode of the AF microcomputer $MC_2$ when the interchangeable objective lens with the circuit used for controlling the focal distance automatically is set as an AF lens, when the circuit used for controlling the focal distance automatically is set in a camera with a fixed lens for taking picture which can not be changed, or when the operation of the AF microcomputer $MC_2$ is checked. On the other hand, when the circuit arrangement used for automatic focus controlling is mounted in the body of the camera with the interchangeable objective lens, the switch SNS is switched to the AF microcomputer $MC_2$ through a terminal NOM, then the AF microcomputer $MC_2$ operates in the normal mode. Moreover, the both operating program of the single mode and the normal mode are stored in the AF microcomputer $MC_2$, one of the two program is used in accordance with the condition of the switch SNS. The switch SNS is set on or off in the production process of the camera system. The switch SNS is so arranged in the camera that only particular operators can access it.

Figure 5:
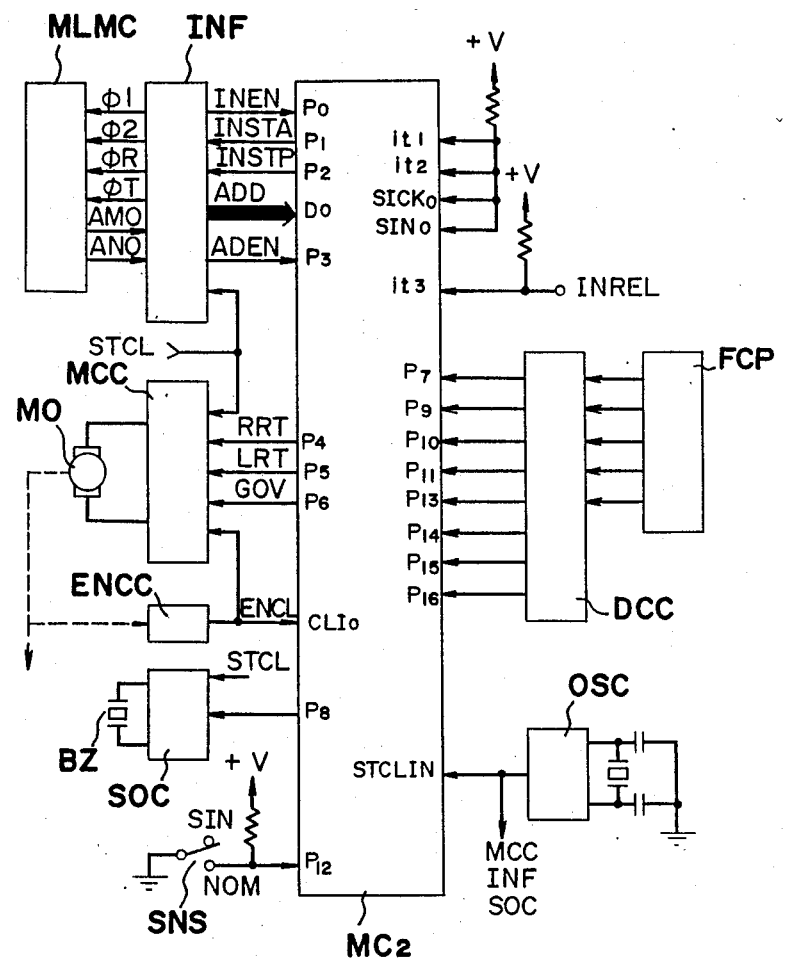
Figure 6A:
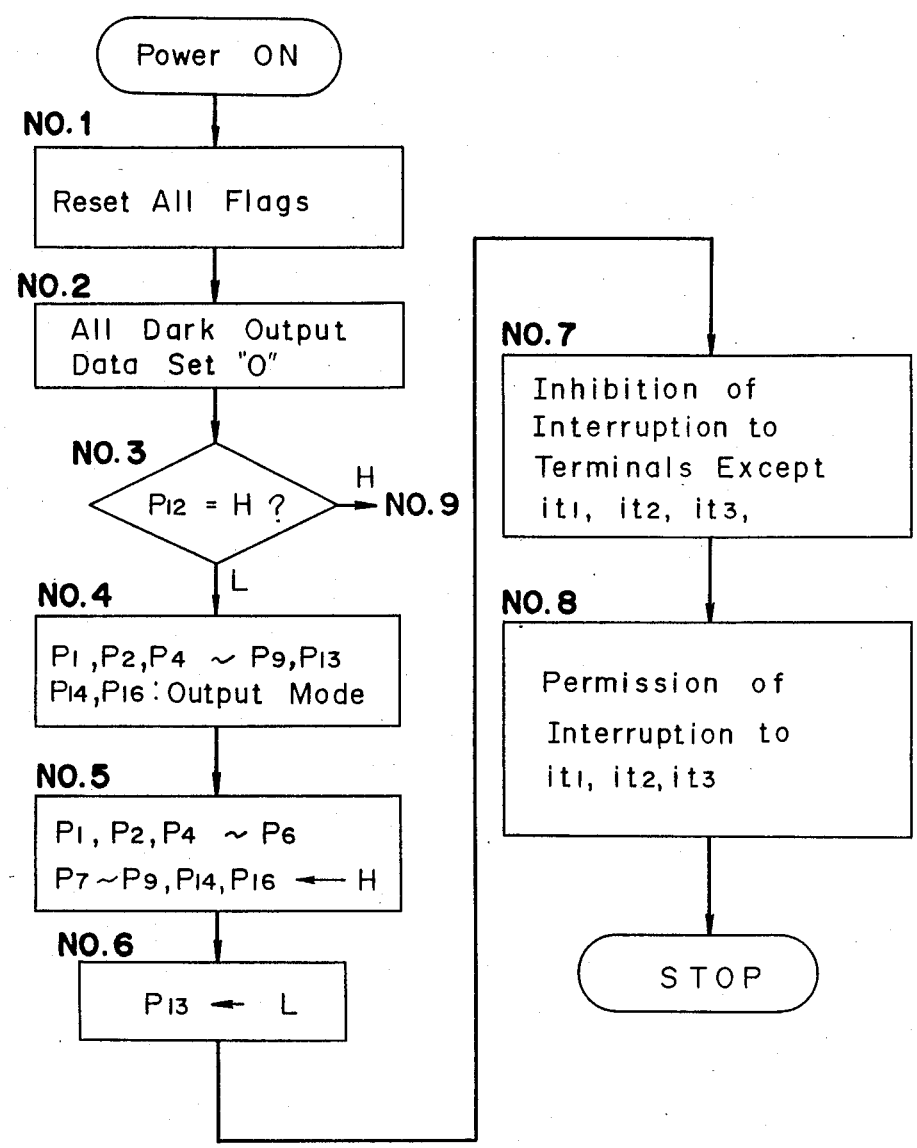
Figure 6B:
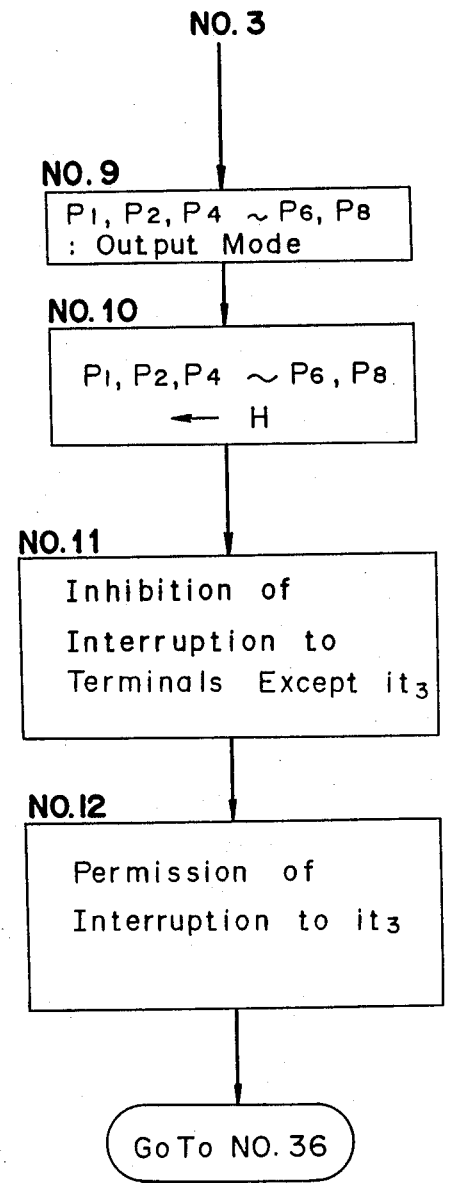
Figure 6C:
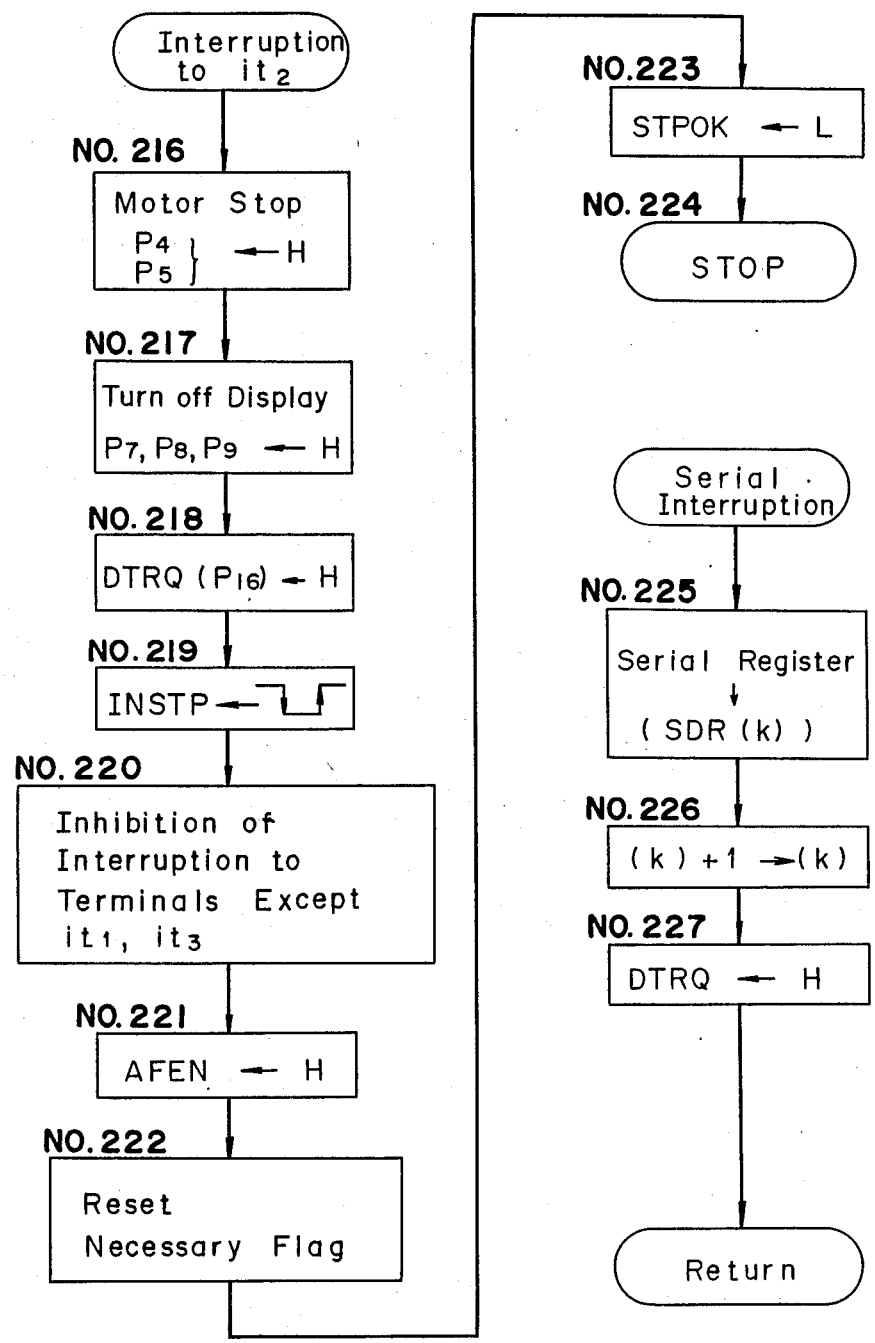
Figure 6D:
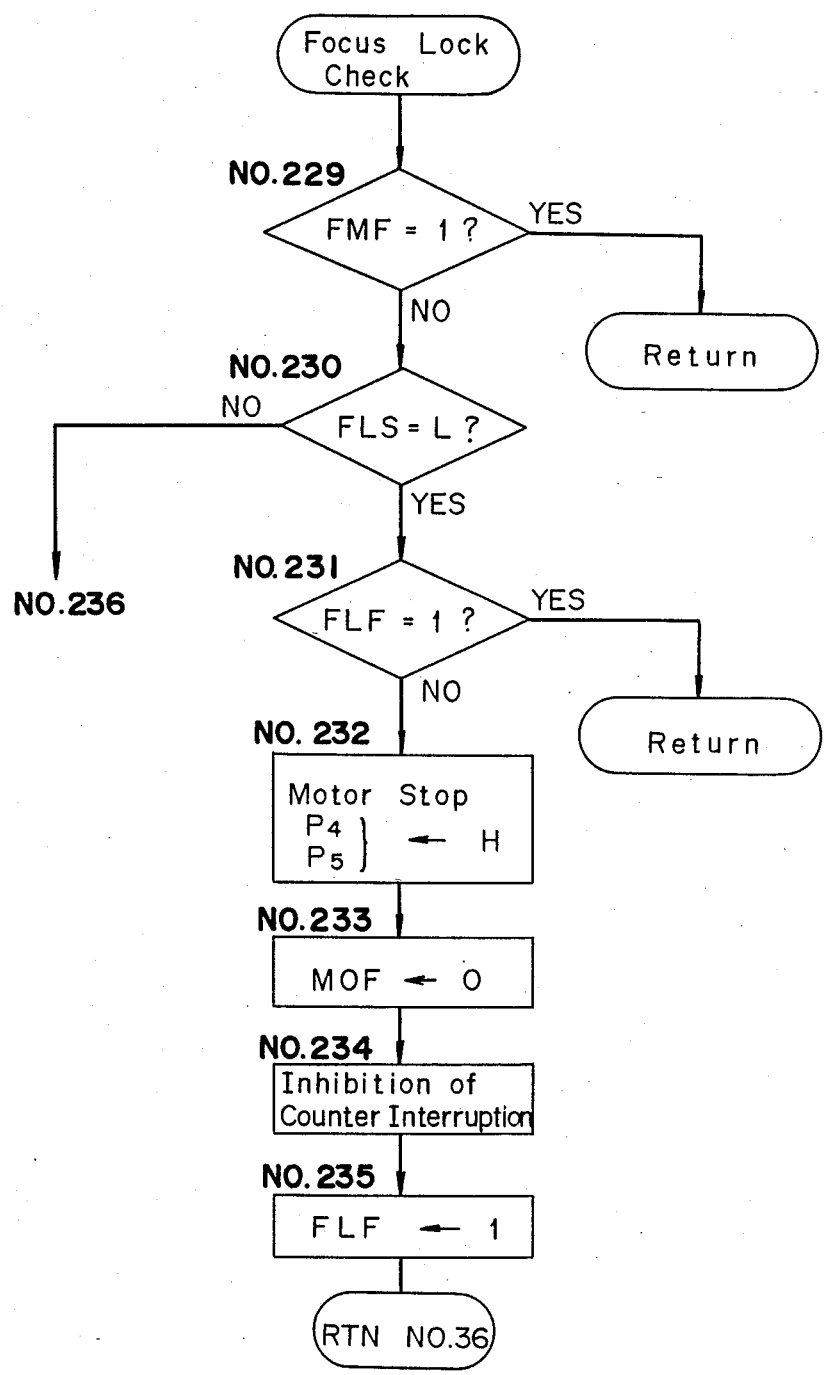
Figure 6E:
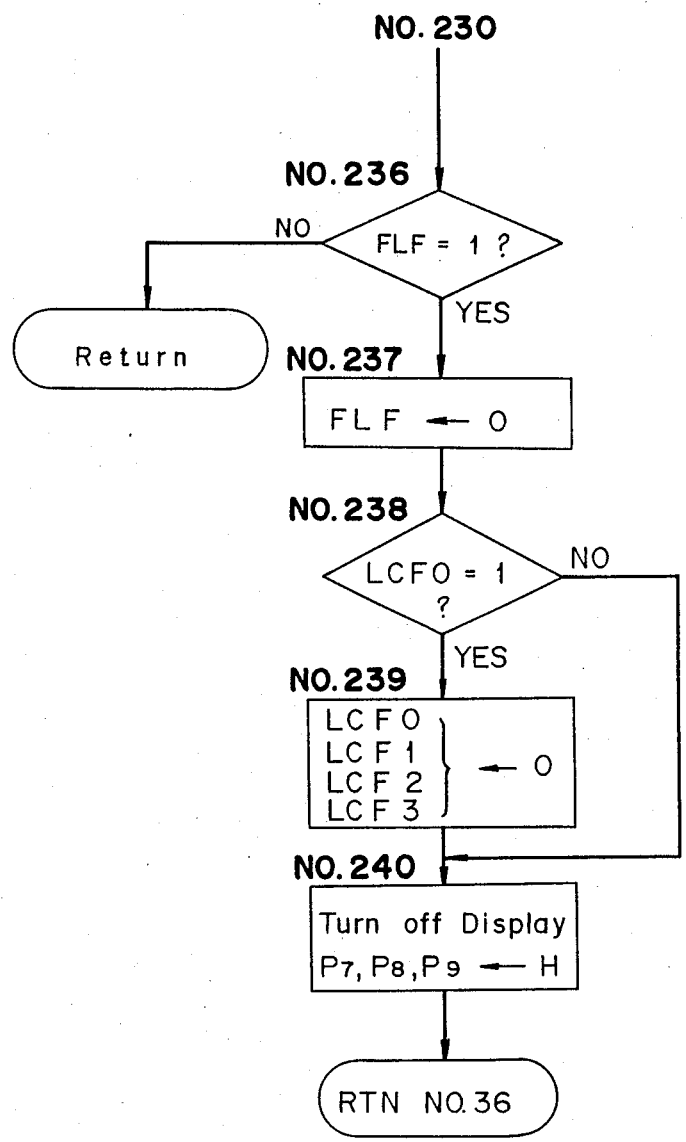
Figure 7A:
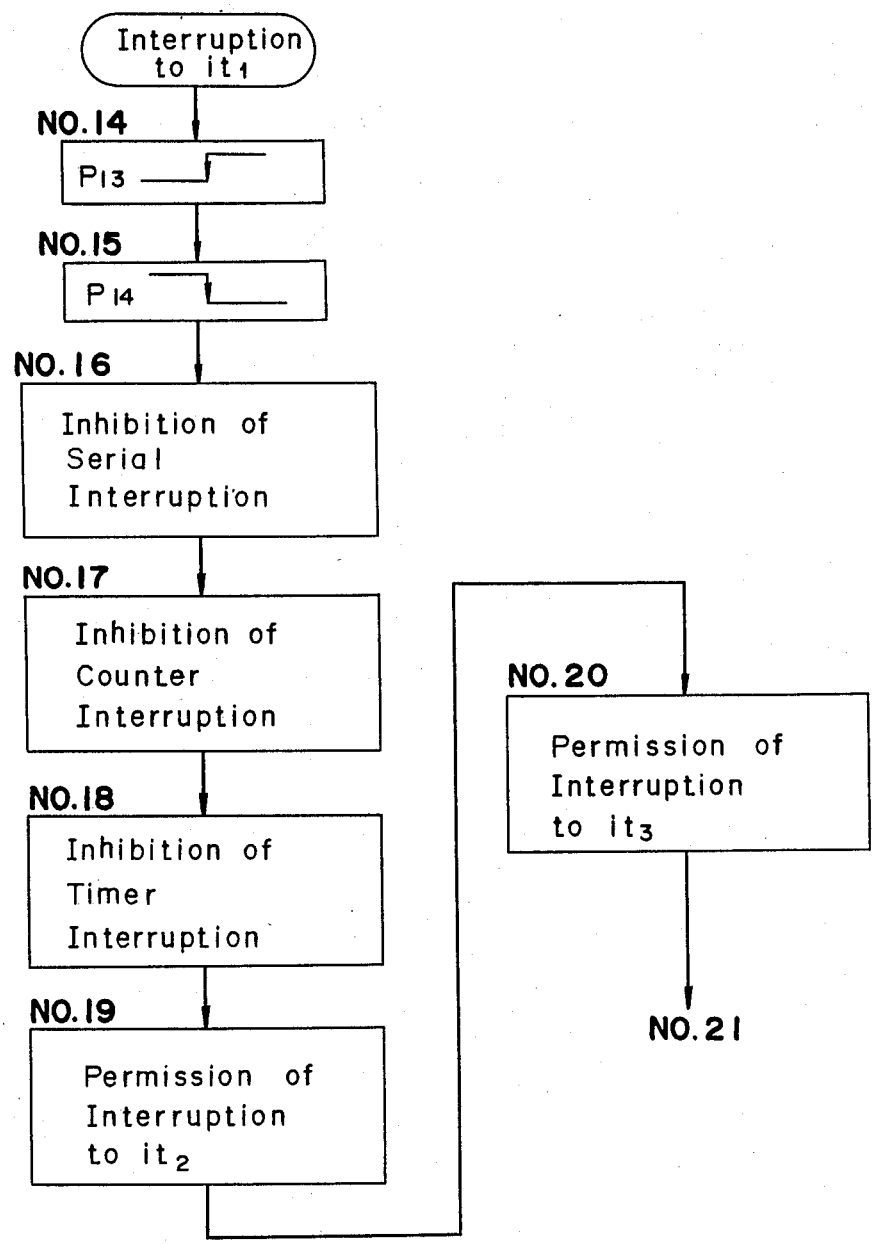
Figure 7B:
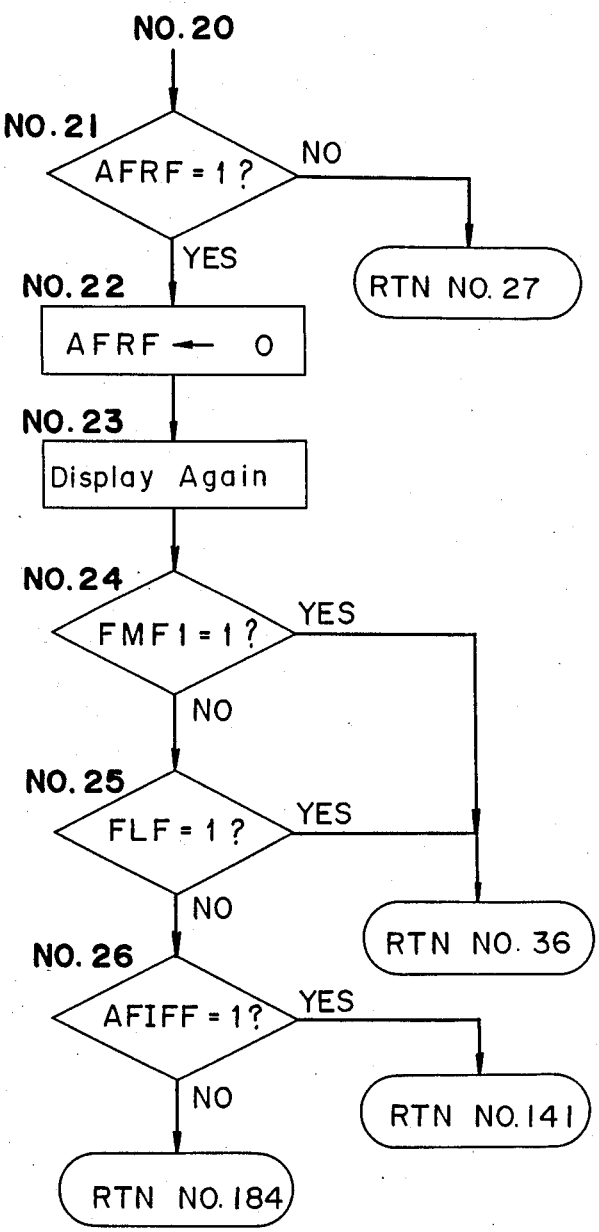
Figure 7C:
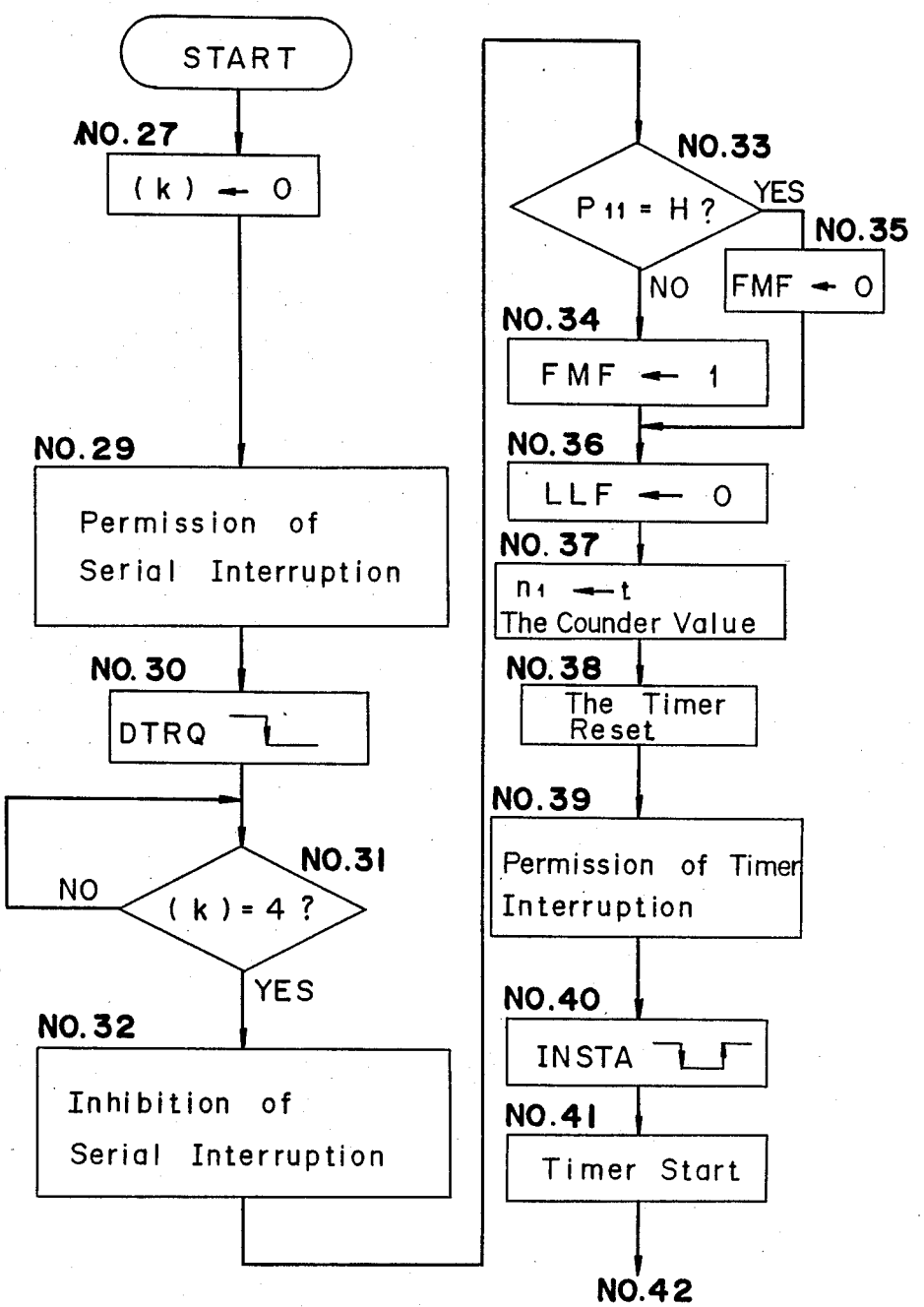
Figure 7D:
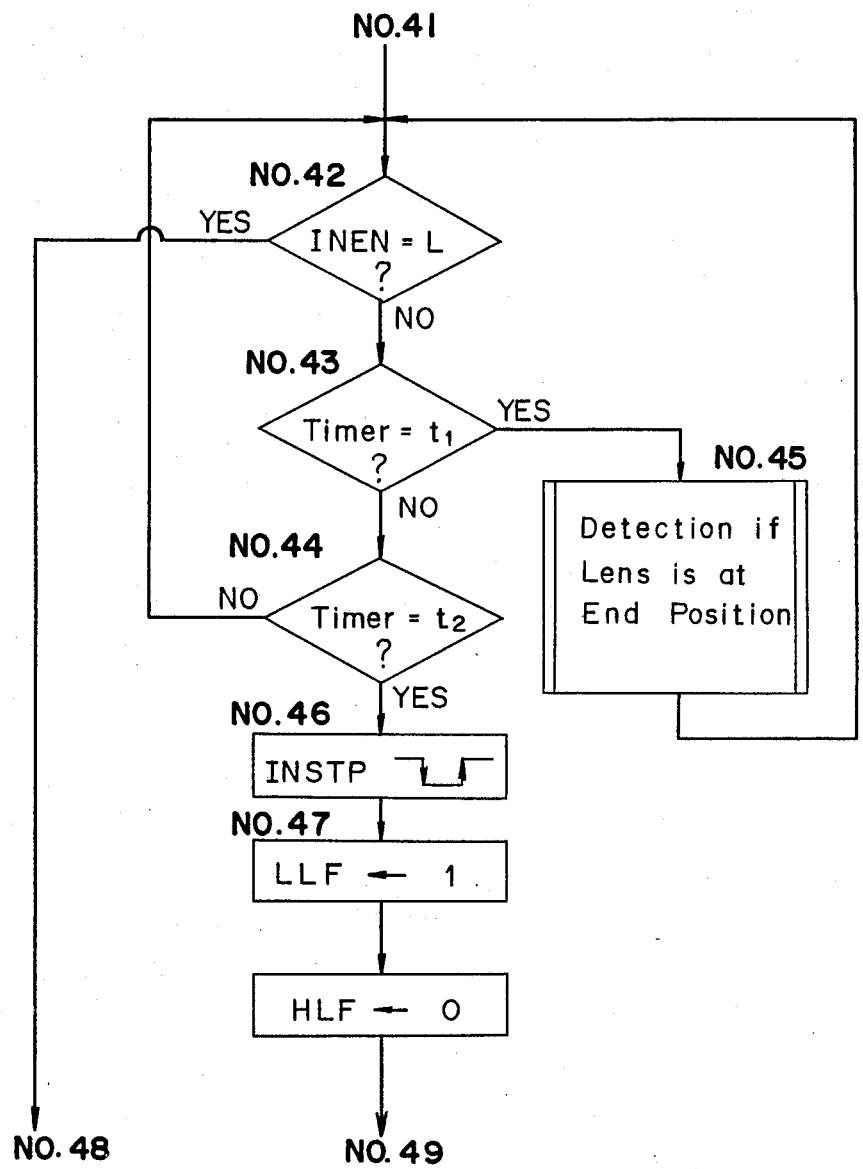
Figure 7E:
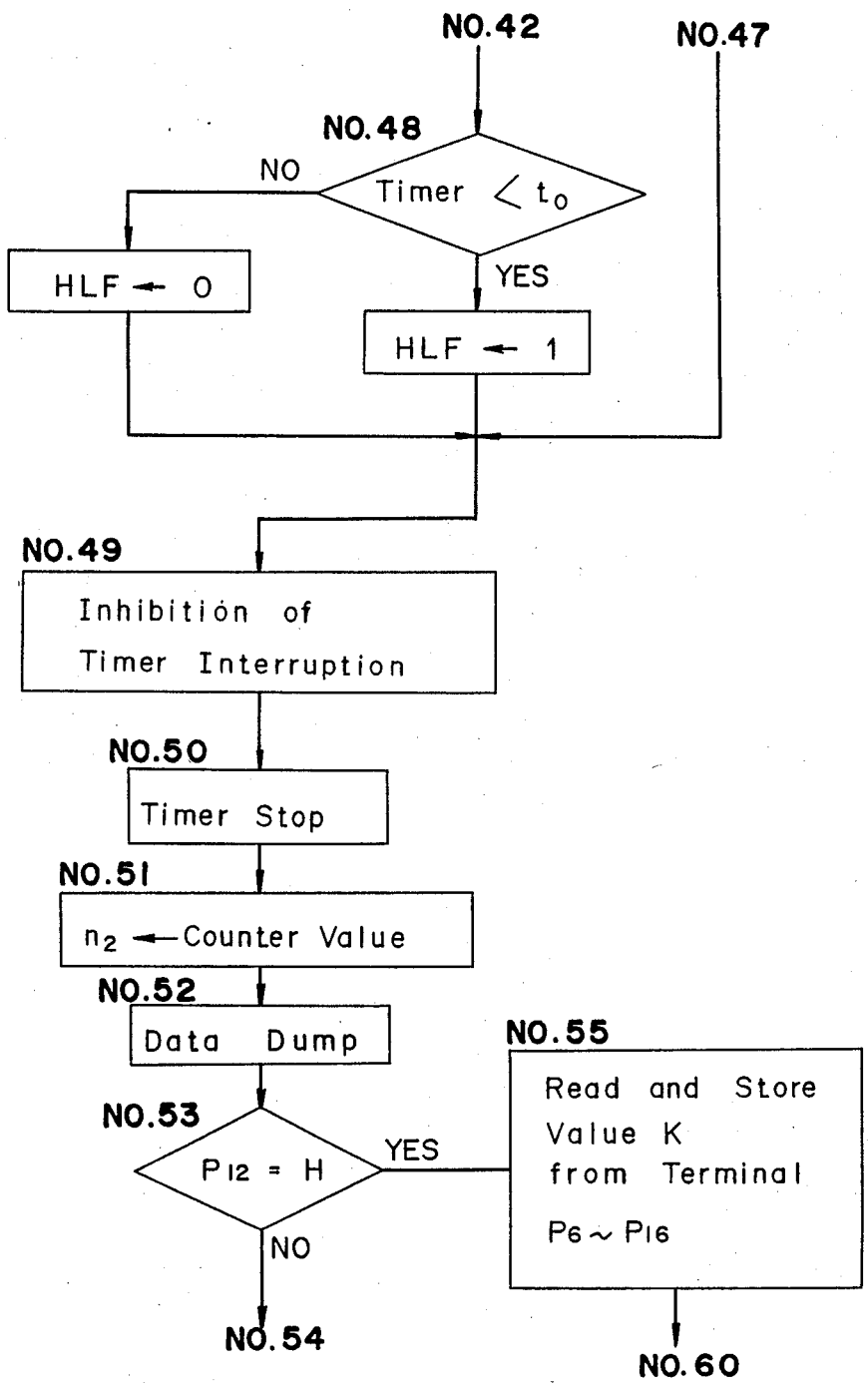
Figure 7F:
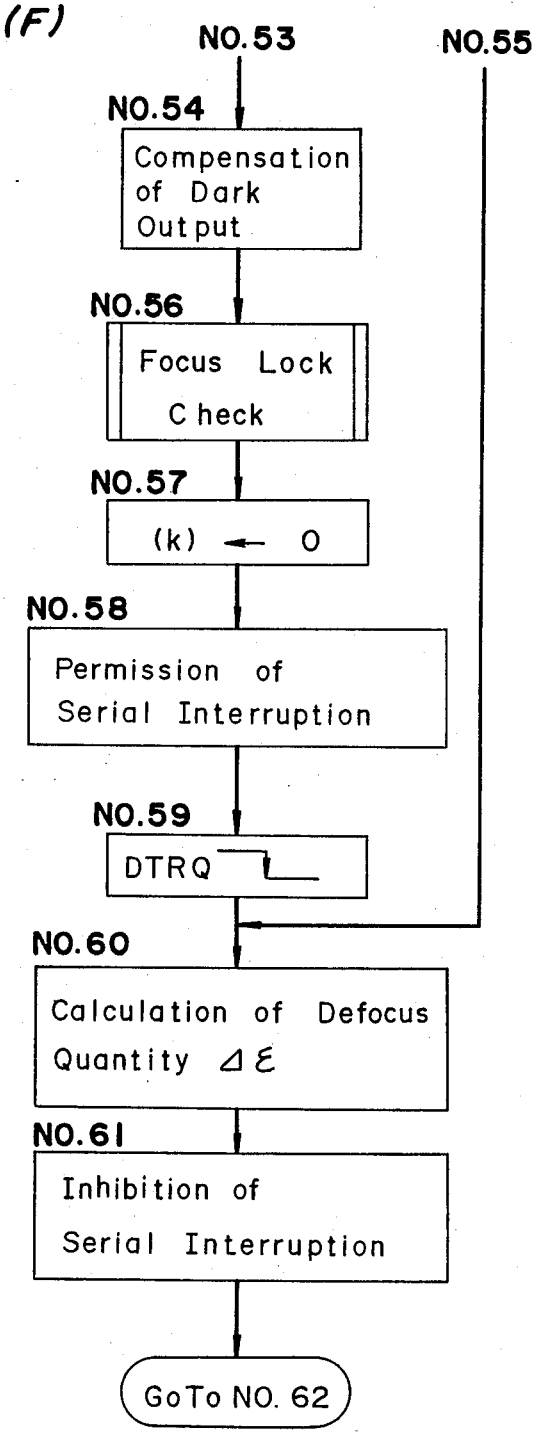
Figure 8A:
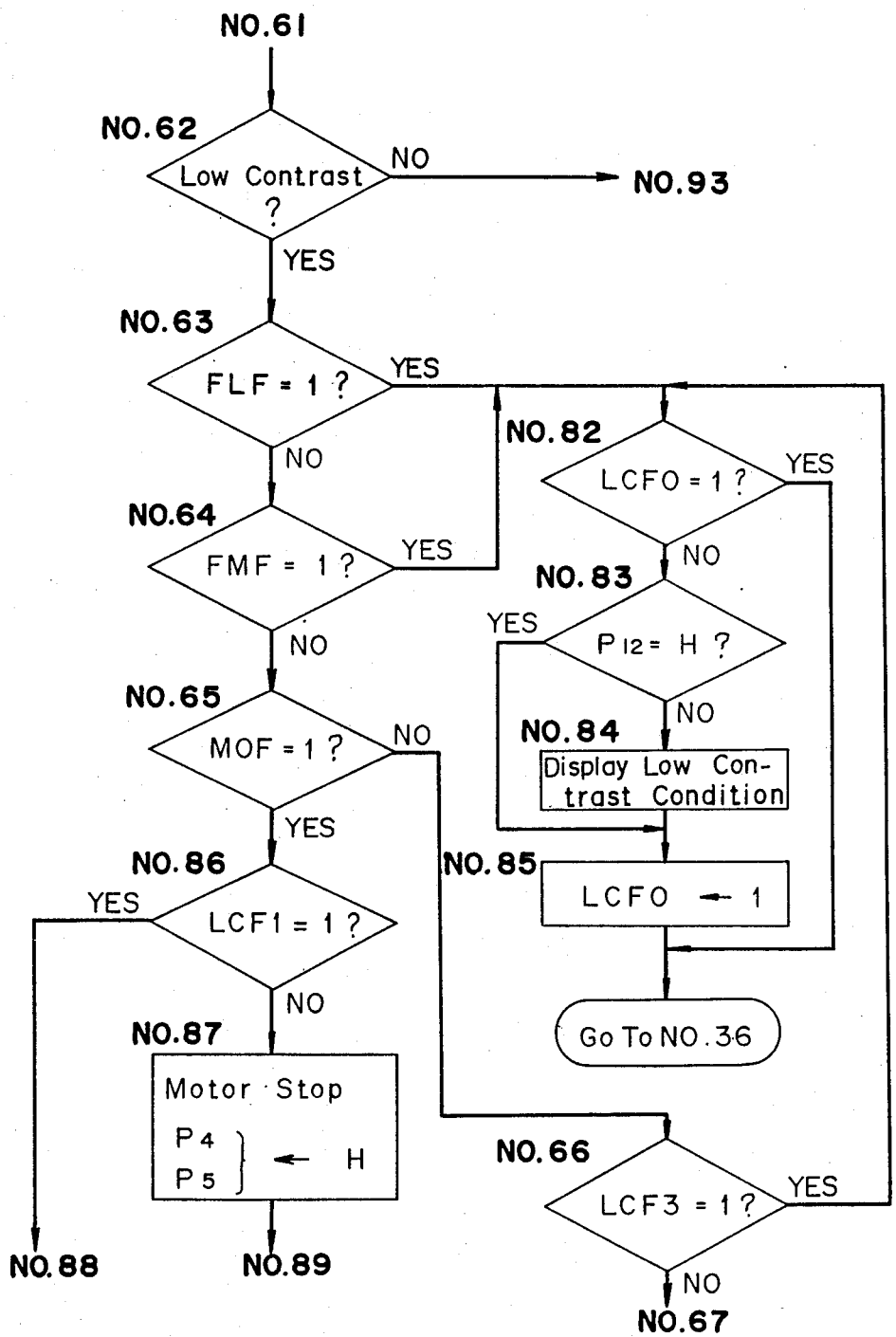
Figure 8C:
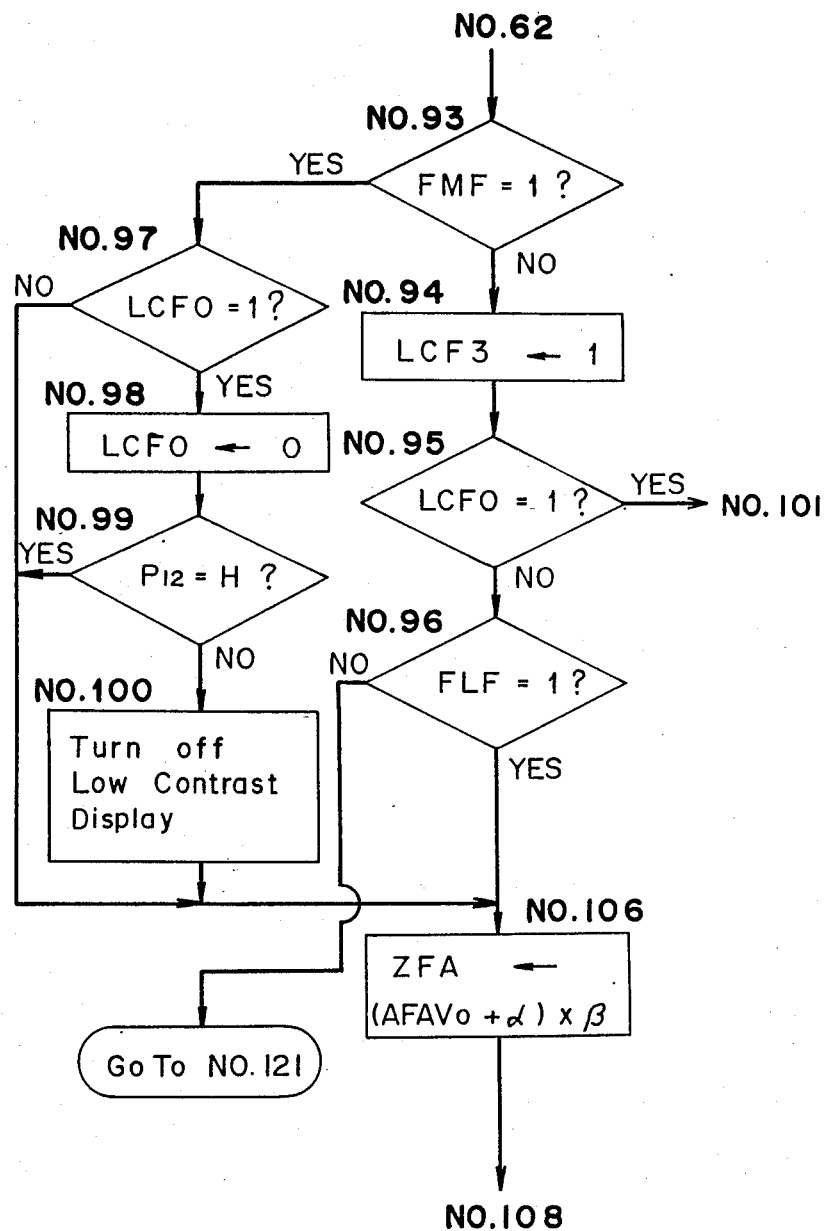
Figure 8D:
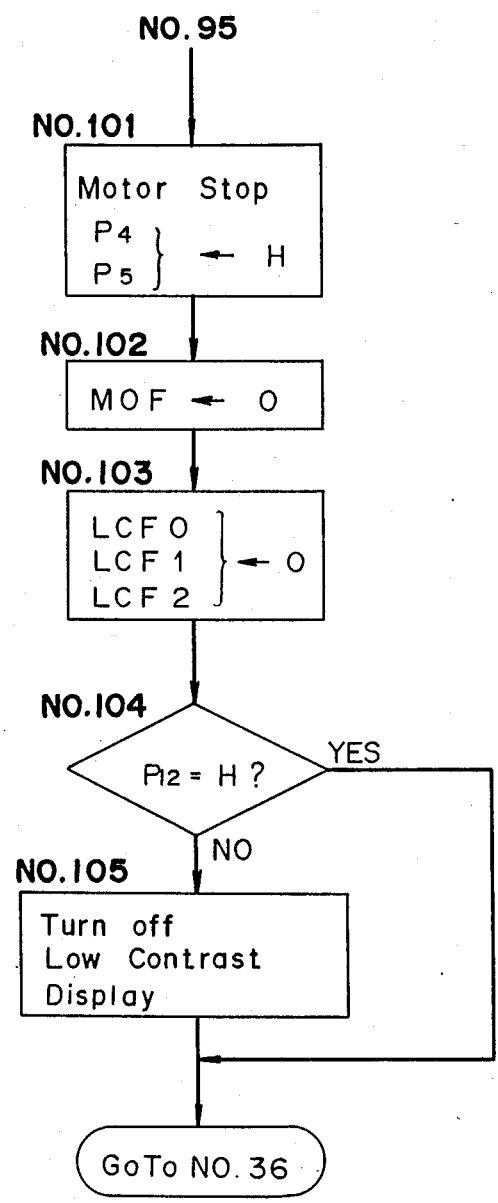
Figure 8E:
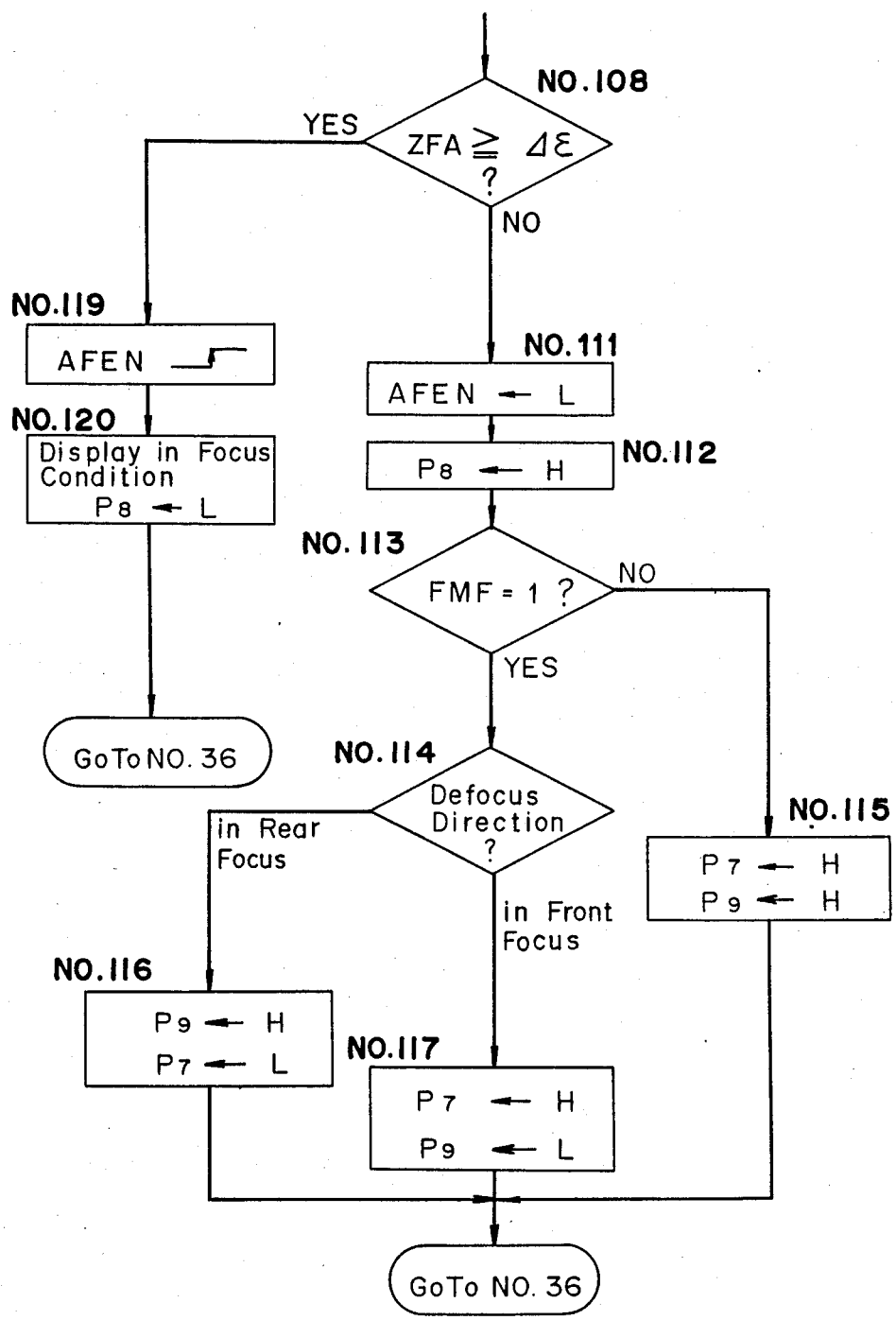
Figure 8F:
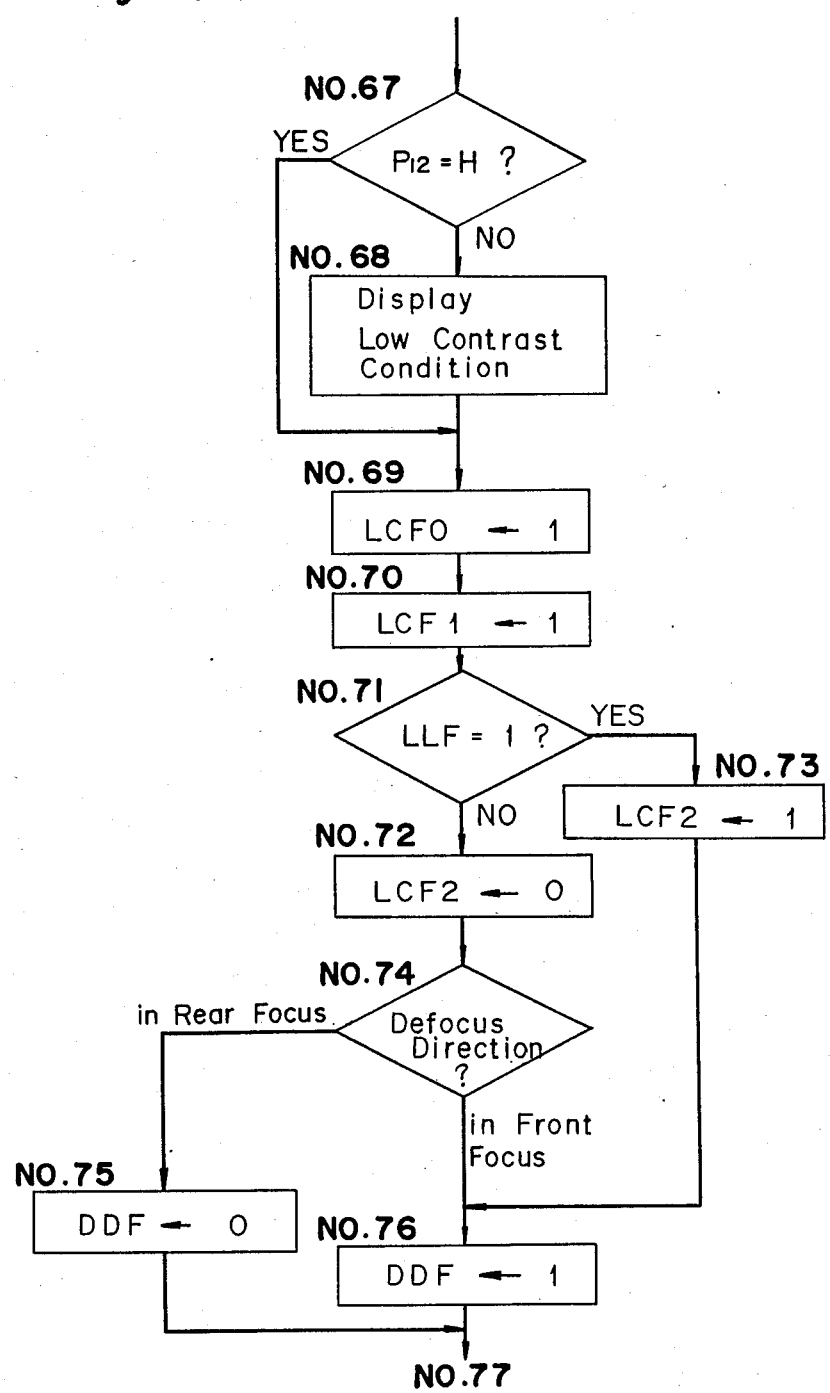
Figure 8G:
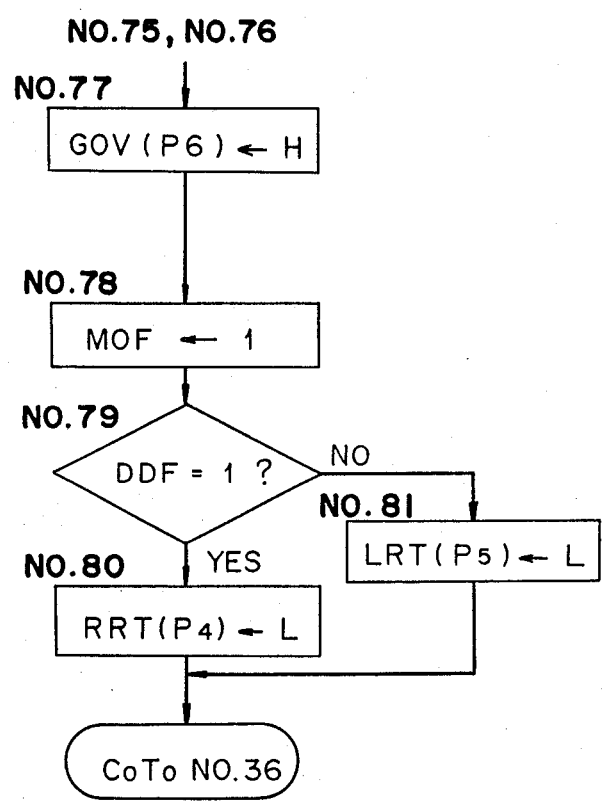
Figure 9A:
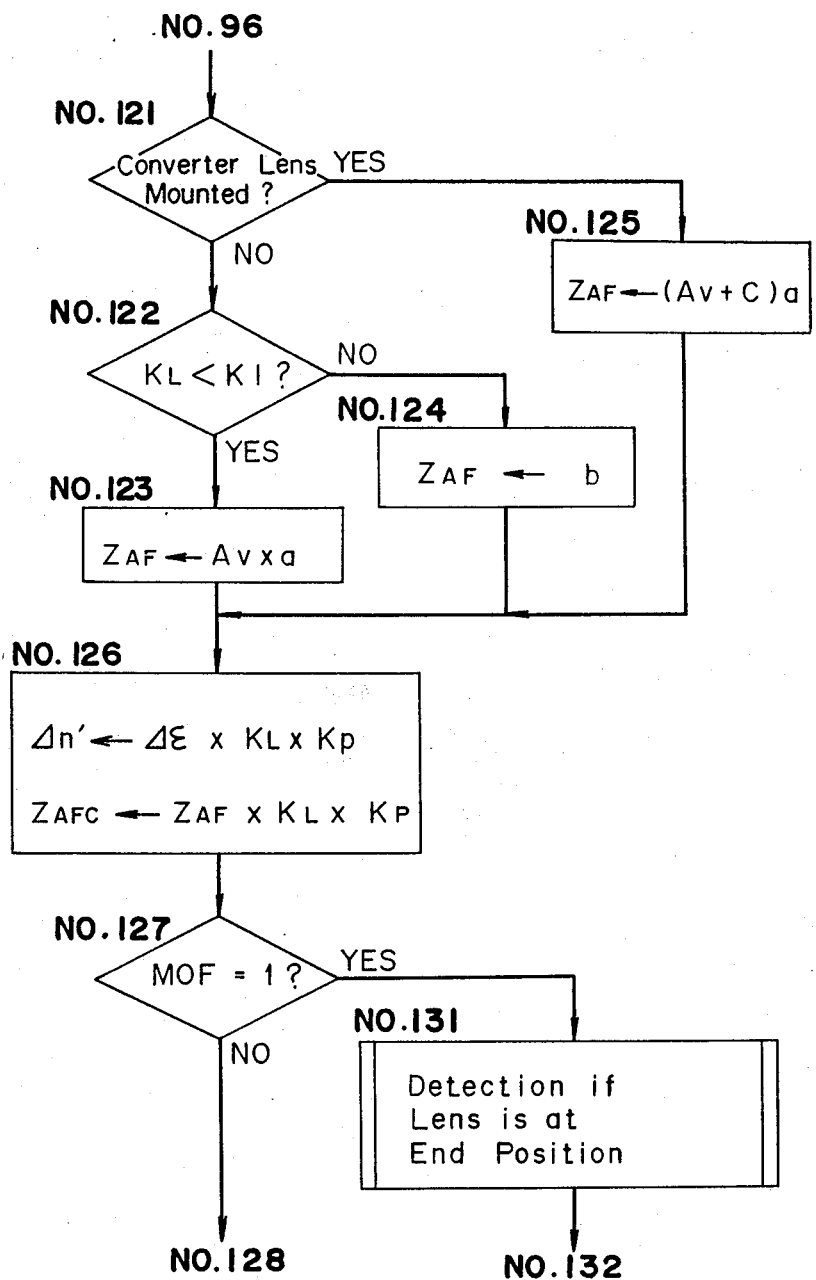
Figure 9B:
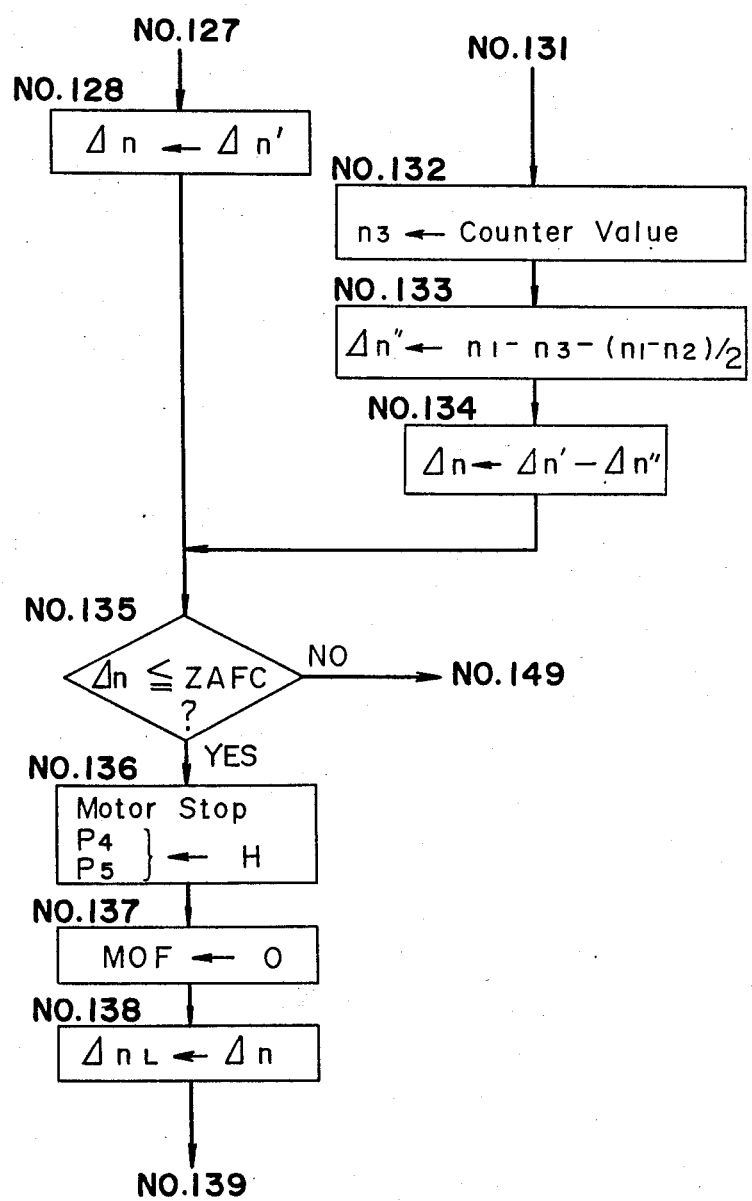
Figure 9C:
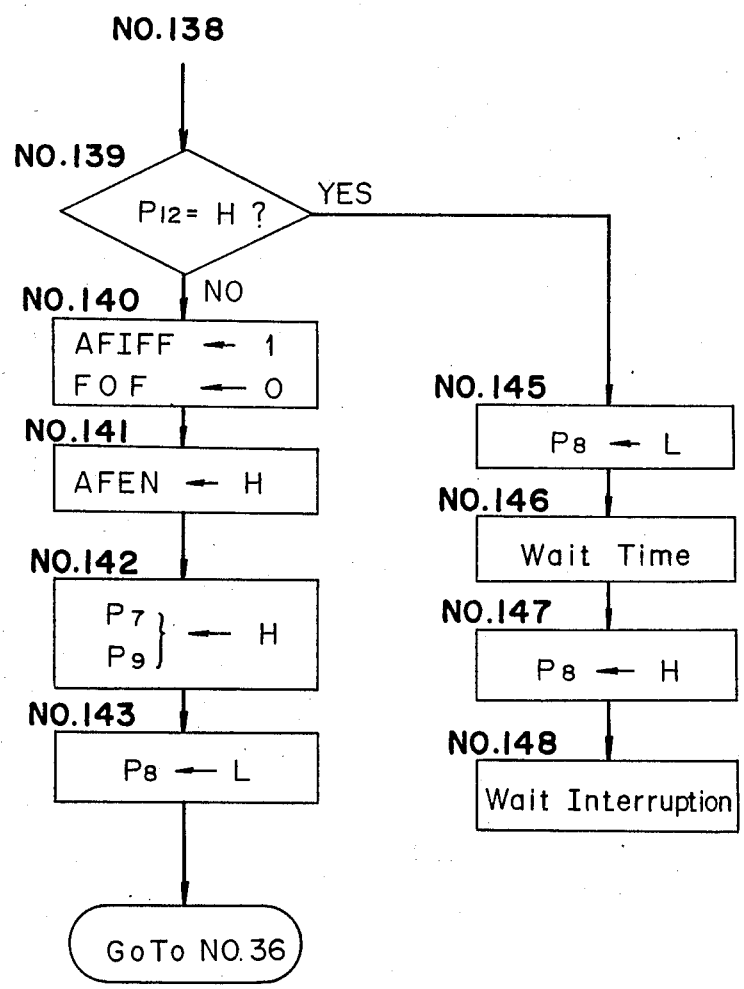
Figure 9D:
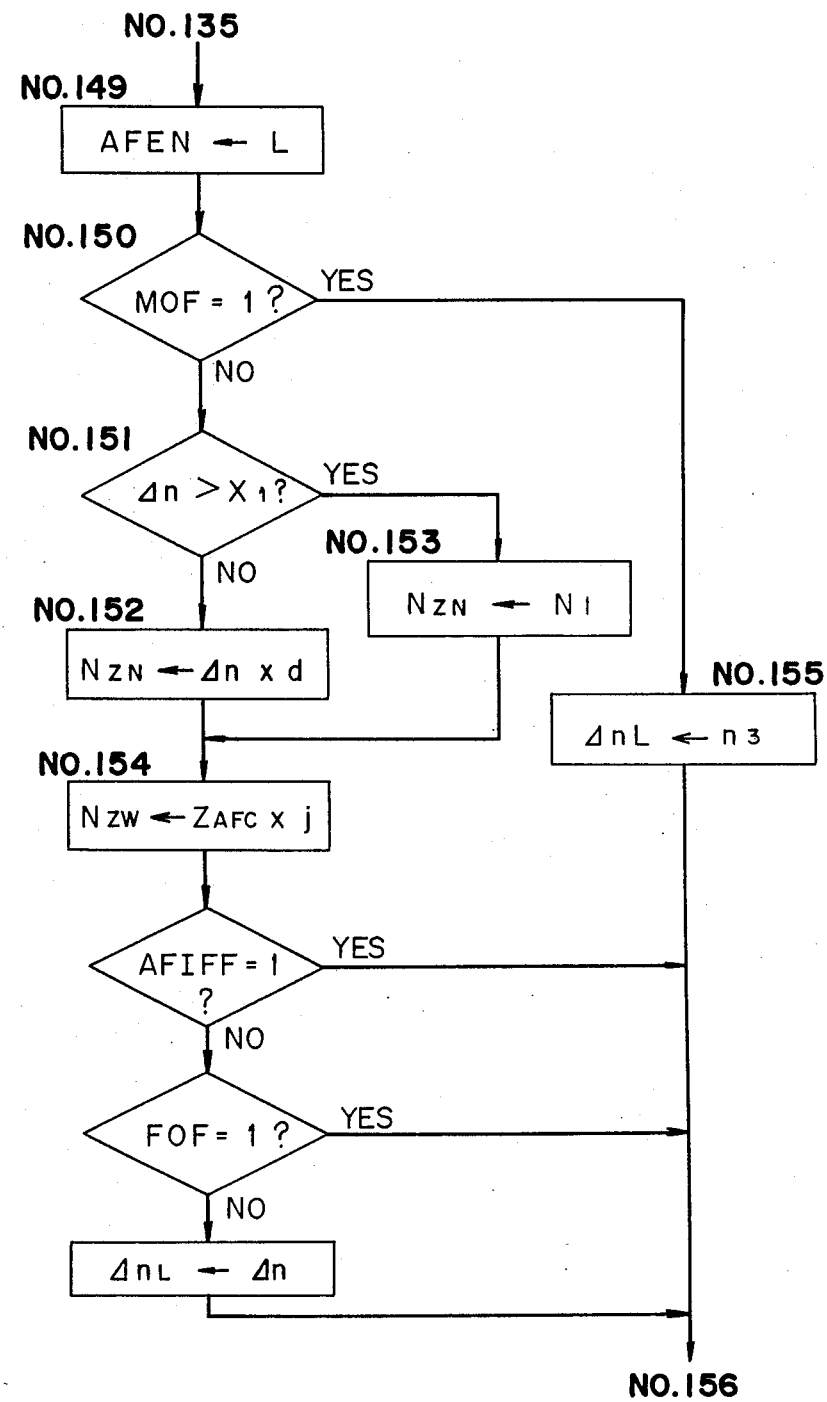
Figure 9E:
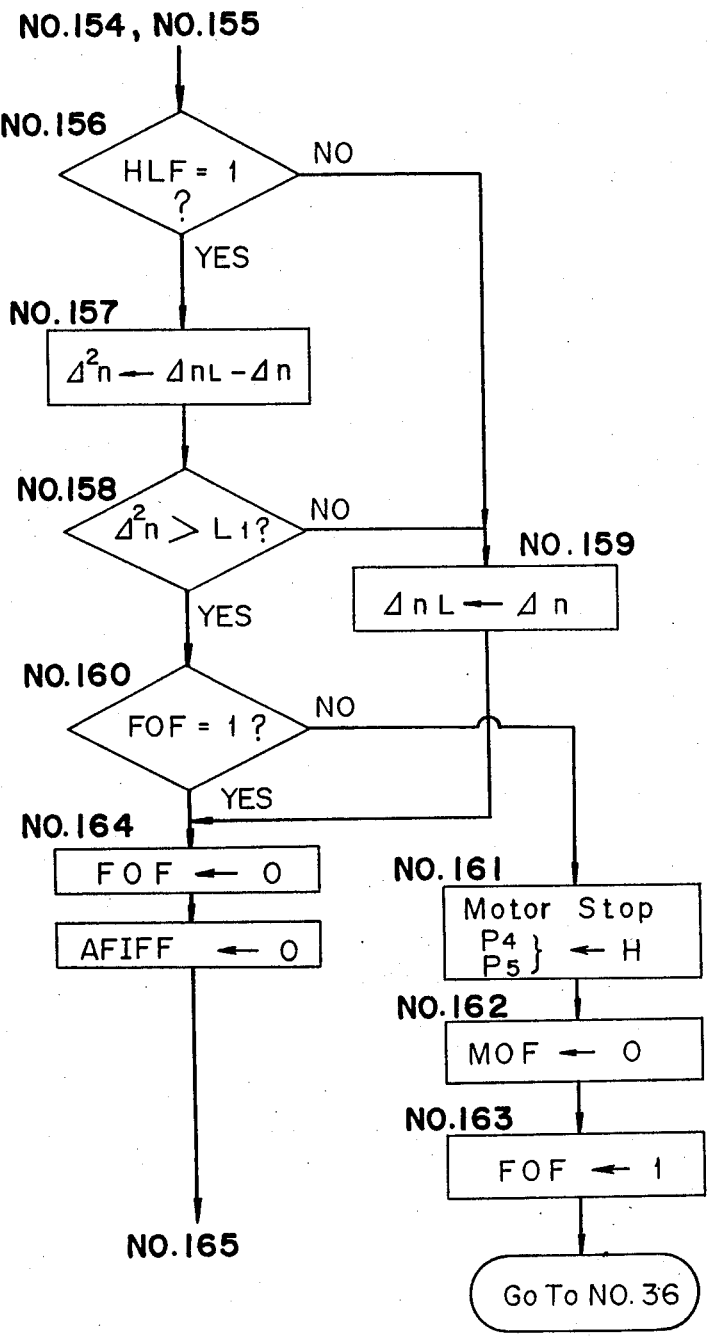
Figure 9F:
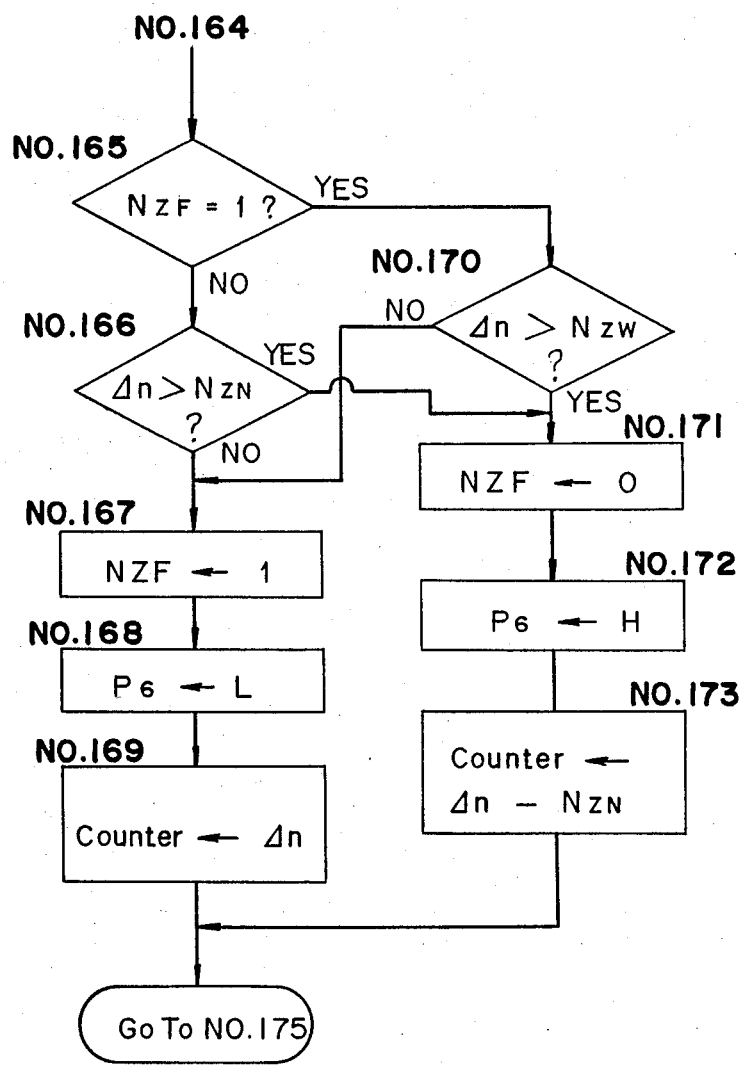
Figure 10A:
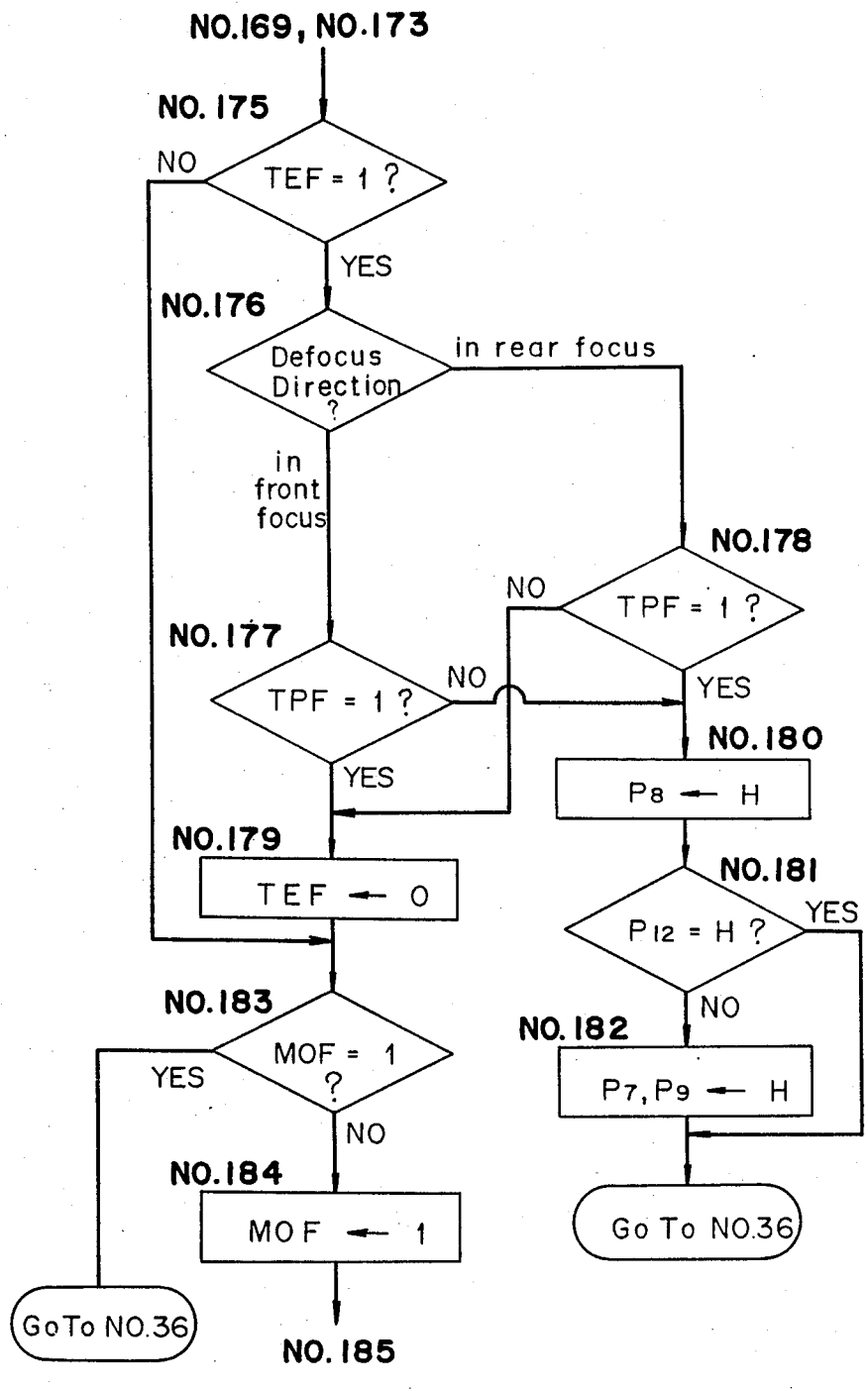
Figure 10B:
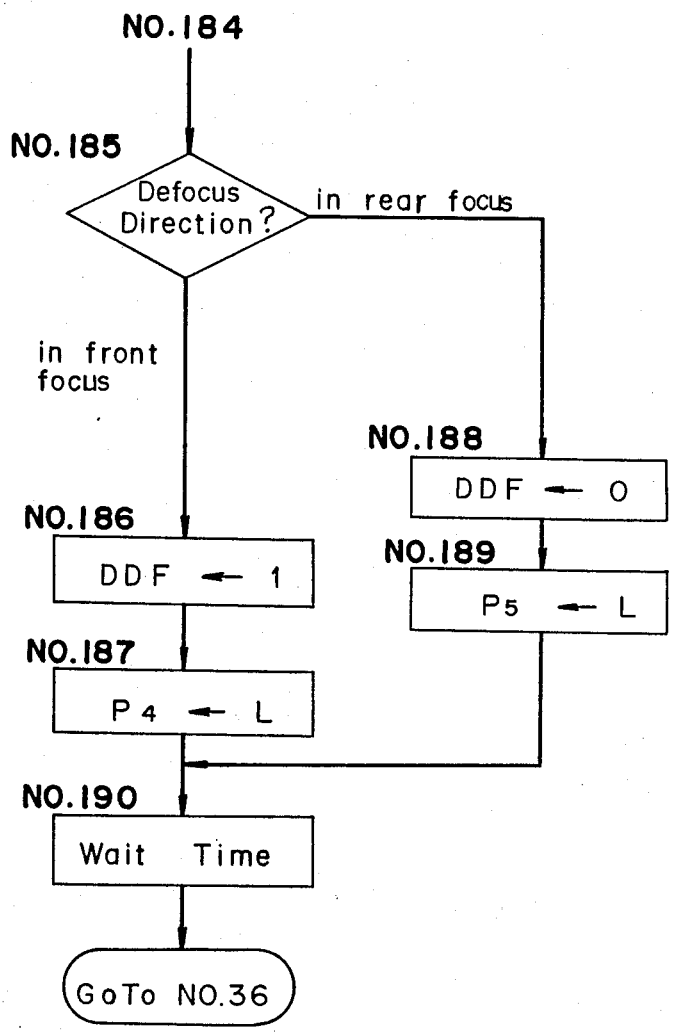
Figure 10C:
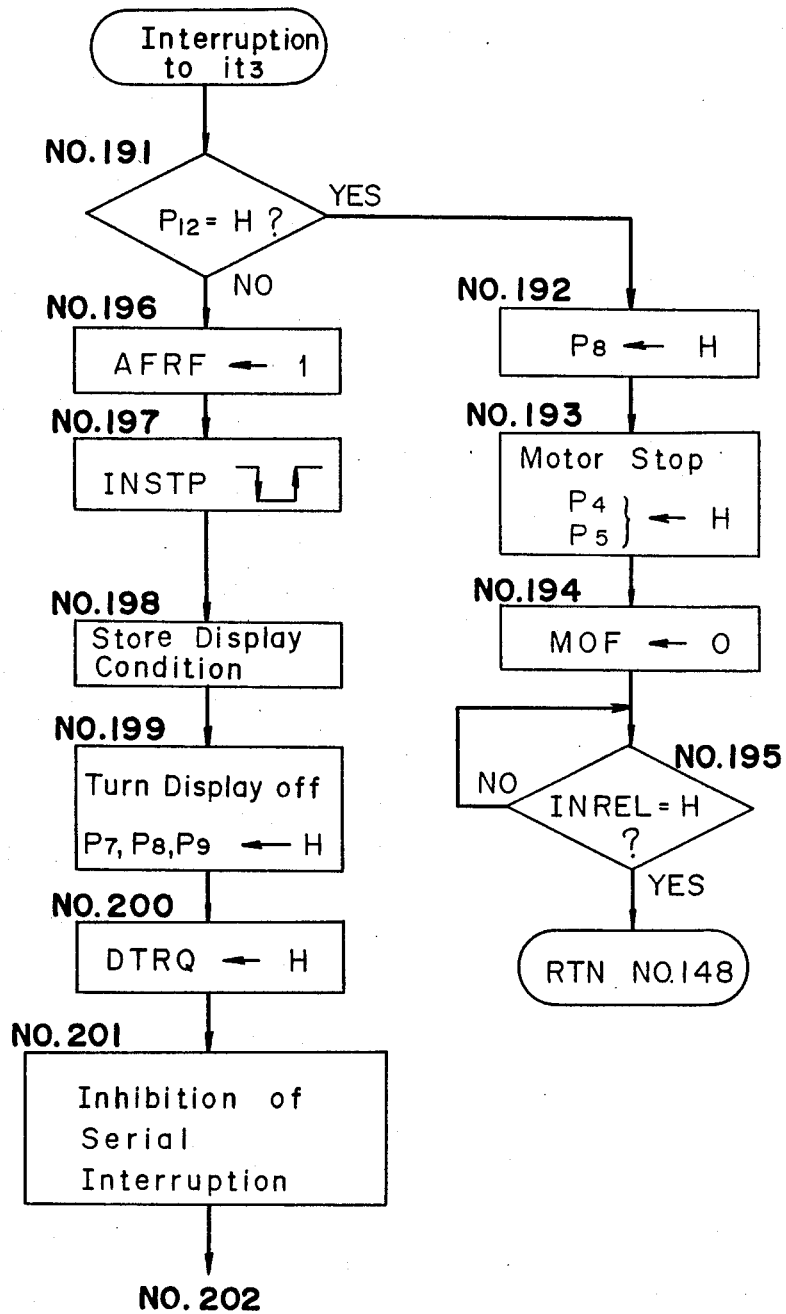
Figure 10D:
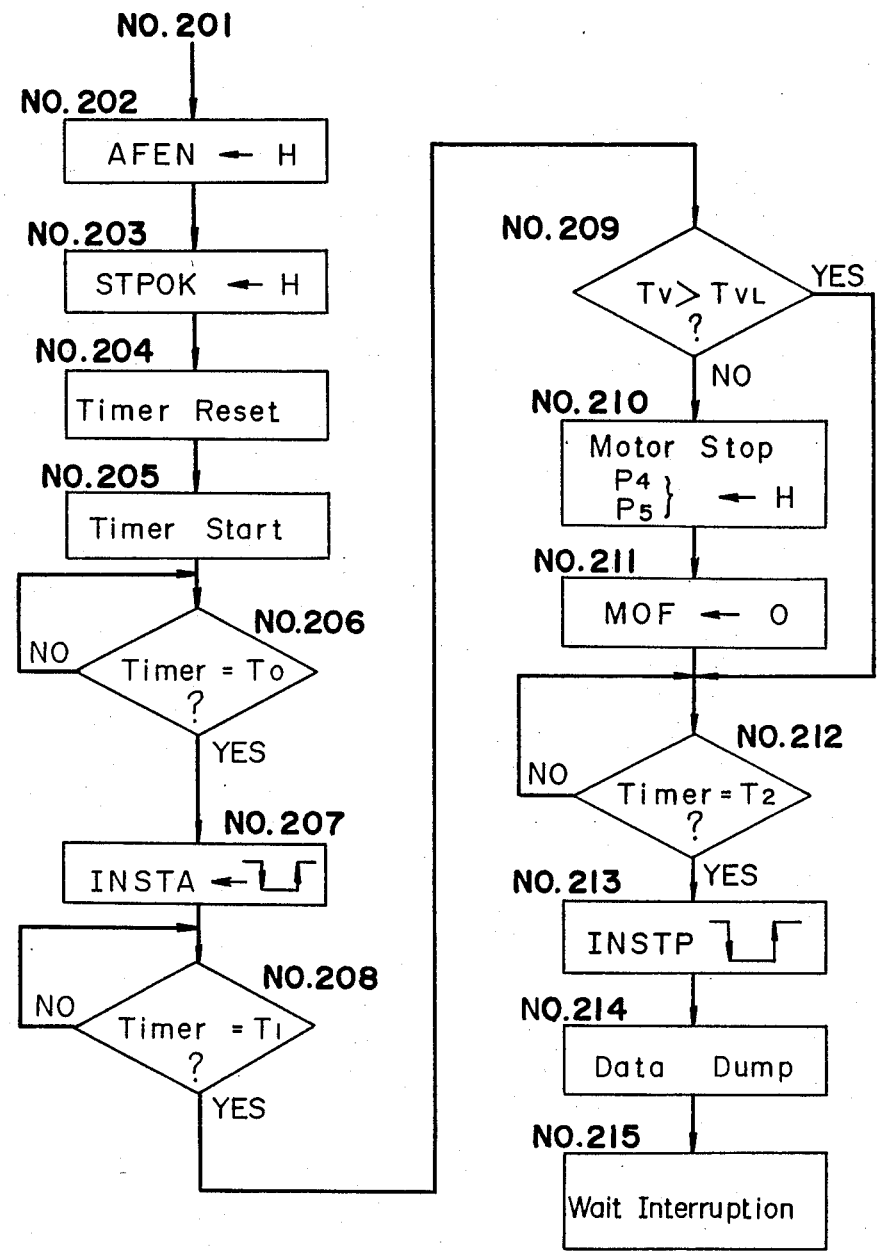
Figure 11A:
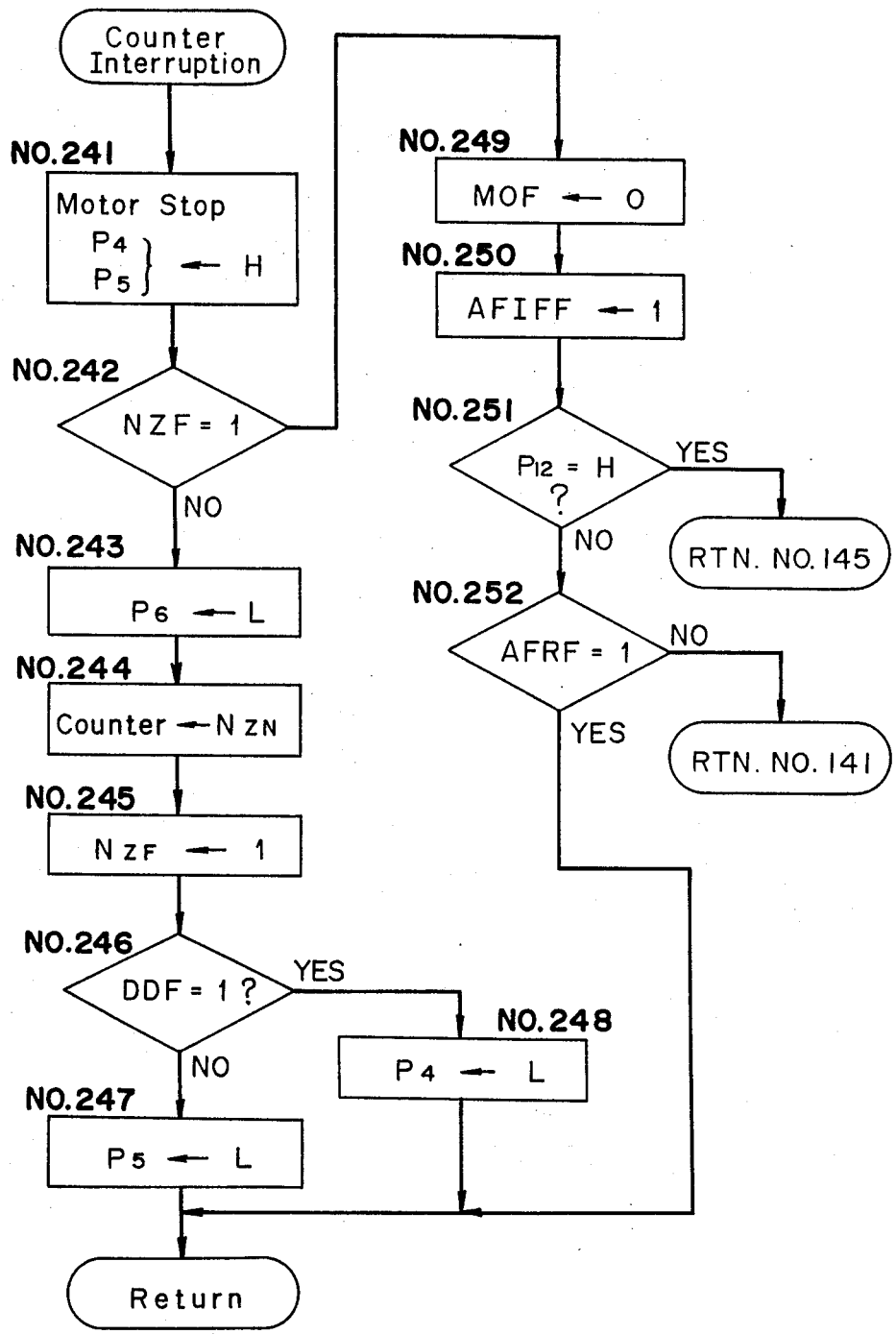
Figure 11B:
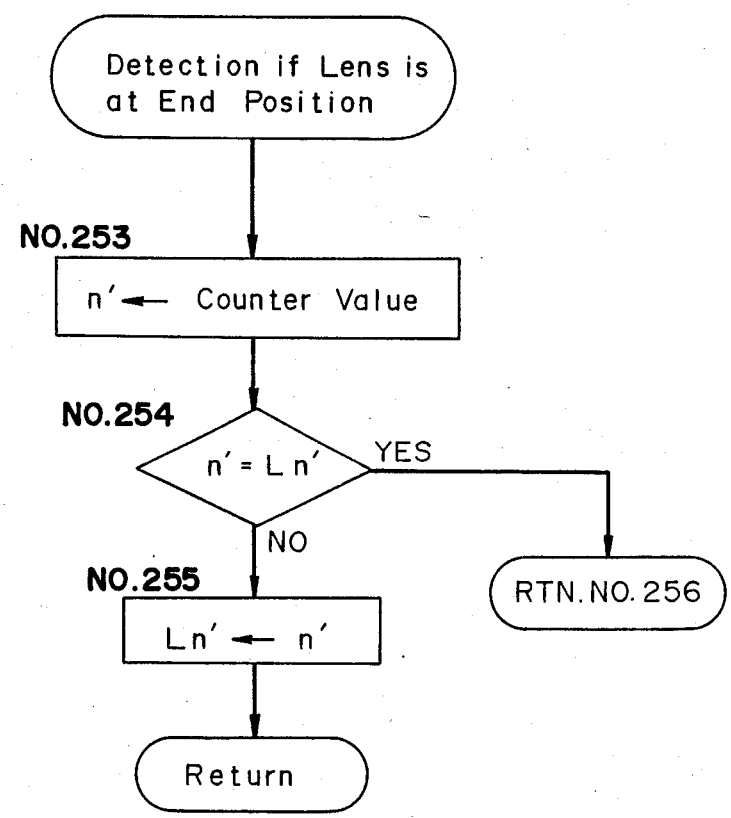
Figure 11C:
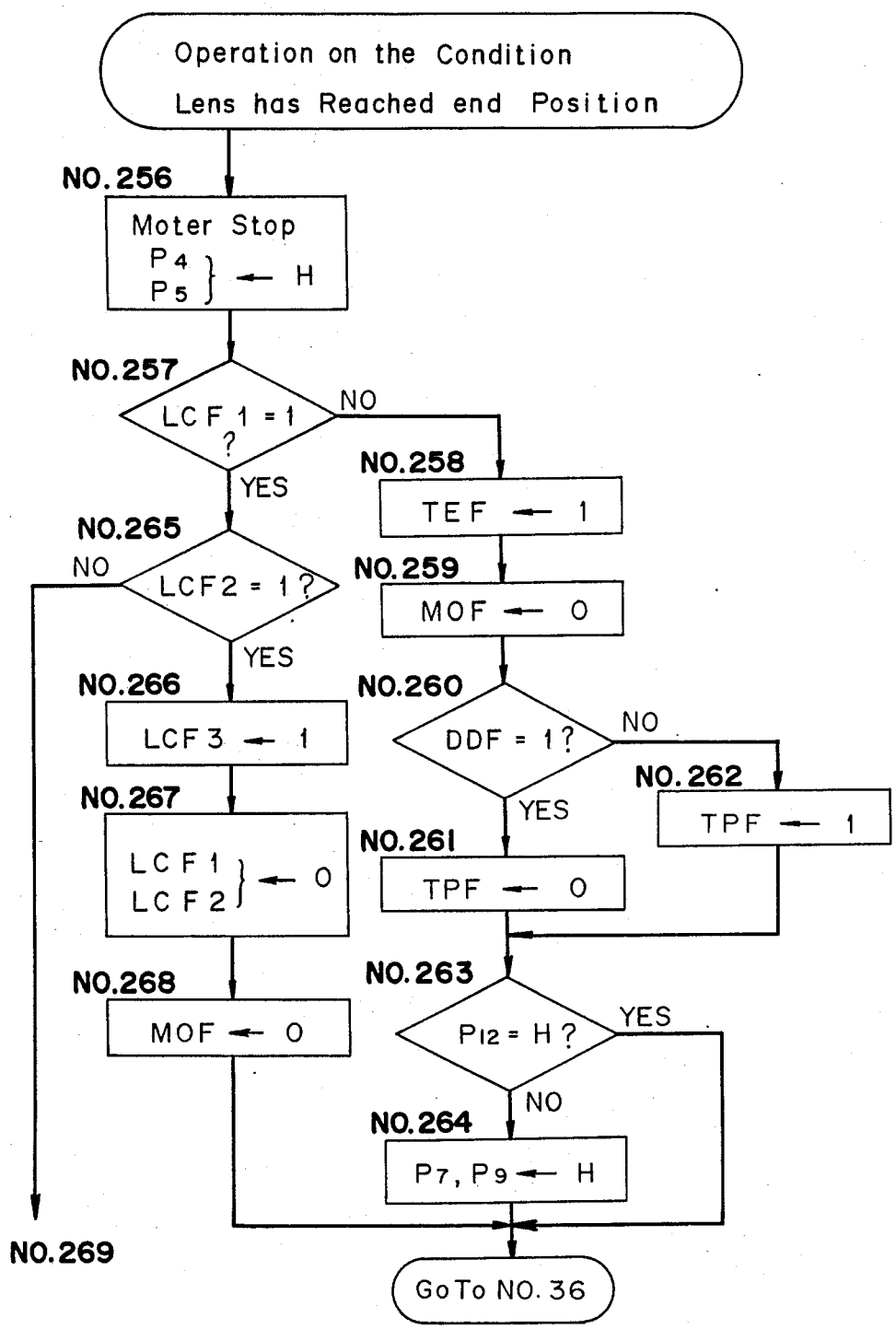
Figure 11D:
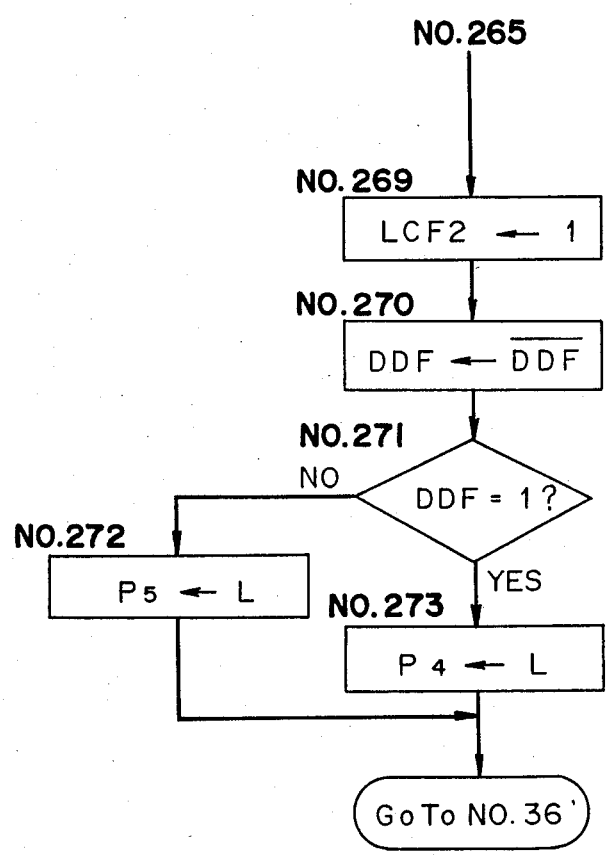

FIG. 5 shows an example of a circuit arrangement in which an AF control circuit such as the AF microcomputer $MC_2$ is mounted in the interchangeable lens. In this case, the switch is connected to the terminal SIN. Moreover, the data of the predetermined conversion factor of the lens is inputted to the terminals $P_7$, $P_9 \sim P_{11}$ and $P_{13} \sim P_{16}$. That is, the data outputted from a zoom code plate FCP in accordance with the set focal distance is converted to the data of the conversion factor through a decoder DCC, the data of the conversion factor is inputted to the above terminals $P_7$, $P_9 \sim P_{11}$ and $P_{13} \sim P_{16}$. Moreover, as the display device used for displaying the in focus condition, a buzzer BZ controlled by a control circuit SOC is employed without any emitting diode therefore. The operation of the AF microcomputer $MC_2$ is set about as soon as the driving power is supplied. Therefore, it is not necessary to provide a function of the said interrupt terminal $it_1$, the AF microcomputer $MC_2$ is connected to the driving power line through the pull up resistor. As the AF operation is stopped when the driving power is cut off, or when the exposure control operation of the camera is set about, it is not necessary to provide the said interrupt terminal $it_2$ and the AF microcomputer $MC_2$ is connected to the driving power directly. In the above description, it is not necessary to read the serial data after the data of the lens LE is transferred to the AF microcomputer $MC_2$ through the microcomputer $MC_1$, therefore, a serial input terminal $SIIN_0$ and the clock input terminal $SICK_0$ are connected to the driving power line directly.

Referring to the flow charts shown in FIGS. 6 and 11, the operation of the AF microcomputer $MC_2$ will be described. The operation of the AF microcomputer $MC_2$ is set about from the step No. 1 as soon as the power switch is turned on. At the step No. 1, all the flags are reset. In case each flag is set "0" at the initial condition, it is easy to initialize all the flags. At the step No. 2, all the output data (the dark output of the CCD) on the condition that the light is projected to the CCD are set "0". Next, at the step No. 3, the signal outputted from the switch SNS used for switching the single mode or normal mode is read. In case the said signal is "High", this case corresponds to the lens single body mode (the single mode), the program flow goes to the step No. 9. Then the input and output ports used in the single mode are initialized at the steps No. 9 and No. 10. However, in this case it is enough that the ports used only as the output mode are initialized at the steps No. 9 and No. 10, because all the input and output ports are set as the input mode at the power on reset performed when the above power switch is turned on. Then at the step No. 11 and No. 12, it is permitted to interrupt to only the terminal $it_3$, the program flow goes to the step No. 36 which is the head step of the storing routine. In case of the single mode, the operation of the said single mode is set about by turning the power switch on. In case of the focusing mode only one shot AF control mode (the position of the lens is fixed after the AF control is once perfected) is performed. On the other hand, at the step No. 3, in case it is determined that the terminal $P_{12}$ to which the signal outputted from the switch SNS is inputted is "Low". This case corresponds to the camera mode (normal mode), at the steps No. 4, No. 5 and No. 6, the input and output ports are initialized. Then at the steps No. 7 and No. 8, it is permitted to interrupt to the terminals $it_1$, $it_2$ and $it_3$ and the program flow goes to the operation of the stop mode. The stop mode is one of functions provided in the microcomputer, which is a power saving mode with the clock pulses stopped holding the content of the memory unchanged. Using the power saving mode prevents from consuming the unnecessary power. In the operation of the AF microcomputer $MC_2$, the program flow goes out from the stop mode by performing the reset or inputting any interrupt signal. Moreover, the following is not shown in the flow charts, the microcomputer $MC_1$ can perform the power on reset operation like the AF microcomputer $MC_2$. When the power on reset operation is made to stop, the microcomputer $MC_1$ outputs the signal AFSTP in order to stop the AF operation. As soon as the AF microcomputer $MC_2$ receives the signal AFSTP, it is determined whether it is permitted or not that the operation of the AF microcomputer $MC_2$ is made to stop. In case it is permitted, the AF microcomputer $MC_2$ outputs the "Low" signal STPOK which represents that it is permitted that the operation of the AF microcomputer $MC_2$ is made to stop. Then the microcomputer $MC_1$ stops to output the reference clock pulses STCL and the operation of the both microcomputers $MC_1$ and $MC_2$ is made to stop.

In case of the normal mode, when the AF microcomputer $MC_2$ sets about, the AF microcomputer $MC_2$ outputs a "Low" signal AFSTA. Then the interrupt signal inputs to the interrupt terminal $it_1$, the program flow goes to the step No. 14. At the step No. 14, the terminal $P_{13}$ is made "High" and it is informed to the microcomputer $MC_1$ that the reference clock pulses must be continued, and in turn at the step No. 15, the terminal $P_{14}$ is made "Low", it is informed to the microcomputer $MC_1$ that the operation of the AF microcomputer $MC_2$ sets about. At the step No. 16 through No. 20, it is permitted to interrupt to the interrupt terminal $it_2$ and $it_3$ only in case of a necessary interruption, on the other hand, an unnecessary interruption is inhibited. At the step No. 21, the condition of the after a release flag AFRF which designates whether the release operation has been operated is detected, then it is determined whether or not the interruption to the interrupt terminal $it_1$ was performed after the release operation. In case the flag AFRF is "1", the program flow goes to the step No. 22 with the interruption performed after the release operation. The operation from the step No. 21 will be described later. In case the flag AFRF is "0" at the step No. 21, the program flow goes to the step No. 27. The operation from the step No. 27 is an operation of a first serial communication that the data are transferred in series between the microcomputer $MC_1$ and the AF microcomputer $MC_2$. At the step No. 27, "0" is set in the serial data counter k, wherein the data has four data and the length of each data is eight bits. Next, the interruption in the serial communication is permitted. When the interruption in the serial communication is performed, eight pulses of the serial clock pulses SICK are inputted to the terminal $SICK_0$. After the eight pulses of the serial clock pulses SICK are inputted to the serial data register, the interruption is performed. At the step No. 30, the terminal $P_{16}$ is made "Low" and the demand signal DTRQ in the serial communication is outputted to the microcomputer $MC_1$. After the microcomputer $MC_1$ receives the demand signal DTRQ, the microcomputer $MC_1$ outputs the serial clock pulses and the data, then the microcomputer $MC_1$ makes the terminal $P_{25}$ "High". Making the terminal $P_{25}$ "High" is performed in order to prevent the data passing through the serial communication line from interfering. The said "High" signal is used for selecting each circuit because the serial communication line is used for communicating with the display unit DSP, the ROM in the lens LE and so on. When the microcomputer $MC_1$ communicates with the AF microcomputer $MC_2$ in series, the microcomputer $MC_1$ makes the terminal $P_{25}$ "High", then the serial communication line can be used to communicate with the AF microcomputer $MC_2$. When the selecting signal CSAF is "Low", the AF microcomputer $MC_2$ closes the gate of the serial clock pulses SICK. On the other hand, when the selecting signal CSAF is "High", the AF microcomputer $MC_2$ opens the gate for the serial clock pulses SICK. Therefore, the selecting signal CSAF prevents the AF microcomputer $MC_2$ from sending and receiving from and to the other circuit.

After the microcomputer $MC_1$ outputs the signal DTRQ in order to perform the serial communication, the microcomputer $MC_1$ waits until all the data are inputted by the interruption at the step No. 31. After the eight pulses of the serial clock pulses SICK are inputted, the interruption is performed. Then the program flow goes to the step No. 225 shown in FIG. 6. The data inputted to the serial register are transferred to a register $SDR_k$ at the step No. 225, and the next register $SDR_{k+1}$ is set at the step No. 226. At the step No. 227, the microcomputer $MC_1$ outputs a "High" signal to the terminal DTRQ and the program flow goes to the step No. 31 in FIG. 7. After the interruption has been performed four times, with all the data inputted, the content of the serial data counter is "4". Then the program flow goes to the step No. 32 through No. 31, then the serial interruption is inhibited and the serial communication is completed. At the step No. 33, it is determined whether the signal inputted from the switch AMS used for selecting the AF mode or the FA mode to the terminal $P_{11}$ is "High" or not. In case the signal is "High", when the AF mode has been selected, a focus mode flag FMF is made "0". On the other hand, in case the signal is "Low", when the FA mode has been selected, "1" is set in the flag FMF. Then the program flow goes to the integral routine from the step No. 36. In case of the single mode, the program flow goes from the step No. 12 to the step No. 36 because it is not necessary to perform the serial communication.

At the step No. 36, a low light flag LLF is reset. The flag LLF is set when the charging time of the CCD has passed for a predetermined maximum time in case of an object with low brightness. At the step No. 37, the content of the event counter is set in a register $n_1$. The event counter is a subtraction counter which subtracts "1" each time during which the negative edge of the pulses are inputted to the terminal $CLI_0$. The pulses inputted from the encoder circuit ENCC detecting the rotation quantity of the motor MO are inputted to the said terminal $CLI_0$. The content of the event counter (the content of the register $n_1$) is used for the correction of the amount of the movement of the lens when the defocus quantity is being measured during driving the motor MO, the content of the event counter is not used when the motor MO is not rotating. At the step No. 38, a timer is reset, and the interruption of the timer is permitted at the step No. 39. At the step No. 40, the "Low" signal is outputted to the line terminal $P_1$ for a predetermined time and thereby the interface circuit INF is made to set about the integral operation of the CCD. At the step No. 41, the timer starts and count the integral time. At the step No. 42, it is determined whether the integral completion signal is inputted from the interface circuit INF or not. The signal INEN becomes "Low" when the charging quantity of the CCD reaches a predetermined proper value, the "Low" signal INEN represents the completion of the interruption of charge in the CCD. After the signal INEN is detected "Low", when charging is completed, the program flow goes to the step No. 49 through No. 48. In case the signal INEN is "High", it is detected whether the counting time of the timer reaches a time $t_1$ or not. The time $t_1$ corresponds to the time interval at which it is detected that the lens is moved to the end position. In case any pulse from the encoder circuit is not inputted, it is determined that the lens has been moved to the end position. In order to perform the determination, at the step No. 45, the subroutine shown in FIG. 11 where it is detected that the lens has been moved to the end position is executed. At the step No. 43, in case the timer value is not equal to the time $t_1$, the program flow goes to the step No. 44, then it is determined whether the timer value reaches the maximum integral time $t_2$ or not. In case the timer value reaches the time $t_2$, the program flow goes to the step No. 46. In case the timer value does not reach the time $t_2$, the program flow goes back to the step No. 42, then the above operation is repeated. When the integral operation of the CCD is completed until the timer value becomes a time $t_0$ ($t_0 < t_2$), the object has high brightness, then a flag HLF is set. On the other hand, in case the brightness of the object is low, the flag HLF is reset and the program flow goes to the step No. 49.

When the charging time reaches the maximum charging time, a "Low" signal is outputted to the terminal $P_2$ at a predetermined time and the integral operation is stopped compulsorily. At the step No. 47, the low light flag LLF is set and the high light flag HLF is reset, the program flow goes to the step No. 49. The timer interruption is inhibited at the step No. 49, the timer is made to stop at the step No. 50. At the step No. 51, the content of the event counter is set in a register $n_2$ in the same way as made in the step No. 37. A digital value converted from the output of the CCD in the interface circuit is inputted as a signal ADD every predetermined interval since the integral operation is completed. At the step No. 52, the said signal ADD is inputted to the input port $D_0$ at the negative edge of the timing signal ADEN inputted to the terminal $P_3$ and the signal ADD is stored in a memory.

After input of the data is completed, the terminal $P_{12}$ is checked, and in case the terminal $P_{12}$ is "Low", under the normal mode, the program flow goes to the step No. 54. On the other hand, in case the terminal $P_{12}$ is "High", under the single mode, the program flow goes to the step No. 55. At the step No. 54, the value subtracted the data of the dark output from the respective output data of the CCD is set as the data for compensation of the dark output.

At the step No. 55, the subroutine of the focus lock check shown in FIG. 6 is called. The subroutine of the focus lock check sets about from the step No. 229. At the step No. 229, the flag FMF is checked. In case the flag FMF is "1", under the FA mode, the program flow returns without checking the focus lock switch FLS. On the other hand, in case the flag FMF is not "1", under the AF mode, the program flow goes to the step No. 230, then the signal inputted from the focus lock switch FLS is checked. In case the signal inputted from the focus lock switch FLS is "High", when this case does not mean the condition of the focus lock, the program flow goes to the step No. 236. On the other hand, in case the signal inputted from the focus lock switch FLS is "Low", when this case means the condition of the focus lock, the program flow goes to the step No. 231. At the step No. 231, a focus lock flag FLF is checked, in case the flag FLF is "1", the program flow returns. In case the flag FLF is "0", the program flow goes to the step No. 232, then the stop signal is outputted to the motor MO. Next, a motor flag MOF is reset. Then the counter interruption is inhibited, and the flag FLF of the focus lock is set. After that, the program flow returns to the step No. 36. Moreover, at the step No. 230, in case the signal inputted from the focus lock switch FLS is "High", the focus lock flag FLF is checked at the step No. 236. In case the flag FLF is "0", the program flow returns determining that the previous routine already executed is not the focus lock. On the other hand, in case the flag FLF is "1", the focus lock flag FLF is reset at the step No. 237 due to the condition that the focus lock is already released. Next, it is determined whether a low contrast flag $LCF_0$ is "1" or not. When the low contrast flag is "1", this case means the condition that the contrast of the image is low. In case the flag $LCF_0$ is "1", all the low contrast flags $LCF_0$, $LCF_1$, $LCF_2$ and $LCF_3$ are reset and initialized, and the display is turned off at the step No. 240, then the program flow returns to the step No. 36. On the other hand, in case the flag $LCF_0$ is not "1" at the step No. 238, the program flow goes to the step No. 240 without performing the step No. 239, then the display is turned off at the step No. 240 and the program flow returns to the step No. 36.

The program flow goes back to the step No. 57 of the main routine, the preparation of the serial communication will be performed again. The operation of the steps No. 57 through No. 59 is the same operation as the operation of the steps No. 27 through No. 30. The serial communication is performed in order to input various data. The operation of the serial communication is performed by interrupting during the calculation at the step No. 60. On the other hand, in case the terminal $P_{12}$ is "High", under the single mode, the program flow goes to the step No. 55. Then the conversion data are inputted from the decoder circuit DCC shown in FIG. 5 to the terminals $P_7$, $P_9 \sim P_{11}$ and $P_{13} \sim P_{16}$, and the data is stored in a memory. The program flow goes to the step No. 60. At the step No. 60, the predetermined calculation is performed in accordance with the data inputted from the CCD, wherein a defocusing quantity $\Delta\epsilon$ and a defocusing direction are calculated. At the step No. 61, the serial interruption is inhibited, the program flow goes to the step No. 62 wherein the contrast determination is performed. In the contrast determination, it is determined whether the brightness of the image can be detected in accordance with the output of the CCD or not.

At the step No. 62, in case it is determined that the image has a low contrast, the program flow goes to the step No. 63. On the other hand, in case it is determined that the image has the normal contrast, the program flow goes to the step No. 93. Next, at the step No. 63, it is determined whether the flag FLF representing the condition of the focus lock is "1" or not. In case the flag FLF is "1", the program flow goes to the step No. 82. At the steps No. 82 through No. 85, displaying the condition of the low contrast (turning the light emitting diodes RFL and LFL on and off continuously) and setting of the low contrast flag $LCF_0$ is performed. Then the program flow goes to the step No. 36 in order to measure again. On the other hand, in case the flag FLF is not "1", when this case does not mean the condition of the focus lock, the program flow goes to the step No. 64. In case the flag FMF is "1", when the FA mode has been selected, the program flow goes to the step No. 82. On the other hand, In case the flag FMF is not "1", when the AF mode has been selected, the program flow goes to the step No. 65, then it is determined whether the motor MO is rotating or not.

In case the motor MO stops, the program flow goes to the step No. 66, then it is determined by the low contrast flag $LCF_3$ (the flag is referred to as a scan inhibit flag of the low contrast) whether scanning with the low contrast can be performed or not. In case the flag $LCF_3$ is "1", when scanning is inhibited, the program flow goes to the step No. 82. On the other hand, in case the flag $LCF_3$ is not "1", when scanning with the low contrast is permitted, the program flow goes to the step No. 67. In the steps No. 67 through No. 69, displaying the condition of the low contrast and setting the low contrast flag $LCF_0$ are performed. Next, at the step No. 70, the low contrast flag $LCF_1$ (the scan flag of the low contrast) is set. At the step 71, it is determined by the low light flag LLF whether the object has low brightness or not. In case the flag LLF is "1", when the object has low brightness, the low contrast flag $LCF_2$ which is the inverse of the scan flag is set at the step No. 73, then the program flow goes to the step No. 76. In case of the object with low brightness, the above operation is performed in order to perform scanning with the low contrast only in such a direction as the lens moves to the body of the camera and in order that the lens may move into the ∞ position when the lens cap is mounted. In case the flag LLF is not "1", when the object has not low brightness, the program flow goes to the step No. 72, then the low contrast flag $LCF_2$ is reset. At the step No. 74, in case of the rear defocusing, that is, when the image is out of focus backward, a driving direction flag DDF is reset at the step No. 75. On the other hand, at the step No. 74, in case of the front defocusing, that is, when the image is out of focus forward, the driving flag DDF is set at the step No. 76, then the program flow goes to the step No. 77. At the step No. 77, "High" is outputted to the terminal $P_{16}$, the rotation speed of the the motor MO is set in a high speed mode. The motor flag MOF is set at the step No. 78, then at the step No. 79, the driving power is supplied to the motor MO with the polarity corresponding to the driving direction flag DDF. Then scanning is performed and the program flow goes back to the step No. 36.

At the step No. 65, in case it is determined that the motor MO is rotating, it is determined whether the flag $LCF_1$ is "1" or not at the step No. 86. That is, it is determined whether the motor MO is rotating by scanning with the low contrast or by driving on the normal condition. In case the flag LCF is "1", when the motor MO is rotating by scanning with the low contrast, detecting whether the lens is at the end position or not is performed. Then the program flow goes back to the step No. 36 and scanning with the low contrast is set about continually. On the other hand, at the step No. 86, in case the flag $LCF_1$ is not "1", when the motor MO is rotating by driving on the normal condition, the program flow goes to the step No. 87. First of all, the motor is made to stop and the motor flag MOF is reset. Then the low contrast flag $LCF_0$ is set, the condition of the low contrast is displayed and the program flow goes back to the step No. 36 in order to measure again.

At the step No. 62, it is determined that the object has not low contrast, the program flow goes to the step No. 93. At the step No. 93, it is determined whether the flag FMF is "1" or not. In case the flag is "1", when the FA mode has been selected, the program flow goes to the step No. 97. At the step No. 97, the low contrast flag $LCF_0$ is checked. In case the low contrast flag $LCF_0$ is "1", when the object has low contrast, the low contrast flag $LCF_0$ is reset at the step No. 98, the display of the condition of the low contrast is turned off, then the program flow goes to the step No. 106. On the other hand, in case the flag FMF is not "1", under the AF mode, the program flow goes to the step No. 94. At the step No. 94, the scan inhibit flag $LCF_3$ of the low contrast is set. Therefore, scanning under the low contrast is inhibited so far as the object has the normal contrast once. At the step No. 95, it is determined by the low contrast flag $LCF_0$ whether the object has had the low contrast up to now or not. In case the flag $LCF_0$ is "1", when the object has had the low contrast, the program flow goes to the step No. 101. At the step No. 101, the driving power stops to be supplied to the motor MO. Next, the motor flag MOF is reset at the step No. 102, the low contrast flags $LCF_0$, $LCF_1$ and $LCF_2$ are reset. Then it is determined whether the terminal $P_{12}$ is "High" or not at the step No. 104. In case the terminal $P_{12}$ is not "High", when the normal mode has been selected, the display of the condition of the low contrast is turned off and the program flow goes back to the step No. 36 in order to measure again. On the other hand, at the step No. 104, in case the terminal $P_{12}$ is "High", the program flow goes back to the step No. 36 directly.

At the step No. 95, in case the flag $LCF_0$ is not "1", when the object has not had the low contrast, the program flow goes to the step No. 96. Then the focus lock flag FLF is checked, in case the flag FLF is not "1", when this case is not the condition of the focus lock, the program flow goes to the step No. 121. On the other hand, in case the flag FLF is "1", when this case is the condition of the focus lock, the program flow goes to the routine of the FA mode performed from the step No. 106. At the step No. 106, a focus width ZFA in the FA mode is set. The focus width ZFA in the FA mode varies in accordance with the maximum F number $AFA_{V0}$ used for controlling the focal distance automatically. In the present embodiment, ZFA is set as $(AFA_{V0}+\alpha)\times\beta$, wherein $\alpha$ is a bias value, $\beta$ is an appropriate factor and ZFA has the unit $\mu m$. Next, the program flow goes to the step No. 108, it is determined whether the defocusing quantity $\Delta\epsilon$ is within the range of the focus width ZFA or not. In case the defocusing quantity $\Delta\epsilon$ is within the range of the focus width ZFA, the program flow goes to the step No. 119. On the other hand, in case the defocusing quantity $\Delta\epsilon$ is not within the range of the focus width ZFA, program flow goes to the step No. 111.

In the following, the operation on the condition that the defocusing quantity $\Delta\epsilon$ is within the range of the focus width ZFA will be described. First of all, at the step No. 119, the AF microcomputer $MC_2$ outputs a "High" signal to the terminal $P_{14}$ in order to inform it to the microcomputer $MC_1$ that the image of the object has been in focus. Next, at the step No. 120, the light emitting diode IFL representing that the image of the object is in focus is turned on, and the program flow goes back to the step No. 36 in order to measure the light again. In the routine from the step No. 111, the operation on the condition that the defocusing quantity $\Delta\epsilon$ is not within the range of the focus width ZFA is performed. At the step No. 111, the AF microcomputer $MC_2$ outputs a "Low" signal to the terminal $P_{14}$ in order to inform it to the microcomputer $MC_1$ that the image of the object is out of focus. Then the AF microcomputer $MC_2$ outputs a "High" signal to the terminal $P_8$ and the display of the in focus condition is turned off. At the step No. 113, it is determined whether the flag FMF is "1" or not. In case the flag FMF is not "1", when the AF mode has been selected, the program flow goes to the step No. 115. In case of the AF mode, the program flow comes to this routine only on the condition of the focus lock. Then the display of the defocus is turned off and the program flow goes back to the step No. 36 in order to measure again. In case of the FA mode, when the program flow comes to the step No. 114, the defocusing direction is determined. In case the image of the object is out of focus backward, the light emitting diode RFL is turned on at the step No. 116. On the other hand, in case the image of the object is out of focus forward, the light emitting diode FFL is turned on at the step No. 117, then the program flow goes back to the step No. 36 in order to measure again.

After the program flow comes from the step No. 96 to the step No. 121 shown in FIG. 9, it is determined whether the converter lens COV is mounted or not. The mounting information of the converter lens COV is transferred from the microcomputer $MC_1$ by the serial communication at the step 31 shown in FIG. 7. In case the converter lens COV has not been mounted, it is determined whether the conversion factor kL is less than the threshold level $K_1$ or not at the step No. 122. The threshold level $K_1$ is the conversion factor at the threshold level that it becomes difficult for the motor MO to stop within the range of a minimum value b of the focus width when the preciseness of stopping the motor MO is taken account into. At the step No. 122, in case it is determined that the conversion factor kL is more than or equal to the threshold level $K_1$, the minimum value b is set as the focus width ZFA in the AF mode at the step No. 124, then the program flow goes to the step No. 126. At the step No. 122, in case the conversion factor kL is less than the threshold level $K_1$, $Av\times a$, that is, the value multiplied the effective aperture value Av during taking a picture by a value "a" is set as the focus width ZFA, wherein the value "a" is predetermined so that the value of ZFA is more than the minimum value b, that is, the image of the object may be in focus within the range of the position at which the lens moves freely. Therefore, widening the focus width is to make the motor MO rotate smoothly at the range at which it is difficult to control the rotation of the motor MO. At the step No. 121, in case it is determined that the converter lens COV is mounted, the program flow goes to the step No. 125. $(Av+C)\times a$, that is, the value multiplied the value, which is made by which the effective aperture value Av is added to a bias value C, by a factor "a", is set as the focus width ZFA. Adding the bias value C prevents it from being more difficult to control the motor MO when the converter lens COV is mounted than the case "ZAF=Av×a" of the step No. 123.

After setting of the focal width is completed, the defocusing quantity and the focus width are respectively converted to pulse count values for the encoder ENCC at the step No. 126. That is, the converted value $\Delta_n'$, which is the pulse count value of the defocusing quantity, is made by multiplying the defocusing quantity $\Delta\epsilon$ by the value multiplied the conversion factor kL in the lens by the conversion factor kB in the body of the camera. Similarly, a converted value ZAFC, which is the pulse count value of the focus width ZFA, is made by multiplying the focus width ZFA by the value multiplied by the conversion factor kL in the lens by the conversion factor kB in the body of the camera. Moreover, it is necessary for the data kL to convert to the conversion factor a decimal system, because the conversion factor transferred from the microcomputer $MC_1$ is the data kL which consists of the fractional part and the exponential part.

At the step No. 127, it is determined by the motor flag MOF whether the motor MO is rotating or not. In case the motor flag MOF is not "1", when the motor MO stops, a count value $\Delta n'$ of the defocus pulses is set as a number of driving pulses at the step No. 128, then the program flow goes to the step No. 135. On the other hand, at the step No. 127, the motor flag MOF is "1", when the motor MO is rotating, it is determined whether the lens is at the end position. In case the lens is not at the end position, the count value of the encoder is read into the register $n_3$ as soon as the operation at the step No. 131 is completed. The compensation quantity $\Delta n''=n_1-n_3-(n_1-n_2)/2$ by moving is calculated at the step No. 133, and the compensation defocus count value $\Delta n = \Delta n' - \Delta n''$ is calculated in order to compensate the moved quantity of the lens at the step No. 134. Then, at the step No. 135, it is determined whether the defocus count value $\Delta n$ is within the range of the count value of a focus width ZFAC or not. In case $\Delta n$ is more than ZAFC, the program flow goes to the step No. 149. In case $\Delta n$ is less than or equal to ZAFC, when the image of the object is in focus, the program flow goes to the step No. 136. At the step No. 136, the driving power stops to be supplied to the motor MO, then the motor flag MOF is reset at the step No. 137. Next, at the step No. 138, the compensation defocus count value $\Delta n$ is set as the former defocus quantity $\Delta nL$. Then the program flow goes to the step No. 139, it is determined whether the terminal $P_{12}$ is "High" or not. In case the terminal $P_{12}$ is "High", when the single mode has been selected, the program flow goes to the step No. 145. The AF microcomputer $MC_2$ outputs "Low" to the terminal $P_8$ at the step No. 145, the buzzer informing the in focus condition vibrates at a predetermined time at the steps No. 146 and No. 147. In case of the single mode, one measuring operation is completed. Then the AF microcomputer $MC_2$ waits the interrupt signal at the step No. 148.

At the step No. 139, in case the terminal $P_{12}$ is "Low", under the single mode, then an in focus flag AFIFF is set at the step No. 140 and a first out flag FOF is reset. Then the AF microcomputer $MC_2$ outputs "High" to the terminal $P_{14}$ in order to inform it to the microcomputer $MC_1$ that the image of the object has been in focus. Then the AF microcomputer $MC_2$ outputs "High" to the terminals $P_7$ and $P_9$ and output "Low" to the terminal $P_8$ in order to turn the light emitting diode IFL on. The program flow goes back to the step No. 36 in order to measure again.

Moreover, at the step No. 135, in case it is determined that $\Delta$ is more than ZAFC, the AF microcomputer $MC_2$ outputs "Low" to the terminal $P_{14}$ in order to inform it to the microcomputer $MC_1$ that the image of the object is still out of focus. Next, at the step No. 150, in case it is determined that the motor flag MOF is "1", the program flow goes to the step No. 155, then $n_3$ is set as the former defocus count value $\Delta nL$. On the other hand, in case the motor flag MOF is not "1", when the motor MO stops, the program flow goes to the step No. 151. In the following, setting of the near zone near the focus will be described. First of all, there is provided two kinds of width of the near zone, that is, one is width Nzn used for determining whether the lens has been in the near zone when the lens is moved from the outside of the near zone into the inside of the near zone, and another one is width Nzw (Nzw>Nzn) used for determining where the lens is in order to catch up with the object at a low speed. Nzw is set as the value with the results of the pulse count comparison value ZAFC multiplied by "j" (j>1), on the other hand, Nzn varies in accordance with the rotating quantity calculated. First of all, there is provided a maximum rotating quantity $N_1$ counted for the time in which it takes to stop for the motor MO from the rotating condition at the maximum speed by braking. Next, there also is provided a maximum rotating quantity $N_2$ of the motor MO counted for the time in which it takes to rotate at the maximum speed for the motor MO from the stop condition. Then in case the calculated rotating quantity $\Delta n > N_1 + N_2 = X_1$, $N_1$ is set as the near focus zone Nzn. On the other hand, in case $\Delta n < N_1 + N_2$, $N_1$ is set as Nzn. In this case, the motor MO is braked before the motor MO rotates at the maximum speed, therefore, after the rotation speed of the motor MO reaches a low speed early, the lens is moved to the focus position at the low speed. Therefore, it causes a problem in that it takes a long time for the lens to reach the focus position, particularly in the condition that $\Delta n$ approximates $N_1$. At the step No. 151, in case the defocus count value $\Delta n$ is more than $X_1$, the maximum value $N_1$ ($X_1 > N_1$) is set as the width Nzn of the near focus zone. Conversely, in case $\Delta n$ is less than or equal to $X_1$, the value multiplied the defocus count value $\Delta n$ by "d" (d<1) is set as Nzn. At the step No. 154, the comparison value with the results of the count value ZAFC multiplied by "j" (j>1) set as the width Nzw of the near zone used for catching up with the object. (Nzn<Nzw) Next, it is determined whether the focus flag AFIFF is "1" or not. In case the focus flag AFIFF is "1", the program flow goes to the step No. 156. On the other hand, in case the flag AFIFF is not "1", it is determined whether the first out flag FOF is "1" or not. In case the first out flag FOF is "1", the program flow goes to the step No. 156. In case the first out flag FOF is not "1", the defocus count value $\Delta n$ is set as the former defocus count value $\Delta nL$. At the step No. 156, it is determined whether the high light flag HLF is "1" or not, in case the flag HLF is not "1", the program flow goes to the step No. 159 without executing the steps No. 157 through No. 160. Then the defocus count value $\Delta n$ is set as the former defocus count value, the program flow goes to the step No. 164.

At the step No. 156, in case the high light flag HLF is "1", the program flow goes to the step No. 157. Then the difference between the former defocus count value ΔnL and the present defocus count value Δn, that is, the changed quantity $\Delta^2 n$ of the defocus count value is calculated. Next, at the step No. 158, it is determined whether the changed quantity $\Delta^2 n$ is less than a predetermined quantity $L_1$. In case $\Delta^2 n$ is less than or equal to $L_1$, the program flow goes to the step No. 159 in the same way of the case that the flag HLF has been reset. On the other hand, at the step No. 158, in case the changed quantity Δn is more than the predetermined quantity $L_1$, the program flow goes to the step No. 160. Then it is determined whether the first out flag FOF is "1", in case the flag FOF is not "1", the program flow goes to the step No. 161. The AF microcomputer MC$_2$ outputs the stop signal to the motor MO, the motor flag MOF is reset at the step No. 162, then the first out flag FOF is set and the program flow goes back to the step No. 36 in order to measure again. At the step No. 160, in case the first out flag FOF is "1", the program flow goes to the step No. 164. The above operation of calculating the changed quantity $\Delta^2 n$ and comparing $\Delta^2 n$ with the predetermined quantity $L_1$ are performed in order to prevent from responding as a large defocus quantity when the large defocus quantity is suddenly calculated through an error on the condition of catching up with the object.

At the step No. 164, the first out flag FOF is reset and also the focus flag AFIFF is reset. Next, at the step No. 165, it is determined whether a near zone flag NZF is "1". In case the near zone flag NZF is "1", the program flow goes to the step No. 170, on the other hand, in case the near zone flag NZF is not "1", the program flow goes to the step No. 166. The above determination of the near zone flag NZF is performed in order to enlarge the range at which the motor MO rotates at a low speed during the catching up mode after the lens has entered into the range of the near zone. Therefore, at the step No. 166, the defocus count value Δn is compared with the narrower near zone count value Nzn, and at the step No. 170 the defocus count value Δn is compared with the wider near focus zone count value Nzw. At the steps No. 166 or No. 170, in case it is determined that the defocus count value Δn is less than or equal to the near zone count value Nzn or Nzw, the program flow goes to the step No. 167, then the near zone flag NZF is set. After that, the AF microcomputer MC$_2$ outputs "Low" to the terminal P$_6$ in order to make the motor control circuit MCC control so that the motor MO rotates at a low speed. At the step No. 159, the defocus count value Δn is loaded in the counter and the program flow goes to the step No. 166. At the steps No. 166 or No. 170, in case it is determined that the defocus count value Δn is more than the near zone count value Nzn or Nzw, the program flow goes to the step No. 171, then the near zone flag NZF is reset. Next, at the step No. 172, the AF microcomputer MC$_2$ outputs "High" to the terminal P$_6$ in order to make the motor control circuit MCC control so that the motor MO rotates at a high speed. At the step No. 173, the value subtracted the near zone count value Nzn from the defocus count value Δn is loaded to the counter, and the program flow goes to the step No. 175. In FIG. 10, the steps No. 175 through No. 182 are the operation performed when the lens is at the end position. At the step No. 175, it is determined whether a terminal flag TEF is "1" or not. In case the lens is not at the end position, i.e. ∞ position, therefore the terminal flag TEF is not "1", then the program flow goes to the step No. 183. On the other hand, when the lens is at the end position, i.e. ∞ position, therefore the terminal flag TEF is "1", then the program flow goes to the step No. 176. At the step No. 176, the defocus direction is determined. In case the image of the object is out of focus forward, the program flow goes to the step No. 177. On the other hand, in case the image of the object is out of focus backward, the program flow goes to the step No. 178. Then in the both cases, a terminal position flag TPF is checked. When the terminal position flag TPF is "1", the lens is at the nearest end position to the object. On the other hand, when the terminal position flag TPF is not "1", the lens is at the ∞ end position. At the step No. 177, in case the terminal position flag TPF is not "1", the lens is at the ∞ position and is in a front focus. Therefore, the lens cannot be moved toward the body of the camera, the program flow goes to the step No. 180. In case the terminal position flag TPF is "1", the lens is at the nearest end position to the object and is in a front focus, that is, the lens can be moved toward the body of the camera. Then the program flow goes to the step No. 179 in order to make the motor MO rotate. On the other hand, at the step No. 178, in case the terminal position flag TPF is "1", the lens is at the nearest end position to the object and is in a rear focus, the lens cannot be moved toward the object. Then the program flow goes to the step No. 180. In case the terminal position flag TPF is not "1", when the lens is at the farthest end position from the object and is in a rear focus, the lens can be moved toward the object. Then the program flow goes to the step No. 179. At the steps No. 180 through No. 182, all the display of the focus condition and the out of focus condition is turned off, then the program flow goes back to the step No. 36 in order to measure again. At the step No. 179, the terminal flag is reset. Next, the motor flag MOF is checked at the step No. 183. In case the motor flag MOF is "1", when the motor has already been rotating, the program flow goes back to the step No. 36.

At the step No. 183, in case the motor flag MOF is not "1", when the motor MO stops, the motor flag MOF is set at the step No. 184. Next, at the step No. 185, the defocus direction is determined. In case the lens is in a front focus, the program flow goes to the step No. 186. On the other hand, in case the lens is in a rear focus, then the program flow goes to the step No. 188. At the step No. 186, the driving direction flag DDF is set. On the other hand, at the step No. 188, the driving direction flag DDF is reset. At the step No. 187 after the step No. 186, the AF microcomputer MC$_2$ outputs a "Low" signal to the terminal P$_4$. On the other hand, at the step No. 189 after the step No. 188, the AF microcomputer MC$_2$ outputs a "Low" signal to the terminal P$_5$. In the above both cases, the AF microcomputer MC$_2$ makes the motor MO rotate in the required direction. At the step No. 190 after the step No. 187 or No. 189, the AF microcomputer MC$_2$ waits until the speed of the rotation of the motor MO attains predetermined stable speed, then the program flow goes back to the step No. 36.

The length of the wait time in the step No. 190 may be a predetermined length of time by considering the amount of the load of the interchangeable lens and/or the drive voltage of the motor MO. In the step No. 190, as a way of deciding whether or not the flow should go to the step No. 36, the motor speed may be detected. Thus if it is detected that the motor speed reaches a predetermined value, the program flow goes to the step No. 36.

The operation from the step No. 191 is the interruption to the interrupt terminal $it_3$. The interruption to the interrupt terminal $it_3$ is performed in order that the microcomputer $MC_1$ orders to start the shutter release motion to the AF microcomputer $MC_2$. After the AF microcomputer $MC_2$ receives the interrupt signal at the interrupt terminal $it_3$, the program flow goes to the step No. 191. At the step No. 191, it is determined whether the terminal $P_{12}$ is "High". In case the terminal $P_{12}$ is "High", when the single mode is selected, the program flow goes to the step No. 192. Then the AF microcomputer $MC_2$ outputs a "High" signal to the terminal $P_8$ in order to disable an in focus indicating buzzer. Next, at the step No. 193, the AF microcomputer $MC_2$ outputs a "High" signal to the terminals $P_4$ and $P_5$ and makes the motor MO stop. At the step No. 194, the motor flag MOF is reset. Then the AF microcomputer $MC_2$ waits until the signal INREL becomes "High". In case the signal INREL is "High", the program flow returns to the step No. 148. At the step No. 191, in case the terminal $P_{12}$ is "Low", under the normal mode, the program flow goes to the step No. 196. Then the after release flag AFRF is set, then the AF microcomputer $MC_2$ outputs a "Low" signal to the terminal $P_2$ in order to stop charging in the CCD at the step No. 197. Then the display condition is stored in a memory at the step No. 198, and at the step No. 199, the AF microcomputer $MC_2$ outputs the "High" signals to the terminals $P_7$, $P_8$ and $P_9$ in order to turn the display off. Next, at the step No. 200, the AF microcomputer $MC_2$ outputs a "High" signal to the terminal $P_{16}$ in order to cancel a demand QTRQ of the serial data communication. Then at the step No. 201, the serial interruption is inhibited. The AF microcomputer $MC_2$ outputs a "High" signal to the terminal $P_{14}$ in order to inform it to the microcomputer $MC_1$ that the shutter release operation is permitted and the AF microcomputer $MC_2$ outputs "High" to the terminal $P_{13}$. At the step No. 204, the timer of the AF microcomputer $MC_2$ is reset. Next, the AF microcomputer $MC_2$ makes the timer start and the AF microcomputer $MC_2$ waits until the timer counts a predetermined time $T_0$. As soon as the timer counts the predetermined time $T_0$, the AF microcomputer $MC_2$ outputs a "Low" signal to the terminal $P_1$ at a predetermined time in order that the interface circuit INF begins to charge in the CCD. When the release operation of the shutter sets about, the shutter used for obstructing the light is closed and the light does not reach the CCD sensor MLMC. Therefore, the above integral operation is to store the charge in the CCD corresponding to the dark output. The program flow goes to the step No. 208, as soon as the timer counts the time $T_1$, the program flow goes to the step No. 209. At the step No. 209, it is determined whether the exposure time value Tv for photographing is more than a threshold value TvL. In case the exposure time value Tv for photographing is more than TvL, the AF microcomputer $MC_2$ makes the motor rotate continuously without stopping. Then the motor MO is made to stop when the motor MO rotates for the driven time and the counter interruption is received because the counter interruption is permitted. The routine of the counter interruption will be described later. The threshold value TvL is set by such a value that the photograph by the exposure operation is not badly influenced even though the exposure is made while the lens is being moved. At the step No. 209, in case the value Tv for photographing is less than or equal to the threshold value TvL, the program flow goes to the step No. 210. Then the driving signal to the motor MO is turned off in order to stop the motor MO. Besides, the timer value $T_0$ and $T_1$ are set in order to make the first curtain of the shutter in the camera begin to run (at the step #91 in FIG. 3) after the motor MO is actually made to stop by "High" driving signals RRT and LRT. Then the motor flag MOF is reset at the step No. 211. The program flow goes to the step No. 212, the AF microcomputer $MC_2$ waits until the timer counts the time $T_2$. As soon as the timer counts the time $T_2$, at the step No. 213, the AF microcomputer $MC_2$ outputs a "Low" signal to the terminal $P_2$ at a predetermined time in order to stop to charge in the CCD in connection with the dark output. Then at the step No. 214, the CCD data of the dark output is read and stored in a memory. After that, the AF microcomputer $MC_2$ waits the interruption.

In FIG. 6, the operation from the step No. 216 is the interruption to the interrupt terminal $it_2$, which is the AF stop interruption caused by the microcomputer $MC_1$. As soon as the $it_2$ interruption is received, the program flow goes to the step No. 216. Then the driving signal to the motor MO is turned off in order to make the motor MO stop. Next, the AF microcomputer $MC_2$ outputs a "High" signal to the terminal $P_7$, $P_8$ and $P_9$ and turn the display off. At the step No. 218, the AF microcomputer $MC_2$ outputs a "High" signal to the terminal $P_{16}$ and the AF microcomputer $MC_2$ cancels the demand of the serial data communication. The program flow goes to the step No. 219, the AF microcomputer $MC_2$ outputs a "Low" signal (the signal INSTP) to the terminal $P_2$ for a predetermined time and stop charging in the CCD. At the step No. 220, the interruption to the terminals except for the interrupt terminal $it_1$ and $it_2$ is inhibited, and at the step No. 221, the AF microcomputer $MC_2$ outputs a "High" signal to the terminal $P_{14}$ in order to inform the microcomputer $MC_1$ that the operation of the automatic focal distance control is completed. At the step No. 222, the flags to be reset are reset, the program flow goes to the step No. 223, then the AF microcomputer $MC_2$ outputs a "Low" signal to the terminal $P_{13}$ and the program flow goes to the power saving mode.

The routine of the counter interruption sets about from the step No. 241 as shown in FIG. 11. As soon as the value counted down by each counter becomes "0", the counter interruption sets about and the program flow goes to the step No. 241. At the step No. 241, the driving signal to the motor MO is turned off. Next, at the step No. 242, the near zone flag NZF is checked. In case the flag NZF is not "1", the program flow goes to the step No. 243 in order to change the rotation speed of the motor MO from a high speed to a low speed. At the step No. 243, the AF microcomputer $MC_2$ outputs a "Low" signal to the terminal $P_6$ and the AF microcomputer $MC_2$ makes the motor control circuit MCC control the motor MO at a low speed. Next, at the step No. 244, the near zone count value Nzn is loaded to the counter. Then at the step No. 245, the near zone flag NZF is set. At the steps No. 246 through No. 248, the driving direction flag DDF is checked, then the AF microcomputer $MC_2$ outputs "Low" to the terminal $P_4$ or $P_5$ in accordance with the said direction in order that the motor MO rotates in accordance with the said direction. The program flow returns.

At the step No. 242, in case the near zone flag is "1", when the motor MO has rotated for a required driving time, the program flow goes to the step No. 249, then the motor flag MOF is reset. Next, at the step No. 250, the AF focus flag AFIFF is set. Then at the step No. 251, it is determined whether the terminal $P_{12}$ is "High". In case the terminal $P_{12}$ is "High", the program flow returns to the step No. 145 in order to perform the focus control operation in the single mode. On the other hand, in case the terminal $P_{12}$ is "Low", under the single mode, the program flow goes to the step No. 252, then the after release flag AFRF is checked. In case the after release flag is "1", the program flow returns. On the other hand, in case the after release flag AFRF is not "1", the program flow goes to the step No. 141 in order to perform the focus control operation.

In FIG. 11, the operation from the step No. 253 is the subroutine used for detecting whether the lens is at the end position or not. First of all, at the step No. 253, the content of the counter is inputted to a register n'. At the step No. 254, a counter value Ln', which is stored in a memory at the last detection of whether the lens is at the end position or not, is compared with the counter value n' inputted at the above step No. 253. In case n' equals to Ln', when the encoder has not outputted any pulse during detecting whether the lens is at the end position or not, the program flow returns to the step No. 256 and the operation on the condition that the lens is at the end position is performed. On the other hand, in case n' is not equal to Ln', when the lens has not reached the end position, n' is stored as Ln' and the program flow returns to the former routine.

The operation from the step No. 256 is the operation on the condition that the lens has reached the end position. At the step No. 256, the driving signal to the motor MO is turned off and the motor MO is made to stop. Next, at the step No. 257, a low contrast scan flag LCFI is checked. In case the flag LCFI is not "1", when scanning with the low contrast is not performed, the program flow goes to the step No. 258. Then the terminal flag TEF is set, and the motor flag MOF is reset at the step No. 259. Next, at the step No. 260, the driving direction flag DDF is checked. In case the flag DDF is "1", the program flow goes to the step No. 261, then the terminal position flag TPF is reset and the lens is at the farthest end position from the object. On the other hand, in case the driving direction flag DDF is not "1", the program flow goes to the step No. 262, then the terminal position flag TPF is set and thereby it is indicated that the lens is at the nearest end position to the object. Then the terminal $P_{12}$ is checked. In case the terminal $P_{12}$ is "Low", under the single mode, the program flow goes to the step No. 264, then the AF microcomputer $MC_2$ outputs a "High" signal to the terminals $P_7$ and $P_9$ and the display of the defocus direction is turned off. Then the program flow returns to the step No. 36 in order to measure the light again. On the other hand, if the terminal $P_{12}$ is "High", under the single mode, the program flow goes back to the step No. 36.

At the step No. 257, in case the low contrast scan flag LCFI is "1", when scanning with the low contrast is performed, the program flow goes to the step No. 265, then the low contrast flag $LCF_2$ is checked. In case the low contrast flag $LCF_2$ is not "1", the program flow goes to the step No. 269 in order to scan conversely. Then the low contrast flag $LCF_2$ is set and the driving direction flag DDF is converted at the step No. 270 so that the flag DDF becomes "0" when the flag DDF is "1" and the flag DDF becomes "1" when the flag DDF is "0". Next, at the steps No. 271 through No. 273, the driving direction flag DDF is checked and the AF microcomputer $MC_2$ outputs the driving signal to the motor MO in accordance with the said direction. Then the program flow goes back to the step No. 36 in order to measure the light again. At the step No. 265, in case the low contrast flag $LCF_2$ is "1", when scanning with the low contrast is completed, the program flow goes to the step No. 266, then the low contrast flag $LCF_3$ is set and scanning with the low contrast is inhibited. At the step No. 267, the low contrast flags $LCF_1$ and $LCF_2$ are reset, and at the step No. 268, the motor flag MOF is reset and thereby it is indicated that the motor stops. Then the program flow goes back to the step No. 36 in order to measure again.

Moreover, in order that the control apparatus for the automatic focus control is operated for itself for the check and adjustment during the manufacturing process in FIG. 1, the following steps is added to the above flow charts of the AF microcomputer $MC_2$. In this case, the lens with a particular fixed focal distance is mounted in order to check and adjust the control part for controlling the focal distance automatically. At the step No. 21, in case the flag AFRF is "1", it is determined whether the terminal $P_{12}$ is "High" or not. In case the terminal $P_{12}$ is "Low", the program flow goes to the step No. 27. On the other hand, the terminal $P_{12}$ is "High", when the check mode has been selected, the program flow goes back to the step No. 36. Then at the step No. 52, it is determined that the terminal $P_{12}$ is "High", and it is determined whether the input and output port $P_7$ is in the input mode or the output mode. In case the input and output port $P_7$ is in the input mode, when the single mode shown in FIG. 5 has been selected, the program flow goes to the step No. 54. On the other hand, in case the input and output port $P_7$ is in the output mode, the circuit shown in FIG. 1 is in the check mode and the information is fixedly stored in the ROMs in the microcomputers $MC_1$ and $MC_2$. The conversion factor of the above particular lens is set for calculating and the program flow goes to the step No. 60. Moreover, at the step No. 139, it is determined that "High" is inputted to the terminal $P_{12}$, and it is determined whether the terminal $P_7$ is in the input mode or the output mode. In case the terminal $P_7$ is in the input mode, when the single mode has been selected, the program flow goes to the step No. 145. On the other hand, in case the terminal $P_7$ is in the output mode, the program flow goes to the step No. 141.

By adding the above steps and inputting a start signal of the AF operation, even though the circuit is so arranged as shown in FIG. 1, the AF microcomputer $MC_2$ operates for itself having no relation with the microcomputer $MC_1$ and the control part for the automatic focus control can be operated for itself for the check and adjustment of the control part. Moreover, at the step No. 52, it is determined that the terminal $P_{12}$ is "High" and the terminal $P_7$ are in the output mode, the data of the CCD is outputted from input and output ports not shown or the output terminal of the serial data. Next, the data used for adjusting are read and the program flow goes to the step No. 60. If the focus quantity $\Delta \epsilon$ is outputted for checking and adjusting the control circuit after the step No. 60 is performed and terminal $P_7$ is made to be in the output mode, it may be easy to check and adjust the control circuit.

Although the AF microcomputer $MC_2$ is set about only under the FA mode when the switches TSS, ASS, ISS MOSS, UPS and DOS are operated in the steps #4 through #11 in FIG. 2, in place of this method, the following operation may be employed. Namely, the AF microcomputer $MC_2$ is always set about simultaneous with the start of the control microcomputer $MC_1$ but the lens is not driven so far as the one of the switches TSS, ASS, ISS, MOSS, UPS and DOS causes to start the microcomputer $MC_1$ in the AF mode. In addition, when the camera is set in the operative condition by the operation of the those set switches under AF mode, it is possible to enable the display as in the FA mode.

Also in the step No. 86 when the reset of the low contrast flag $CF_1$ is detected, the program flow may be shifted to the step No. 36 omitting the steps Nos. 87 to 92. According to this arrangement, the photographic lens may be moved up to the in focus position (referred to a first in focus position) based on the data just before the change of the contrast even though the contrast of the object is suddenly changed to the low contrast, and in case the contrast measured by the camera is restored to the initial value before the photographic lens reaches the first in focus position, the lens may be moved up to in focus position in accordance with a new data obtained based on the restored contrast. However in case the contrast is not restored i.e., the low contrast is continued before the photographic lens reaches the first in focus position, the photographic lens is moved up to the first in focus position.

Table 5 represents the relation signals and their contents in the AF microcomputer $MC_2$, while Table 6 represents the contents of flags referred to in the flow program shown in FIGS. 6 through 11.

TABLE 5

| Port in micro- | Normal (camera) mode | | Single (lens itself) mode | |
| --- | --- | --- | --- | --- |
| computer | Signal | Content | Signal | Content |
| $P_0$ | INEN | the integral completion signal from the interface circuit INF | INEN | the integral signal completion signal from the interface circuit INF |
| $P_1$ | INSTA | the integral start signal to the interface circuit INF | INSTA | the integral start signal to the interface circuit INF |
| $P_2$ | INSTP | the integral stop signal to the interface circuit INF | INSTP | the integral stop signal to the interface circuit INF |
| $P_3$ | ADEN | the A/D conversion data input timing signal from the interface circuit INF | ADEN | the A/D conversion data input timing signal from the interface circuit INF |
| $D_0$ | ADD | the input bus for the CCD output from the interface circuit INF | ADD | the input bus for the CCD output from the interface circuit INF |
| $P_4$ | RRT | the clockwise rotation signal to the motor driving circuit MCC | RRT | the clockwise rotation signal to the motor driving circuit MCC |
| $P_5$ | LRT | the counterclockwise rotation signal to the motor driving circuit MCC | LRT | the counterclockwise rotation signal to the motor driving circuit MCC |
| $P_6$ | GOV | the speed switching signal to the motor driving circuit MCC | GOV | the speed switching signal to the motor driving circuit MCC |
| $P_8$ | IFLS | the driving signal to the light emitting diode for displaying the in focus condition | IFBZ | the driving signal to the buzzer for displaying the in focus condition |
| $P_{12}$ | SNS | the single/normal mode switching signal | SNS | the single/normal mode switching signal |
| $P_7$ | RFLS | the driving signal to the LED for displaying the defocus direction in a rear focus | | the input bit of defocus quantity - encoder pulse count conversion factor |
| $P_9$ | FFLS | the driving signal to the LED for displaying the defocus direction in a front focus | | the input bit of defocus quantity - encoder pulse count conversion factor |
| $P_{10}$ | FLS | the focus lock signal | | the input bit of defocus quantity - encoder pulse count conversion factor |
| $P_{11}$ | AMS | the AF/FA mode switching signal | | the input bit of defocus quantity - encoder pulse count conversion factor |
| $P_{13}$ | STPOK | the clock pulse stop signal to the microcomputer $MC_1$ | | the input bit of defocus quantity - encoder pulse count conversion factor |
| $P_{14}$ | AFEN | the AF completion signal to the microcomputer $MC_1$ | | the input bit of defocus quantity - encoder pulse count conversion factor |
| $P_{15}$ | | | | the input bit of defocus quantity - encoder pulse count conversion factor |
| $P_{16}$ | DTRQ | the demand signal of the serial communication to the microcomputer $MC_1$ | | the input bit of defocus quantity - encoder pulse count conversion factor |
| $CLI_0$ | ENCL | the encoder output pulse signal from the encoder circuit ENCC | ENCL | the encoder output pulse signal from the encoder circuit ENCC |
| $it_1$ | AFSTA | the AF start interruption signal from the microcomputer $MC_1$ | | not use |
| $it_2$ | AFSTP | the AF stop interruption signal from the microcomputer $MC_1$ | | not use |
| $it_3$ | INREL | the release interruption signal from the microcomputer $MC_1$ | INREL | the release interruption signal from the microcomputer $MC_1$ |
| $SICK_0$ | SICK | the clock pulse for the serial communication from the microcomputer $MC_1$ | | not use |
| $SIIN_0$ | $SIBS_1$ | the serial data from the microcomputer $MC_1$ | | not use |
| STCLIN | STCL | the driving clock pulse to the AF microcomputer $MC_2$ | STCL | the driving clock pulse to the AF microcomputer $MC_2$ |

TABLE 6

The flag used in the flow charts

| Flag code | Name of flag | Content | "0" state | "1" state |
|---|---|---|---|---|
| FMF | Focus mode flag | distinction of the AF or FA mode | the AF mode | the FA mode |
| FLF | Focus lock flag | determination of the focus lock condition | not on the focus lock condition | on the focus lock condition |
| MOF | Motor flag | if the motor is rotating | motor stop | motor rotating |
| $LCF_0$ | Low contrast flag 0 | if the object has the low contrast | normal condition | low contrast |
| $LCF_1$ | Low contrast flag 1 | if scanning with the low contrast is performed | not scanning | scanning |
| $LCF_2$ | Low contrast flag 2 | if forward or backward scanning is performed | forward scanning | backward scanning |
| $LCF_3$ | Low contrast flag 3 | inhibition of scanning with the low contrast | permission of scanning | inhibition of scanning |
| AFRF | After release flag | if the release operation is performed | not performed | performed |
| LLF | Low light flag | if the object has low brightness | normal condition | low brightness |
| AFIFF | AF in focus flag | if the image of the object is in focus in the AF mode | out of focus | in focus |
| DDF | Driving direction flag | the driving direction | toward the object | toward the body of the camera |
| FOF | First out flag | if the sudden big change in the the defocus value occurs | normal condition | sudden big change |
| NZF | Near zone flag | if the lens is inside or outside of the near zone | outside of the near zone | inside of the near zone |
| TEF | Terminal flag | if the lens is at the end position | not at the end position | at the end position |
| TPF | Terminal position flag | the side of end position of the lens | $\infty$ focus side | closest focus side |
| HLF | High light flag | if the object has high brightness | not high brightness | high brightness |

What is claimed is:

1. An automatic focus control camera having means for varying the focus condition comprising:

means for obtaining information necessary for automatic focus control, including means for sensing a focus condition and means for generating a data signal indicative of the necesary degree of focus adjustment required in response to the sensing means, said obtaining means requiring a time period from the sensing of the focus condition until the generation of the data signal;

means for providing a driving power for varying the focus adjustment in accordance with the data signal;

means for directing said obtaining means to operate when the driving power is not being provided and also when the driving power is being provided;

means operative when the driving power is being provided, for modifying the effect of the data signal with the degree of focus adjustment expected to be required during a predetermined application of driving power to the means for varying the focus condition; and means for interrupting the operation of said obtaining means and said modifying means for a period of time beginning from an initiation of providing the driving power, the period of time being greater than the time required from the initiation of the focus adjustment until an attainment of a predetermined speed of a focus adjustment movement caused by the driving power.

2. The automatic focus control camera according to claim 1, further comprising means for subtracting the actual degree of focus adjustment caused by the driving power from the degree of focus adjustment represented by the data signal generated before the provision of the driving power, and means for preparing a reference data signal, wherein said providing means includes means responsive to any remainder value resulting from the subtraction and the reference data signal for reducing the driving power when the remainder value becomes less than the reference data signal, and wherein said preparing means includes means for changing the reference data signal in accordance with the data signal generated by said generating means before the provision of the driving power.

3. The automatic focus control camera according to claim 1, further comprising means for preparing a first reference level and a second reference level greater than the first one, and wherein said providing means includes means for varying the driving power with a selected one of the first and second reference levels and for reducing the driving power when the data signal is less than the selected reference level, and means for selecting the first reference level with the driving power not reduced, and the second reference level with the driving power reduced, respectively.

4. The automatic focus camera according to claim 1, further comprising means for deciding whether the data signal of said obtaining means is reliable, means for controlling said providing means to provide the driving power in accordance with a predetermined signal in place of the data signal when said deciding means decides that the data signal is not reliable, means for investigating whether the driving power is provided, and means responsive to said investigating means for disabling said controlling means when the driving power is provided.

5. The automatic focus control camera according to claim 1, wherein said directing means includes means for repeatedly directing said obtaining means to operate, means for finding a difference between a pair of successively generated data signals and means responsive to said finding means for causing said providing means to respond to the later one of the pair of data signals when the difference is within a predetermined range and for causing said providing means to respond to next data signal generated in succession to the pair of data signals when the difference is over the predetermined range.

6. The automatic focus control camera according to claim 1, further comprising means for preparing a first reference level representative of a first level of defocusing degree and a second reference level representative of a second level of defocusing degree greater than the first one, means for informing whether or not a teleconverter is used with the camera, and means responsive to said informing means for selecting the first reference level when the teleconverter is not used, and for selecting the second reference level when the teleconverter is used, wherein said providing means includes means for comparing the data signal with the selected one of the first and second reference levels and for deciding when the focus adjustment is in the infocus condition when a level of the defocusing degree represented by the data signal is less than the level of the defocusing degree represented by the selected reference level.

7. The automatic focus control camera according to claim 1, further comprising means for performing a camera exposure operation, first means for controlling the operation of said obtaining means, second means for controlling the operation of said obtaining means, sequence control means for controlling said performing means and said first controlling means, and means for selecting between said first and second controlling means, whereby the obtaining means operates under the control of said sequence control means in a accordance with a total camera operation sequence when said first controlling means is selected, and the obtaining means also operates independently from the control of said sequence control means when said second controlling means is selected.

8. The automatic focus control camera according to claim 1, further comprising means for informing of the focus condition in response to said obtaining means and for switching between an automatic focus control mode in which said providing means is operative and a manual focus control mode in which said providing means is inoperative, means for calculating an exposure control data, a first manually operable member for a shutter release operation, a second manually operable member for setting an exposure information, first means for enabling said calculating means in response to a manipulation of either of said first and second manually operable members in either of the automatic and manual focus control modes, second means for enabling said providing means in response to a manipulation of said first manually operable member with no response to that of said second manually operable member in the automatic focus control mode, and third means for enabling said informing means in response to a manipulation of either of said first and second manually operable members in the manual focus control mode.

9. An automatic focus control camera comprising:
means for obtaining information necessary for automatic focus control, the information being indicative of the necessary degree of focus adjustment;
means for providing a driving power for focus adjustment in accordance with the information;
means for directing said obtaining means to operate when the driving power is not provided;
means for detecting a remainder value obtainable by subtracting the actual degree of focus adjustment caused by the driving power from the degree of focus adjustment represented by the information obtained before the provision of the driving power;
means for preparing a reference data;
means responsive to the remainder value and the reference data for reducing a speed of focus adjustment caused by the driving power when the remainder value becomes less than the reference data; and
means for changing the reference data in accordance with the information obtained before the provision of the driving power.

10. The automatic focus control camera according to claim 9, wherein said changing means includes means for comparing a predetermined information with the information obtained before the provision of the driving power and means responsive to said comparing means for maintaining the reference data at a constant value when the information from the obtaining means is greater than the predetermined information and for reducing the reference data from the constant value when the information from the obtaining means is than the predetermined information.

11. The automatic focus control camera according to claim 10 further including means for braking the driving power, wherein the constant value corresponds to the degree of focus adjustment expected to occur from the time of the braking of the focus adjustment at its maximum speed until a complete stopping of the focus adjustment.

12. An automatic focus control camera comprising:
means for obtaining information necessary for automatic focus control, the information relating to a level of the defocusing degree and a direction of the defocus;
means for providing a driving power for focus adjustment in accordance with the information;
means for preparing a first reference level and a second reference level greater than the first one, both the first and second reference levels being greater than a level of defocusing degree which is regarded as an in-focus condition;
means for comparing the information with a selected one of the first and second reference levels and for reducing the driving power of said providing means when the level of the defocusing degree represented by the information is less than the level of the defocusing degree represented by the selected reference level; and
means for selecting the first reference level with the driving power not reduced, and the second reference level with the driving power reduced, respectively.

13. An automatic focus control camera having means for varying the focus condition of the camera comprising:
means for obtaining information necessary for automatic focus control;
means for providing a driving power in accordance with the information to the means for varying the focus condition;
means for repeatedly directing said obtaining means to operate when the driving power is not provided and also when the driving power is provided;
means for deciding whether the information of said obtaining means is reliable;
means for controlling said providing means to provide the driving power in accordance with a predetermined signal in place of the information when said deciding means decides that the information is not reliable, so as to seek another position of focus adjustment at which the information of said obtaining means is reliable;
means for investigating whether the driving power is provided in accordance with the information; and means reponsive to said investigating means for disabling said controlling means when the driving power is provided.

14. The automatic focus control camera according to claim 13, wherein said obtaining means includes means for sensing a contrast of the image, and wherein said deciding means includes means for regarding the information unreliable when the contrast is less than a predetermined required level.

15. The automatic focus control camera according to claim 13, wherein said disabling means includes means for interrupting the provision of the driving power, and for directing said obtaining means to operate with the focus adjustment stopped, and also for enabling said providing means again, in place of the operation of said controlling means.

16. The automatic focus control camera according to claim 13, wherein said disabling means includes means for enabling said providing means to continue the provision of driving power in accordance with the information obtained before the deciding means functions, in place of the operation of said controlling means.

17. An automatic focus control camera comprising:
means for obtaining information necessary for automatic focus control;
means for providing a driving power for focus adjustment in accordance with the information;
means for repeatedly directing said obtaining means to operate;
means for finding a difference between a pair of successively obtained informations; and
means responsive to said finding means for causing said providing means to respond to the later one of the pair of informations when the difference is within a predetermined range and for causing said providing means to respond to the next information obtained in succession to the pair of informations when the difference is over the predetermined range.

18. The automatic focus control camera according to claim 17, wherein said finding means includes means for storing the information from said obtaining means, and means for comparing the stored information with the information obtained in succession to the stored information to find the difference therebetween.

19. The automatic focus control camera according to claim 17, further comprising means responsive to said finding means for interrupting the provision of the driving power when the difference is over the predetermined range so that the next information is obtained without the provision of the driving power.

20. The automatic focus control camera according to claim 17, further comprising means for measuring light from an object to be focused to make said directing means prolong a repetition period of its directions as the measured light intensity decreases, and means for detecting whether the measured light intensity is less than a predetermined level, wherein said causing means is further responsive to said detecting means for causing said providing means to respond to the later one of the pair of informations when the less intensity is detected even if the difference is over the predetermined range.

21. The automatic focus control camera according to claim 20, further comprising means responsive to said finding means and said detecting means for interrupting the provision of the driving power when the difference is over the predetermined range and the measured intensity is greater than the predetermined level, so that the next information is obtained without the provision of the driving power.

22. An automatic focus control camera comprising:
means for obtaining information necessary for automatic focus control, the information being indicative of a level of the defocusing degree;
means for providing a driving power of focus adjustment in accordance with the information;
means for directing said obtaining means to operate;
means for preparing a first reference level representative of a first level of defocusing degree and a second reference level representative of a second level of defocusing degree greater than the first one;
means for informing whether or not a teleconverter is used with the camera;
means responsive to said informing means for selecting the first reference level when the teleconverter is not used, and for selecting the second reference level when the teleconverter is used; and
means for comparing the information with the selected one of the first and second reference levels and for deciding that the focus adjustment is in an in-focus condition when the level of the defocusing degree represented by the information is less than the level of the defocusing degree represented by the selected reference level.

23. The automatic focus control camera according to claim 22, wherein said preparing means includes means for determining the first reference level in accordance with data representative of aperture value, and for determining the second reference level in accordance with the data representative of aperture value with a predetermined value added.

24. A camera capable of automatically detecting the focus condition comprising:
means for obtaining information necessary for automatic detecting of the focus condition;
means for starting a camera exopsure operation;
first means for controlling the operation of said obtaining means;
second means for controlling the operation of said obtaining means;
sequence control means for controlling said starting means and said first controlling means; and
means for selecting between said first and second controlling means,
whereby said obtaining means operates under the control of said sequence control means in accordance with a total camera operation sequence when said first controlling means is selected, and said obtaining means also operates without the control of said sequence control means when said second controlling means is selected.

25. The camera according to claim 24, further comprising means for providing a driving power for automatic focus adjustment in accordance with the information, said providing means being also under the control of one of said first and second controlling means selected by said selecting means.

26. An automatic focus control camera comprising:
means for obtaining information necessary for focus control;
means for providing a driving power for automatic focus adjustment in accordance with the information;
means for providing information from said obtaining means;

means for switching between an automatic focus control mode in which said driving power providing means is operative and a manual focus control mode in which said driving power providing means is inoperative;

means for calculating an exposure control data;

a first manually operable member for a shutter release operation;

a second manually operable member for setting exposure information;

first means for enabling said calculating means in response to a manipulation of either of said first and second manually operable members in either of the automatic and manual focus control modes;

second means for enabling said providing means in response to a manipulation of said first manually operable member with no response to that of said second manually operable member in the automatic focus control mode; and third means for enabling said information providing means in response to a manipulation of either of said first and second manually operable members in the manual focus control mode.

* * * * *